(12) United States Patent
Martens et al.

(10) Patent No.: US 9,836,455 B2
(45) Date of Patent: Dec. 5, 2017

(54) APPARATUS, METHOD AND COMPUTER-ACCESSIBLE MEDIUM FOR EXPLAINING CLASSIFICATIONS OF DOCUMENTS

(75) Inventors: David Martens, Berchem (BE); Foster Provost, New York, NY (US)

(73) Assignees: NEW YORK UNIVERSITY, New York, NY (US); UNIVERSITY OF ANTWERP, Prinnsstraat (BE)

( * ) Notice: Subject to any disclaimer, the term of this patent is extended or adjusted under 35 U.S.C. 154(b) by 561 days.

(21) Appl. No.: 14/001,242

(22) PCT Filed: Feb. 23, 2012

(86) PCT No.: PCT/US2012/026359
§ 371 (c)(1),
(2), (4) Date: Mar. 31, 2014

(87) PCT Pub. No.: WO2012/116208
PCT Pub. Date: Aug. 30, 2012

(65) Prior Publication Data
US 2014/0229164 A1    Aug. 14, 2014

Related U.S. Application Data

(60) Provisional application No. 61/445,838, filed on Feb. 23, 2011.

(51) Int. Cl.
*G06F 17/27* (2006.01)
*G06F 17/28* (2006.01)
*G06F 17/24* (2006.01)

(52) U.S. Cl.
CPC .......... *G06F 17/28* (2013.01); *G06F 17/241* (2013.01); *G06F 17/2765* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,796,948 A * 8/1998 Cohen ............... G06Q 10/107
709/202
5,855,011 A * 12/1998 Tatsuoka ........ G01R 31/318371
706/45

(Continued)

OTHER PUBLICATIONS

Aggarwal, C.C. et al. "The inverse classification problem." Journal of Computer Science and Technology vol. 25 Issue (3) pp. 458-468. (2010).

(Continued)

*Primary Examiner* — Lamont Spooner
(74) *Attorney, Agent, or Firm* — Andrews Kurth Kenyon LLP

(57) ABSTRACT

Classification of collections of items such as words, which are called "document classification," and more specifically explaining a classification of a document, such as a webpage or website. This can include exemplary procedure, system and/or computer-accessible medium to find explanations, as well as a framework to assess the procedure's performance. An explanation is defined as a set of words (e.g., terms, more generally) such that removing words within this set from the document changes the predicted class from the class of interest. The exemplary procedure system and/or computer-accessible medium can include a classification of web pages as containing adult content, e.g., to allow advertising on safe web pages only. The explanations can be concise and document-specific, and provide insight into the reasons for the classification decisions, into the workings of the classification models, and into the business application itself. Other exemplary aspects describe (Continued)

how explaining documents' classifications can assist in improving the data quality and model performance.

29 Claims, 13 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | | |
|---|---|---|---|---|
| 6,101,515 | A * | 8/2000 | Wical | G06F 17/30707 382/227 |
| 6,393,423 | B1 * | 5/2002 | Goedken | G06F 17/30864 |
| 6,757,692 | B1 * | 6/2004 | Davis | G06F 17/30707 707/692 |
| 7,047,486 | B1 * | 5/2006 | Nagao | G06F 17/30707 707/999.006 |
| 7,194,471 | B1 * | 3/2007 | Nagatsuka | G06F 17/3071 |
| 7,502,767 | B1 * | 3/2009 | Forman | G06N 99/005 702/19 |
| 2004/0083224 | A1 | 4/2004 | Yoshida | |
| 2004/0107089 | A1 * | 6/2004 | Gross | G06F 17/274 704/10 |
| 2005/0114533 | A1 * | 5/2005 | Hullfish | H04L 12/581 709/230 |
| 2005/0228774 | A1 * | 10/2005 | Ronnewinkel | G06F 17/30707 |
| 2006/0136410 | A1 | 6/2006 | Gaussier et al. | |
| 2006/0224589 | A1 * | 10/2006 | Rowney | H04L 12/583 |
| 2006/0236220 | A1 * | 10/2006 | Jarman | G11B 27/105 715/201 |
| 2007/0043690 | A1 * | 2/2007 | Inakoshi | G06F 17/30943 |
| 2007/0101353 | A1 * | 5/2007 | Jeong | G06K 9/00711 725/13 |
| 2007/0162328 | A1 * | 7/2007 | Reich | G06Q 30/02 705/14.58 |
| 2007/0168853 | A1 * | 7/2007 | Jarman | G11B 27/105 715/205 |
| 2007/0233787 | A1 * | 10/2007 | Pagan | G06Q 10/107 709/206 |
| 2008/0021969 | A1 | 1/2008 | Oliver et al. | |
| 2008/0134282 | A1 * | 6/2008 | Fridman | G06Q 10/10 726/1 |
| 2009/0016499 | A1 * | 1/2009 | Hullfish | H04L 12/581 379/93.01 |
| 2009/0094187 | A1 * | 4/2009 | Miyaki | G06F 21/6218 |
| 2009/0222392 | A1 * | 9/2009 | Martin | G11B 27/105 706/46 |
| 2009/0248671 | A1 * | 10/2009 | Maruyama | G06F 17/30707 |
| 2009/0282346 | A1 * | 11/2009 | Bechtel | G06Q 10/10 715/751 |
| 2010/0037305 | A1 * | 2/2010 | Griffith | G06Q 30/02 726/7 |
| 2010/0114791 | A1 * | 5/2010 | Gold | G06Q 10/10 705/347 |
| 2010/0211551 | A1 * | 8/2010 | Ryu | H04L 12/583 707/687 |
| 2010/0268682 | A1 * | 10/2010 | Lewis | G06Q 10/107 706/54 |
| 2010/0280981 | A1 * | 11/2010 | Kato | G06F 17/30982 706/20 |
| 2011/0119209 | A1 * | 5/2011 | Kirshenbaum | G06N 5/02 706/12 |
| 2011/0191097 | A1 * | 8/2011 | Spears | G06F 17/28 704/9 |
| 2011/0191105 | A1 * | 8/2011 | Spears | G06F 17/30867 704/251 |
| 2012/0123778 | A1 * | 5/2012 | Yasrebi | H04L 12/585 704/235 |
| 2013/0275433 | A1 * | 10/2013 | Shibata | G06F 17/3071 707/740 |
| 2015/0347564 | A1 * | 12/2015 | Chung | G06F 17/30598 707/737 |

OTHER PUBLICATIONS

Agrawal, R., "Fast algorithms for mining association rules." Proc. 20th Int. 5 Conf. Very Large Data Bases, VLDB, vol. 1215. Citeseer, pp. 487-499 (1994).
Andrews, R., "Survey and critique of techniques for extracting rules from trained artificial neural networks." Knowledge Based Systems vol. 8 Issue (6) pp. 373-389 (1995).
Arnold, V., "The differential use and effect of knowledge-based system explanations in novice and expert judgement decisions." MIS Quarterly vol. 30 Issue (1) pp. 79-97 (2006).
Arnott, David. "Cognitive biases and decision support systems development: a design science approach." Information Systems Journal vol. 16 Issue (1) pp. 55-78 (2006).
Attenberg, J.,"Beat the machine: Challenging workers to find the unknown unknowns." Proceedings of the 3rd Human Computation Workshop pp. 1-6 (2011).
Attenberg, J., "Why label when you can search? Alternatives . . . class imbalance." Proc. of the Sixteenth ACM SIGKDD Int'l Conf. on Knowledge Discovery & Data Mining (2010).
Attenberg, J., "Collaborative email-spam filtering with the hashing-trick." Sixth Conference on Email and Anti-Spam, CEAS (2009).
Baehrens, David, "How to explain individual classification decisions" Journal of Machine Learning Research vol. 11 pp. 1803-1831(2010).
Baesens, B.,"Using neural network rule extraction and decision tables for credit-risk evaluation," Management Science vol. 49 Issue (3) pp. 312-329 (2003).
Baesens, B., "Benchmarking state-of-the-art classification algorithms for credit scoring." Journal of the Operational Research Society vol. 54 Issue (6) pp. 627-635 (2003).
Barakat, N.H., "Rule extraction from support vector machines: A sequantial covering approach." IEEE Trans. on Knowledge & Data Engineering vol. 19 Issue (6) pp. 729-741 (2007).
Barbella, D., "Understanding support vector machine classifications via a recommender system-like approach." (2009).
Barki, H., Interpersonal conflict and its management in information system development MIS Quarterly vol. 25 Issue (2) pp. 195-22. (2001).
Bishop, C.M. 1996. Neural networks for pattern recognition. Oxford University Press, Oxford, UK. pp. 1-496.
Chang, Chih-Chung, Chih-Jen Lin. 2001. LIBSVM: a library for support vector machines. Software available at http://www.csie.ntu.edu.tw/~cjlin/libsvm.
Craven, M.W., J.W. Shavlik. "Extracting tree-structured representations of trained networks." (1996).
Dekel, O., Vox populi: Collecting high-quality labels from a crowd. COLT: Proceedings of the 22nd Annual Conference on Learning Theory. Citeseer. (2009).
Donmez, P.,"Proactive learning: Cost-sensitive active learning with multiple imperfect oracles" Proc. of the 17th ACM Conf. on Info. & Knowledge Managements pp. 619-628 (2008).
Donmez, P.,"Efficiently learning the accuracy of labeling sources for selective sampling" Proc. of the 15th ACM SIGKDD Int'l Conf. on Know. Disc. & Data Mining pp. 259-268(2009).
Fan, R., "Liblinear: A library for large linear classification. Journal of Machine Learning Research" vol. 9 pp. 1871-1874 (2008).
Fawcett, T., "Adaptive fraud detection." Data Mining and Knowledge Discovery vol. 1, Issue (3) pp. 291-316 (1997).
Fayyad, U.M., "From data mining to knowledge discovery: An overview" Adv. in knowledge disco. & data mining. American Association for Artificial Intelligence, pp. 1-34 (1994).

(56) References Cited

OTHER PUBLICATIONS

Fung, G., "Rule extraction from linear support vector machines." Proc. of the 11th ACM SIGKDD Int'l Conf. on Knowledge Discovery in Data Mining. 32-40 (2005).
Gonul, M., "The effects of structural characteristics of explanations on use of a dss" Decision Support Systems vol. 42 pp. 1481-1493 (2006).
Gregor, S., "Explanations from intelligent systems: Theoretical foundations and implications for practice" MIS Quarterly vol. 23 Issue (4) pp. 497-530.
Hastie, T., R. Tibshirani, J. Friedman. "The Elements of Statistical Learning, Data Mining, Inference, and Prediction." Springer. (2001).
Hevner, A. R., "Design science in information systems research" MIS Quarterly vol. 28 Issue (1) pp. 75-106 (2004).
Hotho, A., A. Niirnberger, G. "A brief survey of text mining." LDV Forum vol. 20 Issue (1) pp. 19-62 (2004).
Kayande, U., "How incorporating feedback mechanisms in a DSS affects DSS evaluations" Info. Systems Research, vol. 20 pp. 527-546 (2009).
Lang, Ken., "NewsWeeder: Learning to filter netnews." Proceedings of the 12th Int'l Conference on Machine Learning. pp. 331-339 (1995).
Lilien, G. L., "DSS effectiveness in marketing resource allocation decisions: Reality vs. perception." Information Systems Research, vol. 15 pp. 216-235 (2004).
Limayem, M., "Providing decisional guidance for multicriteria decision making in groups." Information Systems Research vol. 11 Issue (4) pp. 386-401 (2000).
Mannino, M., "The cost-minimizing inverse classification problem: A genetic algorithm approach." Decision Support Systems vol. 29 pp. 283-300 (2000).
Martens, D., "Comprehensible credit scoring models using rule extraction from support vector machines." European Jour. of Operational Res. vol. 183 Issue (3)pp. 1466-1476 (2007).
Martens, D., "Decompositional rule extraction from support vector machines by active learning." IEEE Trans. on Knowledge & Data Engineering vol. 21 Issue (2) pp. 178-191 (2009).
Norvig, P. 2011. "On Chomsky and the two cultures of statistical learning." Http://norvig.com/chomsky.html.
Pang, B., "Opinion mining and sentiment analysis." Foundations and Trends in Information Retrieval vol. 2 Issue (1-2) pp. 1-135 (2008).
Platt, J. "Probabilistic outputs for support vector machines and comparisons to regularized likelihood methods." (1999).
Pyle, D. 1999. "Data preparation for data mining." Morgan Kaufmann.
Qi, X., "Web page classification: Features and algorithms." ACM Computing Surveys (CSUR) vol. 41 Issue (2) pp. 1-31 (2009).
Raghavan, S., "Crawling the hidden web. Proceedings of the International Conference on Very Large Data Bases." Citeseer, pp. 129-138 (2001).
Rajiv D. Banker, "The Evolution of Research on Information Systems: A Fiftieth-Year Survey of the Literature in Management Science" 50 (3) 281-298 (2004).
Robnik-Sikonja, M., "Explaining classifications for individual instances." IEEE Transactions on Knowledge and Data Engineering, vol. 20 pp. 589-600 (2008).
Sambamurthy, V., "The effects of variations in capabilities of gdss designs on management of cognitive conflict in groups" Info. Systems Res. vol. 3 Issue (3) pp. 224-251 (1992).
Schapire, Robert E., "Boostexter: A boosting-based system for text categorization." Machine Learning vol. 39 Issue (2/3) pp. 135-168 (2000).
Sheng, Victor S., "Get another label? Improving data quality . . . using multiple, noisy labelers" Proc. of the 14th ACM SIGKDD Int'l Conf. on Knowledge Disc. & Data Mining (2008.
Schmueli, G., "Predictive analytics in information systems research" MIS Quarterly vol. 35 Issue (3) pp. 553-572 (2011).
Sindhwani, Vikas, Prem Melville. 2008. Document-word co-regularization for semi-supervised sentiment analysis. ICDM.
Sindhwani, Vikas, Prem Melville, Richard Lawrence. 2009. Uncertainty sampling and transductive experimental design for active dual supervision. ICML.
Silver, Mark S., "Decisional Guidance for Computer-Based Decision Support." MIS Quarterly vol. 15 No. (1): pp. 105-122 (1991).
Alexander J. Smola, et al. "Advances in Large Margin Classifiers." MIT Press, Cambridge, MA. pp. 1-27 (1999).
Strumbelj, E., "An efficient explanation of individual classifications using game theory." Journal of Machine Learning Research vol. 11 pp. 1-18.(2010).
Todd, P., "Evaluating the impact of dss, cognitive effort, & incentives on strategy selection." Info. Systems Research vol. 10 No. (4) pp. 356-374 (1999).
Webb, G.I. "OPUS: An efficient admissible algorithm for unordered search" Journal of Artificial Intelligence Research, vol. 3 pp. 431-465 (1995).
Weinberger, K., "Feature hashing for large scale multitask learning." Yahoo! Research, 2821 Mission College Blvd., Santa Clara, CA 95051 USA (2009).
Ye, L. R., "The impact of explanation facilities on user acceptance of expert systems advice." MIS Quarterly vol. 19 pp. 157-172 (1995).
International Search Report for International Application No. PCT/US2012/026359 dated Sep. 27, 2012.
International Written Opinion for International Application No. PCT/US2012/026359 dated Sep. 27, 2012.
Brett Poulin et al. "Visual Explanation of Evidence in Additive Classifiers," In Proceedings of the 18th Conf. on Innovative Appl. of Artificial Int., pp. 1822-1824 (2006).
eMarketer. Apr. 27, 2010. Brand safety concerns hurt display ad growth. Http:/ /www1.emarketer.com/ Article.aspx?R=1007661.
Federal Trade Commission for the Consumer. Mar. 1998. Facts for consumers: Equal credit opportunity. Tech. rep., FTC.
Google. 2010. Our commitment to the digital humanities. The official google blog. URL http: j jgoogleblog.blogspot.com/2010/07 jour-commitment-to-digital-humanities.html.
Joachims, T. 1998. Text categorization with support vector machines: Learning with many relevant features. European Conference on Machine Learning (ECML). Springer, Berlin.
Paaí., G., H. de Vries. 2005. "Evaluating the performance of text mining . . . press archives". eds., GfKl . Studies in Class, Data Analysis, and Knowledge Org. Springer, 414-421.
Umanath, N.S., I. Vessey. 1994. Multiattribute data presentation and human judgment: A cognitive fit. Decision Sciences 25(5/6) 795 824.
Jacobsson, H. "Rule extraction from recurrent neural networks: A taxonomy and review." Neural Computation vol. 17 pp. 1223-1263; 2005.
Lessmann, S., Benchmarking classification models . . . prediction: A proposed framework and novel findings. IEEE Transactions Software Engineering vol. 34 Issue 4 pp. 485-496 (2008).
Vapnik, V.N. et al., "The Nature of Statistical Learning," Springer-Verlag, New York, Inc., pp. 1-208, 1995.

\* cited by examiner

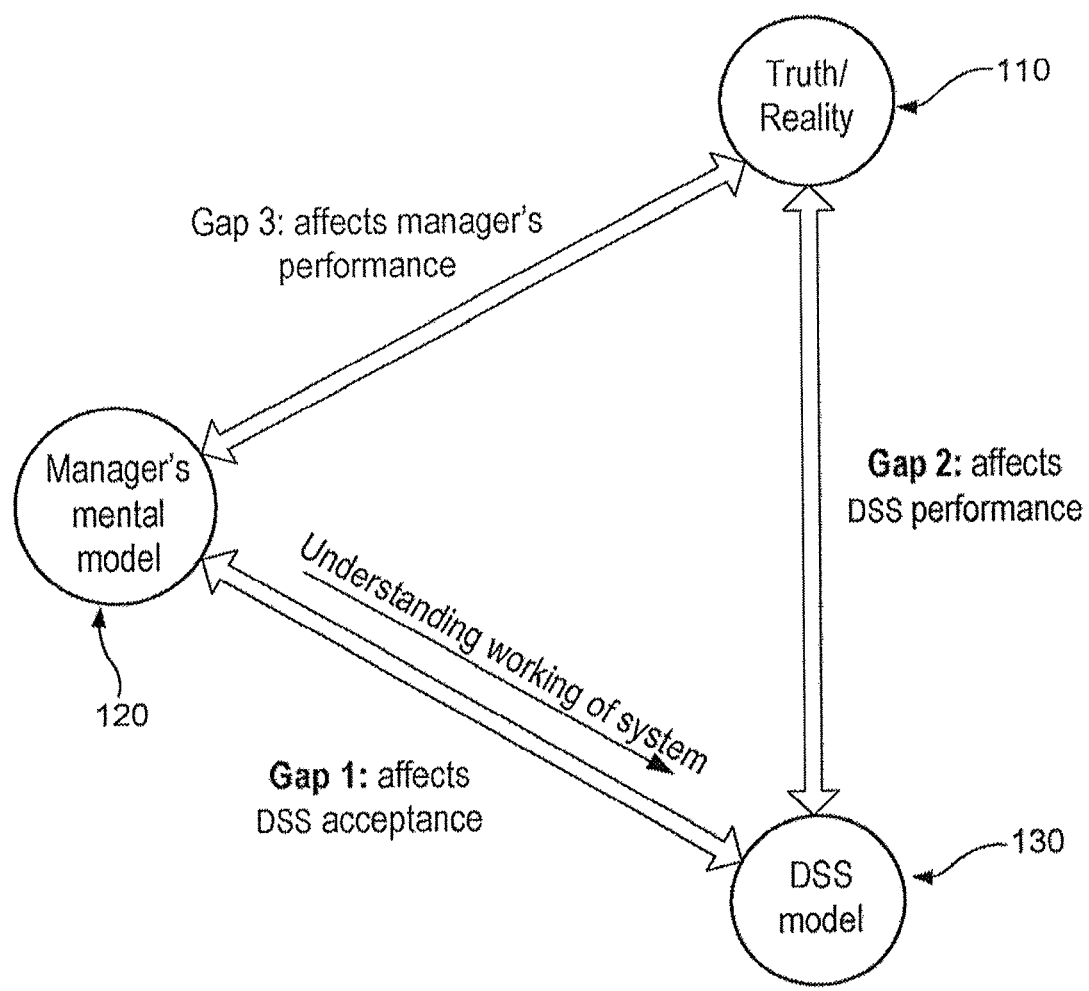
F I G. 1A

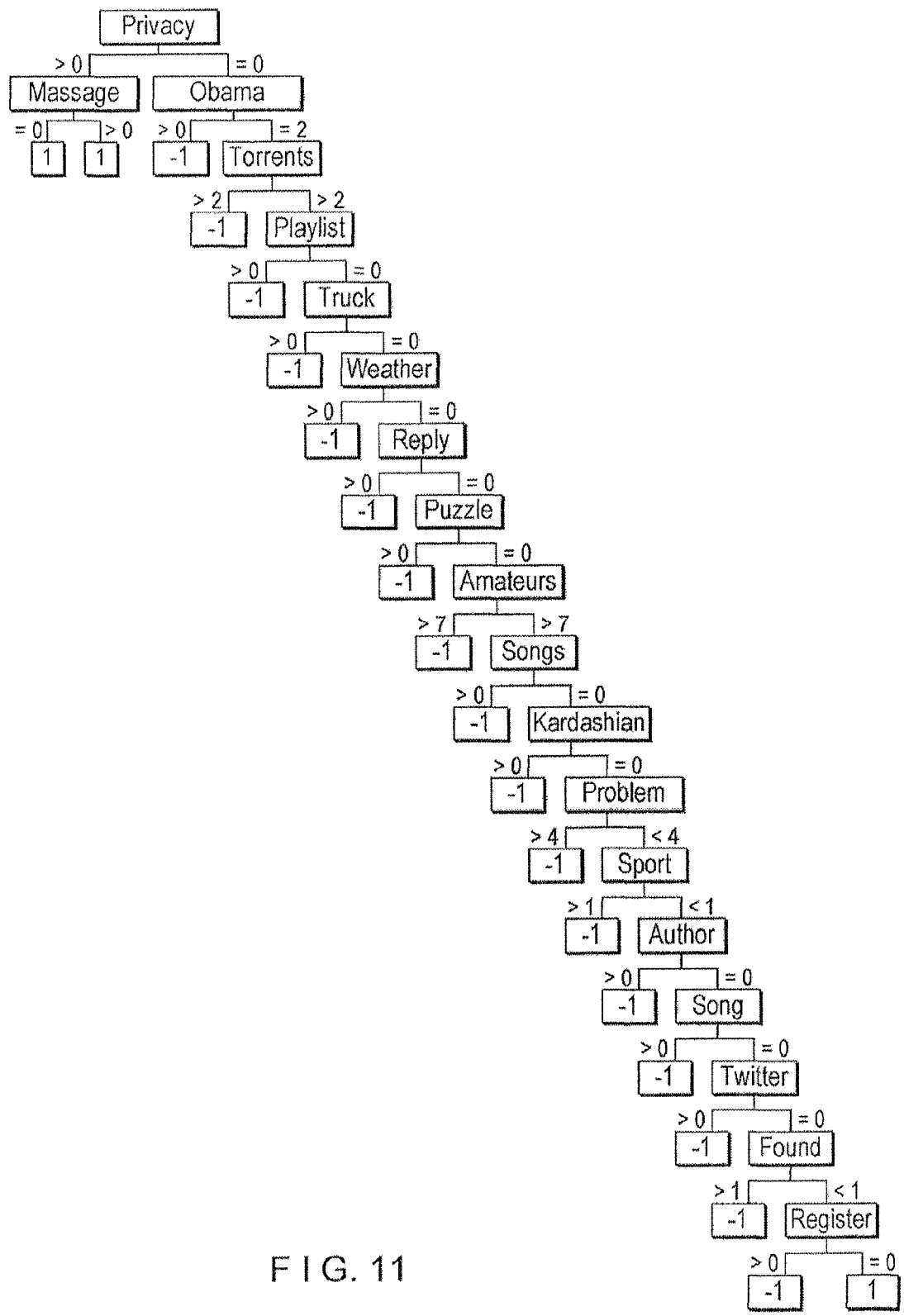
F I G. 11

APPARATUS, METHOD AND COMPUTER-ACCESSIBLE MEDIUM FOR EXPLAINING CLASSIFICATIONS OF DOCUMENTS

CROSS-REFERENCE TO RELATED APPLICATION(S)

This present application relates to and claims the benefit of priority to International Patent Application No. PCT/US2012/026359 filed on Feb. 23, 2012, and claims priority from U.S. Patent Application No. 61/445,838, filed on Feb. 23, 2011. The entire disclosures of which are hereby incorporated by reference in their entireties.

FIELD OF THE DISCLOSURE

The present disclosure relates to the classification of collections of items such as words, which we will call "document classification," and more specifically to exemplary apparatus, methods, and computer readable medium for explaining a classification of a document, such as, e.g., a web-page or website. Through this document, we will discuss the specific application to text document classification. The generalization to other collections of objects should be clear.

BACKGROUND INFORMATION

Document classification typically aims to classify textual documents automatically, based on the words, phrases, and word combinations therein (hereafter, "words"). Business applications of document classification have seen increasing interest, especially with the introduction of low-cost microoutsourcing systems for annotating training corpora. Prevalent applications include, for example, sentiment analysis (e.g., Pang, B., L. Lee. 2008, "Opinion mining and sentiment analysis", Foundations and Trends in Information Retrieval 2(1-2) 1-135), patent classification, spam identification (e.g., Attenberg, J., K. Q. Weinberger, A. Smola, A. Dasgupta, M. Zinkevich, 2009, "Collaborative email-spam filtering with the hashing-trick" Sixth Conference on Email and Anti-Spam (CEAS)), news article annotation (e.g., Paaβ, G., H. de Vries, 2005, "Evaluating the performance of text mining systems on real-world press archives"), email classification for legal discovery, and web page classification (e.g., Qi, X., B. D. Davison, 2009, "Web page classification: Features and algorithms", ACM Computing Surveys (CSUR) 41(2) 1-31). Classification models can be built from labeled data sets that encode the frequencies of the words in the documents.

Data-driven text document classification has widespread applications, such as the categorization of web pages and emails, sentiment analysis, and more. Document data are characterized by high dimensionality, with as many variables as there exist words and phrases in the vocabulary—often tens of thousands to millions. Many business applications can utilize human understanding of the reasons for classification decisions, by managers, client-facing employees, and the technical team. Unfortunately, because of the high dimensionality, understanding the decisions made by the document classifiers can be difficult. Previous approaches to gain insight into black-box models typically have difficulty dealing with high-dimensional data.

Further, organizations often desire to understand the exact reasons why classification models make particular decisions. The desire comes from various perspectives, including those of managers, customer-facing employees, and the technical team. Customer-facing employees often deal with customer queries regarding the decisions that are made; it often is insufficient to answer that the magic box said so. Managers may need to "sign off" on models being placed into production, and may prefer to understand how the model makes its decisions, rather than just to trust the technical team or data science team. Different applications have different degrees of need for explanations to customers, with denying credit or blocking advertisements being at one extreme. However, even in applications for which black-box systems are deployed routinely, such as fraud detection (Fawcett, T., F. Provost, 1997, "Adaptive fraud detection", Data Mining and Knowledge Discovery 1(3) 291-316.), managers still typically need to have confidence in the operation of the system and may need to understand the reasons for particular classifications when errors are made. Managers may also need to understand specific decisions when they are called into question by customers or business-side employees. Additionally, the technical/data science personnel themselves should understand the reasons for decisions in order to be able to debug and improve the models. Holistic views of a model and aggregate statistics across a "test set" may not give sufficient guidance as to how the model can be improved. Despite the stated goals of early research on data mining and knowledge discovery (Fayyad, U. M., G. Piatetsky-Shapiro, P. Smyth, 1996, "From data mining to knowledge discovery: An overview", Advances in knowledge discovery and data mining. American Association for Artificial Intelligence, 1-34), very little work has addressed support for the process of building acceptable models, especially in business situations where various parties must be satisfied with the results.

Popular techniques to build document classification models include, for example, naive Bayes, linear and non-linear support vector machines (SVMs), classification-tree based methods (often used in ensembles, such as with boosting (Schapire, Robert E., Yoram Singer, 2000, "Boostexter: A boosting-based system for text categorization", Machine Learning 39(2/3) 135-168), and many others (e.g., Hotho, A., A. Nürnberger, G. Paass, 2005, "A brief survey of text mining", LDV Forum 20(1) 19-62). Because of the massive dimensionality, even for linear and tree-based models, it can be very difficult to understand exactly how a given model classifies documents. It is essentially impossible for a non-linear SVM or an ensemble of trees.

Several existing methods for explaining individual classifications and reasons why they are not ideal or suitable for explaining document classifications have been described. An approach to explain classifications of individual instances that can be applicable to any classification model was presented by Robnik-Sikonja, M., I. Kononenko, 2008, "Explaining classifications for individual instances", IEEE Transactions on Knowledge and Data Engineering 20 589-600. This publication describes a methodology to assign scores to each of the variables that indicate to what extent they influence the data instance's classification. As such, they define an explanation as a real-valued vector e that denotes the contribution of each variable to the classification of the considered data instance x0 by classification model M (see Definition 2 herein). The effect of each attribute of a test instance x0 is measured by comparing the predicted output f(x0) with f(x0\Ai), where x0\Ai stands for the instance without any knowledge about attribute Ai. This is implemented by replacing the actual value of Ai with all possible values for Ai and weighting each prediction by the prior probability of that value. For continuous variables, a discretization method is applied to the variable. The larger the change in predicted output, the larger the contribution of the attribute. This change in output can be measured in various ways, using simply the difference in probabilities, the information difference or the weight of evidence. The contributions provided by the previously discussed technique are very similar to the weights in a linear model, which also denote the relative importance of each variable.

Definition 2. Robnik-Sikonja, M., I. Kononenko, 2008, "Explaining classifications for individual instances", IEEE Transactions on Knowledge and Data Engineering 20 589-600 define an explanation of the classification of model M for data instance x0 as an m dimensional real-valued vector:

$$ERS(M,x0)=e \in R^m, \text{ with } ei=f(x0)-f(x0 \setminus A_i), i=1,2,\ldots,m$$

The explanation of each attribute can be visualized, graphically showing the magnitude and direction of the contribution of each variable. A simple example is given for the Titanic data set where the aim is to predict whether a Titanic passenger survived. The instance with a female, adult, third-class passenger that is classified as surviving is explained by the contributions below. The fact that the passenger is female is the main contributor for the prediction, as the contributions for age and class are very small and even in the opposite direction.

class=third, contribution=−0.344
age=adult, contribution=−0.034
gender=female, contribution=1.194

This basic approach is not able to detect the case where a change in more than one variable is needed in order to obtain a change in predicted value. Strumbelj, E., I. Kononenko, M. Robnik-Sikonja, 2009, "Explaining instance classifications with interactions of subsets of feature values", Data & Knowledge Engineering 68(10) 886-904 build further on this and proposes an Interactions-based Method for Explanation (IME) that can detect the contribution of combinations of feature values. The explanation once again is defined as a real-valued m-dimensional vector denoting variable contributions. First, a real value number is assigned to each subset of the power set of feature values. These changes are subsequently combined to form a contribution for each of the individual feature values. In order to assess the output of the model with a subset of variables, instead of weighting over all permutations of the features values, a model is built using only the variables in the subset. Although the results are interesting, they used data sets of dimensions maximal 13.

There are several drawbacks of this method. First, the time complexity scales exponentially with the number of variables. They report that 241 seconds are needed to explain the classification of 100 test instances for the random forests model for the highest dimensional data sets (breast cancer Ijubljana which has 13 features). The authors recognize the need for an approximation method. Second, the explanation is typically not very understandable (by humans), as the explanation is once again a real-valued number for each feature, which denotes to what extend it contributes to the class. They verify their explanations with an expert, where the expert needs to assess whether he or she agrees with the magnitude and direction of the contribution of each feature value.

A game-theoretical perspective of their method is provided by Strumbelj, E., I. Kononenko, 2010, "An efficient explanation of individual classifications using game theory", Journal of Machine Learning Research 11 1-18, as well as a sampling-based approximation that does not require retraining the model. On low dimensional data sets they provide results very quickly (in the order of seconds). For the data set with most features, arrhythmia (279 features), they report that it takes more than an hour to generate an explanation for a prediction of the linear Naive Bayes model. They state: The explanation method is therefore less appropriate for explaining models which are built on several hundred features or more. Arguably, providing a comprehensible explanation involving a hundred or more features is a problem in its own right and even inherently transparent models become less comprehensible with such a large number of features. Stated within a safe advertising application: a vector of thousands of values does not provide an answer to the question 'Why is this web page classified as containing adult content?' This approach therefore is not suitable for document classification.

Baehrens, David, Timon Schroeter, Stefan Harmeling, Motoaki Kawanabe, Katja Hansen, Klaus-Robert Müller, 2010, "How to explain individual classification decisions", Journal of Machine Learning Research 11 1803-1831—also defines an instance level explanation as a real-valued vector. In this case however, the vector denotes the gradient of the classification probability output in the test instance to explain, and as such defines a vector field indicating where the other classification can be found.

Definition 3. Baehrens, David, Timon Schroeter, Stefan Harmeling, Motoaki Kawanabe, Katja Hansen, Klaus-Robert Müller, 2010, "How to explain individual classification decisions", Journal of Machine Learning Research 11 1803-1831 define an explanation of the classification of model M for data instance x0 as an m dimensional real-valued vector, obtained as the gradient of the class probability in the instance:

$$EB(M,x0)=e \in R^m, \text{ with } ei=\nabla p(x)|x=x0, i=1,2,\ldots,m$$

For SVMs it uses an approximation function (through Parzen windowing) in order to calculate the gradient. In our document classification setup, this methodology in itself does not provide an explanation in the form that is wanted as it simply will give the direction of steepest descent towards the other class. It could however serve as a basis for a heuristic explanation algorithm to guide the search towards those regions where the change in class output is the largest. The exact stepsize and the minimal set of explaining dimensions (words) still need to be determined within such an approach.

Inverse Classification. Sensitivity analysis is the study of how input changes influence the change in the output, and can be summarized by Eq. (4).

$$f(x+\Delta x)=f(x)+\Delta f \qquad (4)$$

Inverse classification is related to sensitivity analysis and involves "determining the minimum required change to a data point in order to reclassify it as a member of a (different) preferred class" (Mannino, M., M. Koushik, 2000, "The cost-minimizing inverse classification problem: A genetic algorithm approach", Decision Support Systems 29 283-300). This problem is called the inverse classification problem, since the usual mapping is from a data point to a class, while here it is the other way around. Such information can be very helpful in a variety of domains: companies, and even countries, can determine what macro-economic variables should change so as to obtain a better bond, competitiveness or terrorism rating. Similarly, a financial institution can provide (more) specific reasons why a customer's application was rejected, by simply stating how the customer can change to the good class, e.g. by increasing income by a certain amount. A heuristic, genetic-algorithm based approach can be used in Mannino, M., M. Koushik, 2000, "The cost-minimizing inverse classification problem: A genetic algorithm approach", Decision Support Systems 29 283-300 that uses a nearest neighbor model.

Classifications made by a SVM model are explained in Barbella, D., S. Benzaid, J. M. Christensen, B. Jackson, X. V. Qin, D. R. Musicant, 2009, "Understanding support vector machine classifications via a recommender system-like approach", by determining the minimal change in the variables needed in order to achieve a point on the decision boundary. Their approach solves an optimization problem with SVM-specific constraints. A slightly different definition of inverse classification is given in Aggarwal, C. C., C. Chen, J. W. Han, 2010, "The inverse classification problem", Journal of Computer Science and Technology 25(3) 458-468, which provides values for the undefined variables of a test instance that result in a desired class. Barbella, D., S. Benzaid, J. M. Christensen, B. Jackson, X. V. Qin, D. R. Musicant, 2009, "Understanding support vector machine classifications via a recommender system-like approach", search for explanations by determining the point on the decision boundary (hence named border classification) for which the Euclidean distance to the data instance to be explained is minimal.

Definition 4. Barbella, D., S. Benzaid, J. M. Christensen, B. Jackson, X. V. Qin, D. R. Musicant, 2009, "Understanding support vector machine classifications via a recommender system-like approach", implicitly define an explanation of the classification of model M for data instance x0 as the m dimensional real-valued input vector closest to x0, for which the predicted class is different from the predicted class of x0:

$$EIC(M,x0)=e\epsilon R^m=\mathrm{argmin}\Sigma_{j=1:n}(ej-x0j)^2 \text{ and } f(e)=0$$

Since finding the global optimal solution is not feasible, a locally optimal solution is sought. The approach is applied on a medical data set with eight variables. The explanation provided shows a change in all variables. Applying this to document classification is therefore again not useful. The authors describe the appropriateness for low dimensional data only as follows: our approach in the current form is most usable when the number of features of the data set is of a size that the user can eyeball all at once (perhaps 25-30 or so) (Barbella, D., S. Benzaid, J. M. Christensen, B. Jackson, X. V. Qin, D. R. Musicant, 2009, "Understanding support vector machine classifications via a recommender system-like approach").

Exemplary Explanations and Statistical Classification Models

Explaining the decisions made by intelligent decision systems has received both practical and research attention for years There are certain results from prior work that help to frame, motivate, and explain the specific gap in the current state of the art that this paper addresses. Before delving into the theoretical work, it may be beneficial to clarify the types of systems and explanations that are the focus of this paper.

Exemplary Model-based decision systems and instance-specific explanations

Starting as early as the celebrated MYCIN project in the 1970s studying intelligent systems for infectious disease diagnosis (Buchanan and Shortliffe 1984), the ability for intelligent systems to explain their decisions was understood to be necessary for effective use of such systems, and therefore was studied explicitly. The document Classification systems are an instance of decision systems (DSs)—systems that either (i) support and improve human decision making (as with the characterization of decision-support systems by Arnott, David. 2006. Cognitive biases and decision support systems development: a design science approach. Information Systems Journal 16(1) 55-78), or (ii) make decisions automatically, as with certain systems for credit scoring, fraud detection, targeted marketing, on-line advertising, web search, legal and medical document triage, and a host of other applications. An exemplary application of the exemplary embodiments of the present disclosure falls in the second category: multitude of attempts to place advertisements are made each day, and the decision system needs to make each decision in a couple dozen milliseconds.

Such model-based decision systems have seen a steep increase in development and use over the past two decades (Rajiv D. Banker, Robert J. Kauffman 2004 The Evolution of Research on Information Systems: A Fiftieth-Year Survey of the Literature in Management Science 50 (3) 281-298). Certain models can be of interest that are produced by large-scale automated statistical predictive modeling systems, which Shmueli and Koppius argue should receive more attention in the IS literature, and for which generating explanations can be particular problematic, as such data mining systems can build models using huge vocabularies. See Shmueli, G., O. R. Koppius. 2011. Predictive analytics in information systems research. MIS Quarterly 35(3) 553-572.

Different applications can impose different requirements for understanding. Let's consider three different application scenarios—both to add clarity in what follows, and so that we can rule out one of them. First, in some applications, it can be important to understand every decision that the DS may possibly make. For example, for many applications of credit scoring (Martens, D., B. Baesens, T. Van Gestel, J. Vanthienen. 2007. Comprehensible credit scoring models using rule extraction from support vector machines. Europ. Journal of Operational Research 183(3) 1466-1476) regulatory requirements stipulate that every decision be justifiable, and often this is required in advance of the official "acceptance" and implementation of the system. Similarly, it can be seen that a medical decision system may need to be completely transparent in this respect. The current prevailing interpretation of this requirement for complete transparency argues for a globally comprehensible predictive model. Indeed, in credit scoring generally the only models that are accepted are linear models with a small number of well-understood, intuitive variables. Such models are chosen even when non-linear alternatives are shown to give better predictive performance (Martens et al. 2007).

In contrast, consider applications, where one should explain the specific reasons for some subset of the individual decisions (cf., the theoretical reasons for explanations summarized by Gregor, S., I. Benbasat. 1999. Explanations from intelligent systems: Theoretical foundations and implications for practice. *MIS Quarterly* 23(4) 497-530, discussed below). Often, this need for individual case explanations can arise because particular decisions need to be justified after the fact, because (for example) a customer questions the decision or a developer is examining model performance on historical cases. Alternatively, a developer may be exploring decision-making performance by giving the system a set of theoretical test cases. In both scenarios, it is necessary for the system to provide explanations for specific individual cases. Individual case-specific explanations may also be sufficient in many certain applications. According to an exemplary embodiment of the present disclosure, it can be interesting that they be necessary. Other examples in the second scenario can include, fraud detection (Fawcett and Provost 1997), many cases of targeted marketing, and all of the document Classification applications listed in the first paragraph of this paper.

In a third exemplary application scenario, every decision that the system actually makes should be understood. This often is the case with a classical decision-support system, where the system is aiding a human decision maker, for example for forecasting (Gonul, M. Sinan, Dilek Onkal, Michael Lawrence. 2006. The effects of structural characteristics of explanations on use of a dss. Decision Support Systems 42 1481-1493) or auditing (Ye, L. R., P. E. Johnson. 1995. The impact of explanation facilities on user acceptance of expert systems advice. MIS Quarterly 19 157-172). For such systems, again, it is necessary to have individual case-specific explanations.

Exemplary Cognitive Perspectives on Model Explanations

Gregor and Benbasat (1999) provide a survey of empirical work on explanations from intelligent systems, presenting a unified theory drawing upon a cognitive effort perspective, cognitive learning, and Toulin's model of argumentation. They find that explanations are important to users when there is some specific reason and anticipated benefit, when an anomaly is perceived, or when there is an aim of learning. From the same perspective, an explanation can be given automatically (without any effort from the user to make it appear), and tailored to the specific context of the user, requiring even less cognitive effort as less extraneous information has to be read. According to this publication, explanations complying with these requirements lead to better performance, better user perceptions of the system, and possibly improved learning. Our design provides explanations for particular document Classifications that can be useful precisely for these purposes.

Gregor and Benbasat's theoretical analysis brings to the fore three ideas that can be important. First, they introduce the reasons for explanations: to resolve perceived anomalies, a need to better grasp the inner workings of the intelligent system, or the desire for long-term learning. Second, they describe the type of explanations that should be provided: they emphasize the need not just for general explanations of the model, but for explanations that are context specific. Third, Gregor and Benbasat emphasize the need for "justification"-type explanations, which provide a justification for moving from the grounds to the claims. This is in contrast to rule-trace explanations—traditionally, the presentation of chains of rules, each with a data premise (grounds), certainty factor (qualifier) and conclusion (claim). In statistical predictive modeling, reasoning generally is shallow such that the prediction itself essentially is the rule-trace explanation. Specifically, the "trace" often entails simply the application of a mathematical function to the case data, with the result being a score representing the likelihood of the case belonging to the class of interest—with no justification of why.

There is little existing work on methods for explaining modern statistical models extracted from data that satisfy these latter two criteria, and possibly none that provide such explanations for the very high-dimensional models that are the focus of this paper.

An important subtlety that is not brought out explicitly by Gregor and Benbasat, but which is quite important in our contemporary context is the difference between (i) an explanation as intended to help the user to understand how the world works, and thereby help with acceptance of the system, and (ii) an explanation of how the model works. In the latter case, which is our focus, the explanation thereby either can help with acceptance, or can focus attention on the need for improving the model.

Kayande et al.'s Exemplary 3-Gap Framework

In order to examine more carefully why explanations are needed and their impact on decision model understanding, long-term learning, and improved decision making, it is possible to review a publication by Kayande, U., A. De Bruyn, G. L. Lilien, A. Rangaswamy, G. H. van Bruggen. 2009. How incorporating feedback mechanisms in a DSS affects dss evaluations. Information Systems Research 20 527-546. This work focuses on the same context as we do in our case study, specifically where data are voluminous, the link between decisions and outcomes is probabilistic, and the decisions are repetitive. They presume that it is highly unlikely that decision makers can consistently outperform model-based DSs in such contexts.

Prior work has suggested that when users do not understand the workings of the DS model, they will be very skeptical and reluctant to use the model, even if the model is known to improve decision performance, see e.g., Umanath, N. S., I. Vessey. 1994. Multiattribute data presentation and human judgment: A cognitive fit. Decision Sciences 25(5/6) 795 824, Limayem, M., G. De Sanctis. 2000. Providing decisional guidance for multicriteria decision making in groups. Information Systems Research 11(4) 386-401, Lilien, G. L., A. Rangaswamy, G. H. Van Bruggen, K. Starke. 2004. DSS effectiveness in marketing resource allocation decisions: Reality vs. perception. Information Systems Research 15 216-235, Arnold, V., N. Clark, P. A. Collier, S. A. Leech, S. G. Sutton. 2006. The differential use and effect of knowledge-based system explanations in novice and expert judgement decisions. MIS Quarterly 30(1) 79-97, and Kayande et al. (2009).

Further, decision makers likely need impetus to change their decision strategies (Todd, P. A., I. Benbasat. 1999. Evaluating the impact of dss, cognitive effort, and incentives on strategy selection. Information Systems Research 10(4) 356-374), as well as guidance in making decisions (Mark S. Silver: Decisional Guidance for Computer-Based Decision Support. *MIS Quarterly* 15(1): 105-122 (1991)). Kayande et al. introduce a "3-gap" framework (see FIG. 1A) for understanding the use of explanations to improve decision making by aligning three different "models": the user's model 120, the system's model 130, and reality 110. Their results show that guidance toward improved understanding of decisions combined with feedback on the potential improvement achievable by the model induce decision makers to align their mental models more closely with the decision model, leading to deep learning. This alignment reduces the corresponding gap (Gap 1), which in turn improves user evaluations of the DS. It is intuitive to argue that this then improves acceptance and increases use of the system. Under the authors' assumption that the DS's model is objectively better than the decision maker's (large Gap 3 compared to Gap 2), this then would lead to improved decision-making performance, cf., Todd and Benbasat (1999). Expectancy theory suggests that this will lead to higher usage and acceptance of the DS model, as users will be more motivated to actually use the DS if they believe that a greater usage will lead to better performance (De Sanctis 1983).

Accordingly, there may be a need to address and/or overcome at least some of the deficiencies described herein above.

SUMMARY OF EXEMPLARY EMBODIMENTS

An exemplary embodiment of the present disclosure can provide an exemplary method, system and computer-accessible medium for explaining classifications, tailored to the business needs of document classification and able to cope with the associated technical constraints. A "document" can be any collection (e.g., bag, multiset, URLs) of items. For example, a document can be a collection of locations, such as URLs visited by one or more mobile devices or other devices. Bag/multiset generalizes a set of items in that items can repeat. Typically a document can be represented as a bag of words. With respect to the present disclosure, and different from many data mining applications, the document classification data representation can have high dimensionality, with the number of words and phrases typically ranging from tens of thousands to millions. Other collective entities to which the exemplary method can apply are, for example: a representation of a web browser as a multiset of web pages/sites that it visits. Such exemplary representation can be used in predictive classification models for targeted on-line advertising.

In what follows we focus on the document classification setting. An explanation is defined as a set of words (e.g., terms, more generally) such that removing words within this set from the document changes the predicted class from the class of interest. An exemplary embodiment of the present disclosure can provide a procedure to find such explanations, as well as a framework to assess the procedure's performance. The value of the approach can be demonstrated, for example, with a case study from a real-world document classification task: classifying web pages as containing adult content, with the purpose of allowing advertising on safe web pages only. Further exemplary empirical results can be provided for news-story topic classification using, for example, e.g., the 20 Newsgroups benchmark dataset. Exemplary results show the explanations to be concise and document-specific, and to provide insight into the reasons for the classification decisions, into the workings of the classification models, and into the business application itself. Other exemplary embodiments of the present disclosure also describe how explaining documents' classifications can help to improve data quality and model performance.

Another exemplary embodiment of the present disclosure can examine in detail an aspect of the business application of document classification that has received little attention. Specifically, an organization's desire to understand the exact reasons why classification models make particular decisions.

Exemplary explanation methods, systems and computer-accessible medium according to exemplary embodiments of the present disclosure can have an impact in improving the process of building document classification models. In illustrating an exemplary embodiment of the present disclosure, an application currently receiving substantial interest is on-line advertising: keeping ads off of objectionable web content can be considered (see, e.g., eMarketer, Apr. 27, 2010, "Brand safety concerns hurt display ad growth", http://www1.emarketer.com/Article.aspx?R=1007661). For example, having invested substantially in their brands, firms cite the potential to appear adjacent to nasty content as a primary reason they do not spend more on on-line advertising. To help reduce the risk, document classifiers can be applied to web pages along various dimensions of objectionability, including, e.g., adult content, hate speech, violence, drugs, bomb-making, and many others. However, because the on-line advertising ecosystem supports the economic interests of both advertisers and content publishers, black-box models can be insufficient. Managers cannot typically put models into production that might block advertising from substantial numbers of non-objectionable pages, without understanding the risks and incorporating them into the product offering. Customer-facing employees typically need to explain why particular pages were deemed objectionable by the models. And the technical team typically needs to understand the exact reasons for the classifications made, so that they can address errors and continuously improve the models.

Exemplary embodiments of the present disclosure can also describe an exemplary technique that can directly address the explanation of the decisions made by document classifiers. Specifically, the exemplary technique focuses on explaining why a document is classified as a specific class of interest (e.g., "objectionable content" or "hate speech"). The important dimensions for evaluating such an explanation-producing system are examined. Further, to demonstrate the exemplary method empirically, a case study based on data from a real application to the business problem of safe advertising discussed above is conducted, and the case study is augmented with an empirical follow-up study on benchmark data sets (e.g., from news classification). These exemplary studies demonstrate that the exemplary methods can be effective, and can also flush out additional issues in explaining document classifications, such as, e.g., a desire for hyper-explanations (described below).

Understanding particular classifications can also provide secondary benefits. In addition to obtaining insight into the classification model, the explanations can provide a novel lens into the complexity of the business domain. For example, in Exemplary Explanation 1 (described herein below), the word 'welcome' as an indication of adult content initially can seem strange. Upon reflection/investigation, it can be understood that in some cases an adult website's first page contains a phrase similar to 'Welcome to . . . By continuing you confirm you are an adult and agree with our policy'. The explanation can bring this complexity to light. Various different sub-topics that include the class of interest can also be learnt. For example, foreign language adult pages—whose infrequent presence can be lost in the massive dimensionality—can be found.

Exemplary Explanation 1: An example explanation why a web page is classified as having adult content.
If words (welcome fiction erotic enter bdsm adult) are removed then class can change from adult to non-adult.

Explaining misclassified documents can reveal which words are linked to a positive classification, potentially wrongly so. Such an explanation can be a beneficial component of interactive model improvement. Further, as mentioned above, for cases where no explanation can be provided or when the explanation provided is counter-intuitive, exemplary hyper-explanations can be provided that can help further to understand the model, the modeling, and the domain. Below, the problem is described in more detail, along with prior approaches and their shortcomings for document classification. An aspect of the present disclosure provides an exemplary definition of an explanation that can fit with business and technical constraints of document classification. The search for these explanations can be formulated as a straightforward optimization problem, with naive optimal (SEDC-Naive) and heuristic (SEDC) algorithms to find explanations. The heuristic SEDC performs optimally for linear binary-classification models, and performs well for non-linear models as well. Also described is an evaluation framework to assess the performance of the exemplary explanation algorithms in terms of efficiency and solution complexity. In keeping with the general principles for conducting design science research (e.g., Hevner, A. R., S. T. March, J. Park, S. Ram, 2004, "Design science in information systems research", MIS Quarterly 28(1) 75-106), a comprehensive empirical demonstration of the performance of SEDC in terms of this evaluation framework is provided using exemplary data from an exemplary real-world document classification business problem (e.g., viz., web page classification for safe advertising); the exemplary case study is augmented with demonstrations on benchmark document classification data sets.

An exemplary embodiment of the present disclosure can provide an exemplary method, system and computer-accessible medium to at least generate information associated with a classification of at least one document. The exemplary embodiments can identify at least first characteristic of the at least one document; obtain at least one second classification of the at least one document after removing the at least one first characteristic of the at least one document; and generate the information associated with the classification of the at least one document based on the at least one second classification.

In other exemplary embodiments the at least one first characteristic can include at least one word. The at least one characteristic can include a combination of words. The at least one characteristic can include at least one word, and the processing arrangement is further configured to iteratively obtain the at least one second classification of the at least one document after removing each word in the at least one document. The at least one characteristic can include at least one word, and the processing arrangement is further configured to iteratively obtain the at least one second classification of the at least one document after removing each word and every combination of words in the at least one document. The processing arrangement can be further configured to iteratively obtain the at least one second classification of the document after removing the at least one characteristic of the document until the at least one first classification and the at least one second classification are different. The processing arrangement can be further configured to omit at least some of the iterations of obtaining the at least one second classification for at least some words or at least some combination of words. The processing arrangement can be further configured to omit at least some of the iterations based on at least one of a pruning heuristic search or a hill climbing search. The information can include a minimum-size explanation, or a plurality of minimum explanations.

An exemplary embodiment of the present disclosure can provide an exemplary method, system and computer-accessible medium to at least generate information associated with at least one classification of a collection. The exemplary embodiments can identify at least first characteristic of the collection; obtain at least one second classification of the collection after removing the at least one first characteristic of the collection; and generate the information associated with the classification of the collection based on the at least one second classification. The information can include at least one of an explanation or a hyper-explanation of the at least one first classification of the collection, and wherein the at least one first classification is one of a plurality of classifications. The at least one of an explanation or a hyper-explanation can be absent evidence indicating any of the first and second classifications.

The at least one of the explanation or the hyper-explanation includes an indication of insufficient vocabulary. The at least one of the explanation or the hyper-explanation can include evidence exclusively indicating at least one of a negative classification or a default classification. The at least one of the explanation or the hyper-explanation can be absent evidence of a positive classification. The at least one of the explanation or the hyper-explanation can include evidence exclusively indicating a positive classification. The at least one of the explanation or the hyper-explanation can be absent evidence indicating at least one of a negative classification or a default classification. The at least one of the explanation or the hyper-explanation can include evidence indicating a default classification. The at least one of the explanation or the hyper-explanation can include an incorrect prior classification. At least one sets of training data associated with a classifier can facilitate generating the at least one of the explanation or the hyper-explanation. The at least one sets of training data can include a set of nearest neighbors that facilitates generating the at least one of the explanation or the hyper-explanation.

These and other objects, features and advantages of the exemplary embodiment of the present disclosure will become apparent upon reading the following detailed description of the exemplary embodiments of the present disclosure, when taken in conjunction with the appended claim.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 1A is an illustration of an exemplary 3-Gap framework;

FIG. 11 is an exemplary classification tree in accordance with an exemplary embodiment of the present disclosure.

Figure 1B:
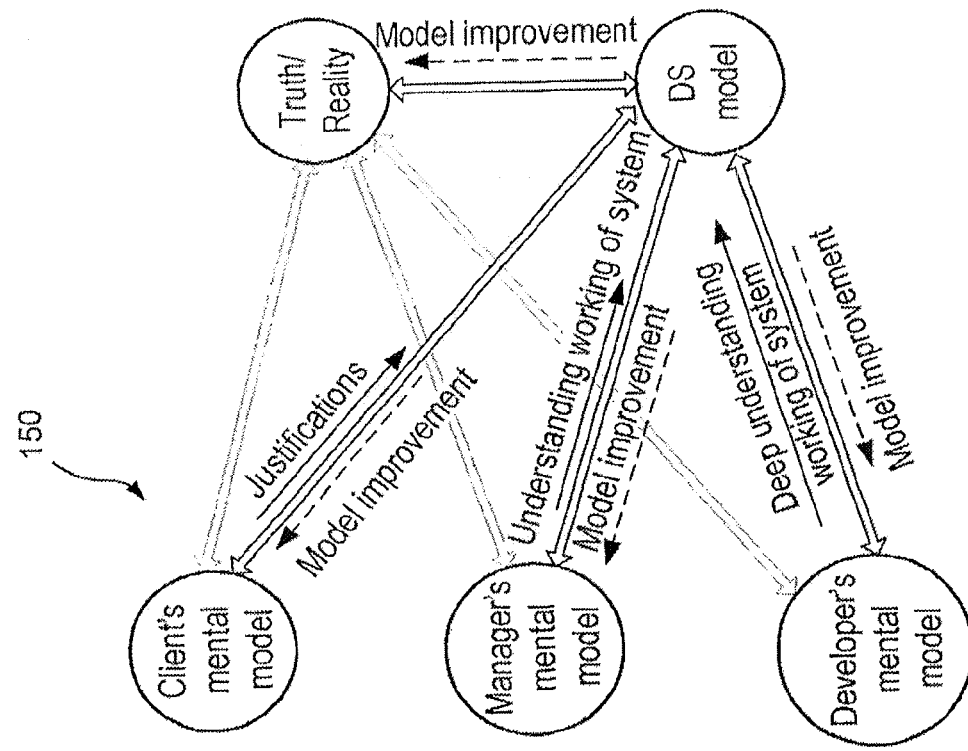
FIG. 1B is an a 7-Gap model in accordance with exemplary embodiments of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures or the claims appended herewith.

DETAILED DESCRIPTION OF EXEMPLARY EMBODIMENTS

An Exemplary Extended Gap Framework

The framework of Kayande et al. can be incomplete in two important ways, which we now will address in turn. See Kayande, U., A. De Bruyn, G. L. Lilien, A. Rangaswamy, G. H. van Bruggen. 2009. How incorporating feedback mechanisms in a DSS affects dss evaluations. Information Systems Research 20 527-546. First, Kayande et al. do not address the use of explanations (or other feedback) to improve the DS model. Technically this incompleteness is not an incompleteness in their 3-gap framework, because improving the model fits as closing Gap 2. Indeed, the publication of Kayande et al. indicates that "to provide high-quality decision support, the gap between the DSS model and the true model must be small (Gap 2)." However, in the paper, Kayande et al. focus their attention on closing Gap 1 between the user's mental model and the DS model. They justify this with the explicit assumption that the DSS model is of high objective quality (e.g., small Gap 2) and that it is of better quality than the user's mental model (e.g., large Gap 3)." It is not necessary to challenge this assumption to want or need to improve the DS model. As stated above the overarching assumption is that the DS model always performs better than the user; however, even when the model's performance generally is much better than the user's, in many applications there still are plenty of cases where the user is correct when the model is wrong. True mistakes of the model, when noticed by a user, can jeopardize user trust and acceptance.

More generally, it is unlikely that there exist any publications which focuses on a user-centric theoretical understanding of the production of explanations with a primary goal of improving data-driven models based on feedback and iterative development. This is important because as model-based systems increasingly are built by mining models from large data, users may have much less confidence in the model's reasoning than with hand-crafted knowledge-based systems. There are likely to be many cases where the decisions are erroneous due either to biases in the process, or to overfitting the training data (Hastie et al. 2001). As pointed out by Gregor and Benbasat (1999), a user will want to request an explanation when she perceives an anomaly. The resultant explanation can assist the user to learn about how the world works (Kayande et al. 2009), and thereby improve acceptance. However, it alternatively may lead to the identification of a flaw in the model, and lead to a development effort focused on improving the model. At a higher level, this ability for the users and the developers to collaborate on fixing problems with the system's decision-making may also improve user acceptance, because the user sees herself as an active, integral part of the system development, rather than a passive recipient of explanations as to why she is wrong about the world. Therefore, according to an exemplary embodiment of the present disclosure, a first extension to the 3-gap framework can be that explanations can be used to improve the model—closing Gap 2 (and Gap 1) in the other direction—as well as to improve user understanding.

This can leads to an exemplary second important incompleteness in the 3-gap framework of Kayande et al. Specifically, the 3-gap framework considers a single, monolithic "user" of the decision system. We contend that to better understand the uses of explanations in the context of information systems practices within contemporary organizations, we need to differentiate between different roles of people who interact with the decision system. Different roles can be review, rather than different sorts of people, because in some contexts the same person may play more than one of the roles. In order to understand how explanations are or should be used, there are at least three different roles that are important to distinguish: developers, managers, and customers.

Figure 1C:
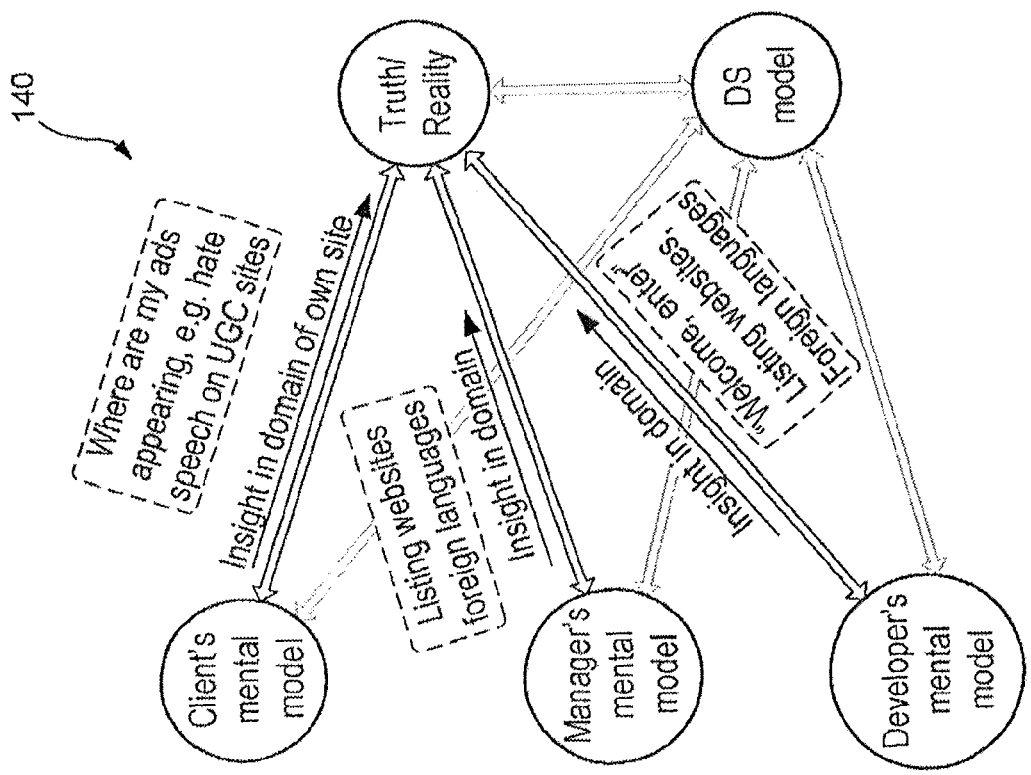
FIG. 1C is another 7-Gap model in accordance with another exemplary embodiments of the present disclosure.

FIGS. 1B and 1C illustrate a 7-gap extension to Kayande et al.'s 3-gap framework. The extended framework makes three contributions beyond those of the prior framework. First, as just described, it can clarify the bidirectional nature of the gap closing that can be achieved via explanations: explanations can lead to changes in user mental models; they also can lead to changes in the DS model. Second, the extended framework divides out three different user roles. Each of these different roles has different needs and uses for explanations. Third, the extended framework distinguishes between two quite different sorts of user understanding, which both are important: understanding reality better, and understanding the DS model better.

Further, FIG. 1C illustrates how the extended exemplary model 140 breaks apart the closing of the gap between the different user roles and reality. In each case, explanations of Classifications can give the user insight into the problem domain. However, although customers, managers, and developers all need to accept the DS model, "acceptance" can mean different things for each of these roles. For example, an application of web page Classification for safe advertising, explanations of why ads are blocked on certain pages can increase a customer's understanding of the sorts of pages on which her ads are being shown (a difficult task in modern online display advertising). If this includes hate speech pages on user-generated content sites, this may substantially increase the user's acceptance of the need in the first place for the DS. Managers seeing explanations of blocked pages can better understand the landscape of objectionable content, in order to better market the service. Developers can better understand the need for focused data collection, in order to ensure adequate training data for the Classification problems faced (Attenberg and Provost 2010, Attenberg et al. 2011). In sum, assuming (as indicated in the publication by Kayande et al.) that the DS model is relatively close to reality, a better understanding of the domain should improve acceptance by customers and managers, marketing and sales by managers, and efficiency and efficacy of developers.

FIG. 1B and model 150 illustrate exemplary gaps between the users' mental models and the DS model. The solid-line arrows (moving mental models toward the DS model) break apart different sorts of understanding that underlie the gap closing that explanations may provide, inherent in the treatment by Kayande et al. In the case of data-driven statistical models, e.g., all of the different user roles may need to achieve some level of understanding of the decision system, in order to improve acceptance (in line with prior research discussed above). As shown at the top of the figure, clients/customers may need to have the specific decisions of the system justified. As represented by the middle gap, managers may need to understand the workings of the DS model: customer-relationship managers need to deal with customer queries regarding how decisions are made. Even in applications for which black-box systems are deployed routinely, such as fraud detection (Fawcett and Provost 1997), managers still need to understand and have confidence in the operation of the system (middle gap) and may need to explain to customers reasons for particular Classification s when errors are made. Operations managers need to "sign off" on models being placed into production, and prefer to understand how the model makes its decisions, rather than just to trust the technical/data science team. Development managers may need to understand specific decisions when they are called into question by customers or business-side employees. Finally, (bottom gap) the technical/data science developers themselves need to understand the reasons for decisions in order to be able to debug and improve the models (discussed next). Wholistic views of a model and aggregate statistics across a "test set" may not give sufficient guidance as to what exactly is wrong and how the model can and should be improved.

The dashed-line arrows (emanating from the DS model) of FIG. 1B represent gap-closing in the other direction, by improving the DS model. The explanation methods introduced in this paper can have a substantial impact on improving document Classification models from the users' perspectives. Despite the stated goals of early research on data mining and knowledge discovery (Fayyad et al. 1996), small amount of work has addressed support for the process of building acceptable models, especially in business situations where various parties must be satisfied with the results. Presently, a strong research focus is observed on using advanced statistical models that mimic a certain behavior in the real world, without understanding the meaning of that behavior (Norvig, P. 2011. On Chomsky and the two cultures of statistical learning. Http://norvig.com/chomsky.html). The design we introduce provides such support. The DS model can move closer to the mental models of people playing each of the different user roles, to the extent that they were correct on the specific flaws that were improved upon. These gap closings can also improve acceptance. Possibly equally important for acceptance would be the increase in the users' perception that the model can be improved when necessary.

When improved, the exemplary model is likely also to move closer to reality (the vertical dashed-line arrow). This can be because since there is a gap between each user's mental model and reality, it may be that moving the model closer to the mental model of some user actually moves it further away from reality. For example, the "true" classifications of documents can be subjective in certain domains, and it can be that a broadly used classification system changes the accepted subjective class definitions. Further, in dynamic domains, the production of documents may co-evolve with system development and usage. Authors may write documents differently based on their knowledge of the algorithms used to find or process them.

The extended gap model can also highlights the existence of the vertical gaps between user roles. Closing these gaps also is important to DS development (see e.g., Sambamurthy, V., M. S. Poole. 1992. The effects of variations in capabilities of gdss designs on management of cognitive conflict in groups. Information Systems Research 3(3) 224-251, Barki, H., J. Hartwick. 2001. Interpersonal conflict and its management in information system development *MIS Quarterly* 25(2) 195-22). For example, to avoid conflicts managers and developers should have similar mental models. Producing good explanations may address these gaps indirectly, as closing the gaps between the user roles and reality and between the user roles and the DS model may act naturally to close these vertical gaps between user mental models.

Exemplary Explanation of Documents' Classifications

Prior research has examined two different sorts of "explanation" procedures for understanding predictive models: global explanation and instance-level explanation. Global explanations can provide insight into the complete model, and its performance over an entire space of possible instances. Instance-level explanations can provide explanations for the model's classification of an individual instance—which is our focus. However, existing methods are not ideal (or not suitable) for explaining document classification. Accordingly, exemplary embodiments of the present disclosure can provide a new approach that addresses the drawbacks. First, described herein below are some aspects of document classification.

Exemplary Aspects of Document Classification

As digital text document repositories proliferate (Besides the Web, e.g., Facebook, and the hidden web (Raghavan, S., H. Garcia-Molina, 2001, "Crawling the hidden web", Proceedings of the International Conference on Very Large Data Bases. Citeseer, 129-138), Google's efforts to scan printed books, which has already led to 12 million digital books (Google, 2010, "Our commitment to the digital humanities", The official Go ogle blog, http://googleblog.blogspot.com/2010/07/our-commitment-to-digital-humanities.html)) and grow, the automated analysis of text documents can become both an opportunity and a requirement—with the exemplary safe advertising example illustrating both. Text mining can be defined as the "application of procedures and methods from the fields machine learning and statistics to texts with the goal of finding useful patterns" (e.g, Hotho, A., A. Nürnberger, G. Paass, 2005, "A brief survey of text mining", LDV Forum 20(1) 19-62). Specifically focusing on textual document classification, where the value of a discrete target variable is predicted based on the values of a number of independent variables representing the words (Technically, text document classification applications generally use "terms" that include not only individual words, but phrases, n-grams, etc., which will al be referred to as "words."). Applications of document classification are widespread. Examples include: sentiment analysis, where one tries to estimate the sentiment or opinion of a user based on some text-based document such as a blog or online review entry (e.g., Pang, B., L. Lee, 2008, "Opinion mining and sentiment analysis", Foundations and Trends in Information Retrieval 2(1-2) 1-135); classifying emails, websites, etc., as being spam or not (e.g., Attenberg, J., K. Q. Weinberger, A. Smola, A. Dasgupta, M. Zinkevich, 2009, "Collaborative email-spam filtering with the hashing-trick", Sixth Conference on Email and Anti-Spam (CEAS)); the automated annotation of news articles and other documents to help retrieval (e.g., Paaβ, G., H. de Vries, 2005, "Evaluating the performance of text mining systems on real-world press archives"); classifying web pages to improve the safety of on-line advertising or to improve the relevance of advertising.

There are several ways in which document classification can differ from traditional data mining for common applications such as credit scoring, medical diagnosis, fraud detection, churn prediction and response modeling. First, the data instances typically have less structure. Specifically, an instance is simply a sequence of words and for most document classification applications the sequential structure is ignored, resulting in simply a bag (multiset) of words. In contrast, traditionally classifier induction is applied to structured data sets, where each instance for classification is represented as a feature vector: a row from a database table with the values for a fixed number of variables. Technically, one can engineer a feature representation from the sequence or bag of words, but this leads to another difference. In a feature-vector representation of a document data set, the number of variables is the number of words (e.g., phrases, n-grams, etc.), which can be orders of magnitude larger than in the "standard" classification problems presented above. Third, the values of the variables in a text mining data set typically denote the presence, frequency of occurrence, or some positively weighted frequency of occurrence of the corresponding word.

These three aspects of document classification are important for the explanation of classifier decisions. The first two combine to render existing explanation approaches relatively useless. The third, however, presents the basis for the design of the exemplary solution. Specifically, with such document classification representations, removing words corresponds to reducing the value of the corresponding variable or setting it to zero.

A related aspect of the exemplary problem reappears later: when performing data mining for document classification, the ultra-high dimensionality typically requires a focus on overfitting—e.g., avoiding building a model that incorporates the noise or random variation present in a particular data set. Understanding what particular overfitting a model incorporates can be difficult—especially so if one cannot explain the individual decisions made by the model. Thus, the exemplary solution can have an auxiliary benefit of helping to build better models.

A number of technical details of document classification can be important to understand the exemplary techniques. As preprocessing, non-textual symbols, such as, e.g., punctuations, spaces or tabs, can be removed from each document. The set of the different words present in the documents, constitutes a dictionary. For a set of n documents and a vocabulary of m words, a data set of n×m can be created with the value on row i and column j, which denotes the frequency of word j in document i. As such, each document is described by a numerical row vector. As most of the words available in the vocabulary may not be present in any given document, most values are zero, and a sparse representation is used. Preferably, a weighting scheme can be applied to the frequencies, where the weights reflect the importance of the word for the specific application (e.g., Hotho, A., A. Nürnberger, G. Paass, 2005, "A brief survey of text mining", LDV Forum 20(1) 19-62). A commonly used data-driven weighting scheme is tfidf, where the weight of a word is the "inverse document frequency," which describes how uncommon the word is: $idf(w_j)=\log(n/n_j)$ with $n_j$ the number of documents that contain word $w_j$.

$$x_{ij}=tf_{ij} \times idf_j \quad (1)$$

Classification models can be generated using a training set of labeled documents, where "labeled" means that for the training set, the value of the "target" variable (e.g., the dependent variable being predicted/estimated) is known. The resultant classification model, or classifier, can map any document to one of the predefined classes, and more specifically, can generally map it to a score representing the likelihood of belonging to the class, and this score can be compared to a threshold for classification. Based on an independent test set, the performance of the model can be assessed by comparing the true label with the predicted label. As the test data are not used for building (e.g., training) the model, an unbiased performance assessment can be obtained. To reduce the complexity of the modeling problem, sometimes a subset of all possible words is selected.

Frequently used techniques for document classification include, e.g., naive Bayes, logistic regression, and linear support-vector machines, providing linear models. Other common techniques include versions of nearest neighbor classification, classification trees, ensembles of trees (e.g., using boosting (Schapire, Robert E., Yoram Singer, 2000, "Boostexter: A boosting-based system for text categorization", Machine Learning 39(2/3) 135-168)), and non-linear support vector machines (e.g., Feldman, R., J. Sanger, 2008, "The Text Mining Handbook", Cambridge University Press). A linear model for text classification is of the familiar format given by Eq. (2).

$$y_{lin}(x)=b_0+b \cdot x \quad (2)$$

A given document x can be classified by multiplying the tfidf value $x_{ij}$ of each word (term frequency of each word within the document $tf_{ij}$ multiplied by the inverse document frequency of the term $idf_j$) with the coefficient of the corresponding word. The coefficients are estimated during training. The support vector machine (SVM) technique, generating models as shown in Eq. (3), can be shown often to perform quite well for document classification, as it can employ regularization to control the complexity of the model.

$$y_{SVM}(x)=\Sigma i=1:n \; \alpha_i \; y_i K(x_i,x)+b_0 \quad (3)$$

As discussed above, this is important given the high dimensionality of the data set. The form of the model learned by an SVM depends of the (user's) choice of the kernel $K(x_i,x)$. One typically has the following choices:

$$K(x,x_i)=x^T i x, \text{(linear kernel)}$$

$$K(x,x_i)=(1+x^T i x/c)d, \text{(polynomial kernel)}$$

$$K(x,x_i)=\exp\{-\|x-x_i\|^2/\sigma^2\}, \text{(RBF kernel)}$$

$$K(x,x_i)=\tan h(\kappa x^T i x+\Theta), \text{(MLP kernel)},$$

where d, c, σ, κ and Θ are constants determined by the user or empirically via techniques such as, e.g, cross-validation. The non-linear kernel SVM is able to capture non-linearities that can be present in the data. However, the resultant document classification model can be difficult to comprehend: one can no longer state that the appearance of a word increases or decreases the probability of being assigned a class.

Exemplary Global Explanations

A common approach to understanding a predictive model is to examine the coefficients of a linear model. Unfortunately such an approach is impracticable for a model with $10^4$ to $10^6$ variables. For such applications, a common approach for a linear model is to list the variables (e.g., words) with the highest weights. To understand more complex models such as neural networks (e.g., Bishop 1996) and non-linear support-vector machines (SVMs) (e.g., Vapnik, V. N. 1995, "The nature of statistical learning theory", Springer-Verlag New York, Inc., New York, N.Y., USA), a possible approach is rule extraction: e.g., rules or trees can be extracted that mimic the black box as closely as possible (e.g., Andrews, R., J. Diederich, A. Tickle, 1995, "Survey and critique of techniques for extracting rules from trained artificial neural networks", Knowledge Based Systems 8(6) 373-389; Craven, M. W., J. W. Shavlik, 1996, "Extracting tree-structured representations of trained networks"; Martens, D., T. Van Gestel, B. Baesens, 2009, "Decompositional rule extraction from support vector machines by active learning", IEEE Transactions on Knowledge and Data Engineering 21(2) 178-191). A motivation for using rule extraction is to combine the desirable predictive behavior of non-linear techniques with the comprehensibility of decision trees and rules. Previous benchmarking studies have revealed that when it comes to predictive accuracy, non-linear methods often outperform traditional statistical methods such as, e.g., multiple regression, logistic regression, naive Bayesian and linear discriminant analysis (see, e.g., Baesens, B., T. Van Gestel, S. Viaene, M. Stepanova, J. Suykens, J. Vanthienen, 2003b, "Benchmarking state-of-the-art classification algorithms for credit scoring", Journal of the Operational Research Society 54(6) 627-635, Lessmann, S., B. Baesens, C. Mues, S. Pietsch, 2008, "Benchmarking classification models for software defect prediction: A proposed framework and novel findings", IEEE Transactions Software Engineering 34(4) 485-496). For some applications however, e.g., medical diagnosis and credit scoring, an explanation of how the decision can be reached by models obtained by these techniques can be crucial to business and sometimes can be a regulatory requirement. Previous research in rule extraction first focused primarily on artificial neural networks (ANN), see for example Andrews, R., J. Diederich, A. Tickle, 1995, "Survey and critique of techniques for extracting rules from trained artificial neural networks", Knowledge Based Systems 8(6) 373-389; Baesens, B., R. Setiono, C. Mues, J. Vanthienen, 2003a, "Using neural network rule extraction and decision tables for credit-risk evaluation", Management Science 49(3) 312-329; and Craven, M. W., J. W. Shavlik, 1996, "Extracting tree-structured representations of trained networks". As support-vector machines have gained popularity as attractive alternatives to ANNs, and given their often-outstanding predictive performance, rule extraction from SVMs has become a main focus of current rule extraction research, see e.g. Jacobsson, H.2005, "Rule extraction from recurrent neural networks: A taxonomy and review", Neural Computation 17 1223-1263; Fung, G., S. Sandilya, R. B. Rao, 2005, "Rule extraction from linear support vector machines", Proceedings of the 11th ACM SIGKDD international Conference on Knowledge Discovery in Data Mining. 32-40; Barakat, N. H., A. P. Bradley, 2007, "Rule extraction from support vector machines: A sequential covering approach", IEEE Transactions on Knowledge and Data Engineering 19(6) 729-741; Martens, D., B. Baesens, T. Van Gestel, J. Vanthienen, 2007, "Comprehensible credit scoring models using rule extraction from support vector machines", European Journal of Operational Research 183(3) 1466-1476. An overview of SVM rule extraction techniques can be found in, e.g., Martens, D., T. Van Gestel, B. Baesens, 2009, "Decompositional rule extraction from support vector machines by active learning", IEEE Transactions on Knowledge and Data Engineering 21(2) 178-191.

An exemplary baseline rule extraction approach is to replace the given class labels of data instances with those provided (e.g., predicted) by the black box model. By applying a rule or tree induction technique on this new data set, the resulting model is a comprehensible tree or rule set that can explain the functioning of the black box model. Generally the complexity of the tree or rule set increases with its fidelity—the proportion of instances for which the extracted rules can make the same prediction as the black box model. More advanced extraction approaches also rely on intelligent artificial data generation (e.g., Craven, M. W., J. W. Shavlik, 1996, "Extracting tree-structured representations of trained networks"; Martens, D., T. Van Gestel, B. Baesens, 2009, "Decompositional rule extraction from support vector machines by active learning", IEEE Transactions on Knowledge and Data Engineering 21(2) 178-191).

These rule extraction approaches are not suitable for the exemplary problem for several reasons. Not all classifications can be explained by these rule extraction approaches. Additionally, for some instances that seem to be explained by the rules, more refined explanations can exist. In addition, often one is typically only interested in the explanation of the classification of a single data instance—for example, because it has been brought to a manager's attention because it has been misclassified or simply because additional information can be required for this case. This can be accepted in certain non-text domains. For example, for credit scoring, where predictive models are used across the industry, strict regulations exist concerning the explainability of credit decisions. For example, when credit has been denied to a customer, the Equal Credit Opportunity Act of the US requires that the financial institution provide specific reasons why the application was rejected; indefinite and vague reasons for denial are illegal (Federal Trade Commission for the Consumer. March 1998, "Facts for consumers: Equal credit opportunity", Tech. rep., FTC). A general explanation model does not necessarily provide a specific explanation of any particular instance. The requirement for instance-level explanations can actually restrict the sorts of models that can be used for credit scoring; linear models with small numbers of variables are used even when more complex models could produce more profitable credit decisions (if explainability were to be ignored).

In addition, global explanations do not typically provide much insight for document classification anyway, because of the massive dimensionality. For a classification tree to remain readable it typically can not include thousands of variables (or nodes). Similarly, listing these thousands of words with their corresponding weights for a linear model may not provide much insight into individual decisions. An explanation approach focusing on individual classifications would be preferred. Considering the exemplary running example of web page classification for safe advertising, what can be desired is 'Why did the model classify this web page as containing objectionable content?'

Exemplary Instance-Level Explanations

Over the past few years, instance explanation methods have been introduced that explain the predictions for individual instances (e.g., Robnik-Sikonja, M., I. Kononenko, 2008, "Explaining classifications for individual instances", IEEE Transactions on Knowledge and Data Engineering 20 589-600; Strumbelj, E., I. Kononenko, M. Robnik-Sikonja, 2009, "Explaining instance classifications with interactions of subsets of feature values", Data & Knowledge Engineering 68(10) 886-904; Strumbelj, E., I. Kononenko, 2010, "An efficient explanation of individual classifications using game theory"; Journal of Machine Learning Research 11 1-18; Baehrens, David, Timon Schroeter, Stefan Harmeling, Motoaki Kawanabe, Katja Hansen, Klaus-Robert Müller, 2010, "How to explain individual classification decisions", Journal of Machine Learning Research 11 1803-1831). Generally, these methods provide a real-valued score to each of the variables that indicates to what extent it contributes to the data instance's classification. This definition of an explanation as a vector with a real-valued contribution for each of the variables can make sense for many classification problems, which often have relatively few variables (e.g., the median number of variables for the popular UCI benchmark datasets is 18.5 (Hettich, S., S. D. Bay, 1996, "The uci kdd archive", http://kdd.ics.uci.edu). For document classification, however, due to the high-dimensionality of the data, this sort of explanation may not be ideal—and possibly not useful at all. Considering the exemplary safe-advertising data set, an explanation for a web page's classification as a vector with thousands of non-zero values can hardly be considered comprehensible. Although the words with the highest contributions can have the biggest impact on the classification, which (combination of) words actually led to any given classification is still unknown.

Aside from the unsuitable format of these previous explanations, previous instance-based explanation approaches can be unable to handle high dimensional data computationally. The sample-based approximation method of Strumbelj, E., I. Kononenko, 2010, "An efficient explanation of individual classifications using game theory", Journal of Machine Learning Research 11 1-18, is reported to be able to handle up to about 200 variables—even there requiring hours of computation time. For such data sets, other approaches can be introduced: For example, providing a comprehensible explanation involving a hundred or more features is a problem in its own right and even inherently transparent models become less comprehensible with such a large number of features (Strumbelj, E., I. Kononenko, 2010, "An efficient explanation of individual classifications using game theory", Journal of Machine Learning Research 11 1-18).

Because of this inability to deal with the high-dimensionality of text mining data sets, as well as the explanation format as a real-valued vector, these methods are not applicable for explaining documents' classifications.

In focusing on document classification, certain observations can be employed to define a slightly different problem from that addressed by prior work, that addresses the motivating business needs and that we will be able to solve efficiently. The first observation is that in many document classification problems there really can be two quite different explanation problems. One of them is: why documents were classified as a particular focal class (a "class of interest"). Considering the exemplary web page classification setting, a focus can be on explaining why a page has received (rightly or wrongly) a "positive" classification of containing objectionable content. The asymmetry is due to the negative class being a default class: if there is no evidence of the class of interest (or of any of the classes of interest), then the document is classified as the default class. The question of why a particular page has not received a positive classification can be important as well, but reflection tells us that it can be indeed a very different problem. Often the answer can be "the page did not exhibit any of the countless possible combinations of evidence that would have led the model to deem it objectionable." The problem here generally is "how do I fix the model given that I believe it has made an error on this document." This is a fundamentally different problem and thereby can require a very different solution—for example, an interactive solution where users try to explain to the system why the page should be a positive, for example using dual supervision (e.g., Sindhwani, Vikas, Prem Melville, 2008, "Document-word co-regularization for semi-supervised sentiment analysis", ICDM), or a relevance feedback/active learning systems where chosen cases are labeled and then the system is retrained. These can be important problems.

A second observation is that in contrast to the individual variables in many predictive modeling tasks, individual words are quite comprehensible. Thus, in this document classification context, an explanation can be defined as a set of words present in the document such that removing the occurrences of these words can result in a different classification (defined precisely below). The innate comprehensibility of the words often will give deep intuitive understanding of the explanation. Further, when it does not it can indicate problems with the model. Under this definition, the minimal explanation or the set of minimal explanations for a document can be interesting.

Figure 1D:
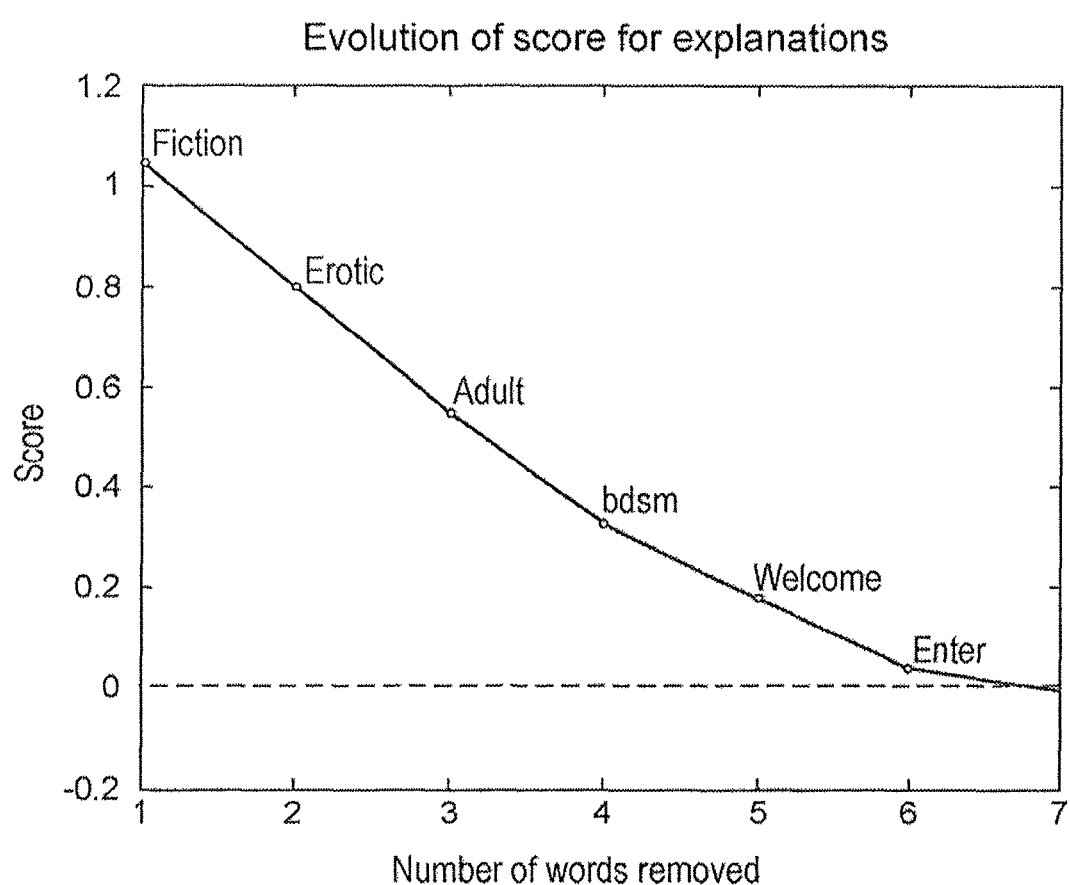
FIG. 1D is an exemplary graph of model score evolution when removing words from a document in accordance with exemplary embodiments of the present disclosure.

Another observation is that in document classification, removing occurrences of a word sets the corresponding variable's value to zero. This can facilitate formulation of an optimization problem for which solutions can be found. An exemplary explanation for a real instance in a safe advertising application was given above in Explanation 1. For a given web page that is classified by the document classification model as having adult content, removing the given six words changes the class to non-adult. FIG. 1D illustrates this explanation in more detail, showing how the output score of a model (e.g., in this case a linear SVM model) changes when removing subsets of words of increasing size. The class changes to non-adult when the output score falls below zero. The shown set is minimal, in the sense that no subset exists that changes the class of the web page. The graph shows that the largest decrease is given by 'fiction', closely followed by 'erotic'. The exemplary experimental setup will be described in detail when discussing the empirical analysis herein below.

1.1 Exemplary Explanation of Classification of Documents

As discussed above, the question addressed for document classification can include 'Why is this document classified as the non-default class?' or considering the exemplary safe advertising example application specifically 'Why is this web page classified as containing objectionable (here adult) content?' To answer this question, an explanation can be provided as a set of words present in the document such that removing these words causes a change in the class. When the words in the explanation are removed the class can change, and as such, the set can be minimal.

To define an exemplary explanation formally tailored to document classification (see, e.g., Definition 1) a document D is typically represented as a bag (multiset) of words. Let $W_D$ be the corresponding set of words. The classifications are based on some classifier CM, which is a function from documents to classes. Later, the exemplary heuristic algorithm presumes that CM can incorporate at least one scoring function fCM; classifications are based on scores exceeding thresholds (in the binary case), or choosing the class with the highest score (in the multiclass case). The majority of classification algorithms operate in this way.

Definition 1. Given a document D including $m_D$ unique words $W_D$ from the vocabulary of m words: $W_D=\{wi, i=1, 2, \ldots, mD\}$, which are classified by classifier CM: D→{1, 2, . . . , k} as class c. An explanation for document D's classification as a set E of words such that removing the words in E from the document leads CM to produce a different classification. Further, an explanation E is minimal in the sense that removing any subset of E does not yield a change in class. Specifically:

E is an explanation for CM(D)⇔
1. $E \subseteq W_D$ (the words are in the document),
2. CM(D\E)≠c (the class changes), and
3. ∄ E' ⊂ E|CM(D\E')≠c (E is minimal).

D\E denotes the removal of the words in E from document D.

Definition 1 is tailored to document classification. It can provide intuitive explanations in terms of words (phrases) present in the document, and such explanations can be produced even in the massively dimensional input spaces typical for document classification. For example, Definition 1 differs from prior approaches in that the explanation is a set of words rather than a vector. Define the size of the explanation as the cardinality of E. Exemplary empirical analysis reveals that explanations typically are quite small (often about a dozen words) and as such the technique is able to effectively transform the high-dimensional input space to a low-dimensional explanation. As stated before, this can be of importance in order to provide insightful explanations that address the business problems at hand, e.g., managers' needs to understand classifiers' behavior, explaining the decisions made to the manager or customer, obtaining insights into the specific domain, or improving the document classification model's performance.

An aspect of exemplary embodiments of the present disclosure can align with that of inverse classification (Mannino, M., M. Koushik, 2000, "The cost-minimizing inverse classification problem: A genetic algorithm approach", Decision Support Systems 29 283-300). However, the explanation format, the specific optimization problem, and the search algorithms are quite different. First, for document classification, typically, only reducing the values for the corresponding variables may have to be considered. Increasing the value of variables may not make sense in this setting. For example, in the case of classifying web pages as having adult content or not, simply adding words as 'xxx' would likely increase the probability of being classified as adult. This is valid for all documents and does not really explain the document's classification. Secondly, step sizes for changes in the values do not need to be decided, as removing the occurrences of a word corresponds to setting the value to zero. In the optimization routine of inverse classification, the search is finding the minimal distance for each dimension. The optimization is very different for explanations of documents' classification. Third, applying inverse classification approaches to document classification generally is not feasible, due to the huge dimensionality of these data sets. The exemplary approach can take advantage of the sparseness of document representations, and can consider those words actually present in the document. Finally, an exemplary general framework to obtain explanations independent of the classification technique used can be provided.

The desire to be model-independent is important. For document classification, non-linear, black-box models are often used, such as non-linear SVMs (e.g., Joachims, T. 1998, "Text categorization with support vector machines: Learning with many relevant features", European Conference on Machine Learning (ECML). Springer, Berlin, 137-142) or boosted trees (e.g., Schapire, Robert E., Yoram Singer, 2000, "Boostexter: A boosting-based system for text categorization", Machine Learning 39(2/3) 135-168). These models are often incomprehensible. Explaining the decisions made by such techniques to a client, manager, or subject-matter expert can be of great value and a natural application of the exemplary framework. When a linear model is being used, one could argue simply to list the top k words that appear in the document with the highest positive weights as an explanation for the class (e.g., assuming that the explanation is class 1 versus class 0). The choice of k can be set to 10, for example. A more suitable choice for k can be the minimal number of top words such that removing these k words leads to a class change. This is what the exemplary approach can provide with a linear model.

Further, although they are often cited as producing comprehensible models, classification trees for document classification typically do not provide the sort of explanations needed (as in Definition 1): e.g., they do not explain what words actually are responsible for the classification. The words from the root to the specific leaf for this document may be important for the classification, but some of these words are likely not present in the document (the path branched on the absence of the word) and which (minimal) set of words actually is responsible for the given classification is not known.

Considering Definition 1, FIG. 1D can be revisited, which shows how the output score of a model (in this case a linear SVM model) changes when removing a set of words of increasing size. It shows that the largest decrease is given by 'fiction', closely followed by 'erotic'. When the six words are removed, the score falls below zero and the class can change to non-adult. For a web page with 36 words (e.g., from the model vocabulary), clear insights into its classification can be obtained. Note that the requirement of a minimal set does not mean that only one possible explanation exists. Multiple explanations can be constructed which are all minimal sets, as shown by the three example explanations for the same web page given in Exemplary Explanation 2. The output shows how the predicted score changes from a positive value (and hence classified as adult) to a negative value (non-adult) by removing the given words, along with the duration in seconds needed to obtain the explanations.

Figure 2:
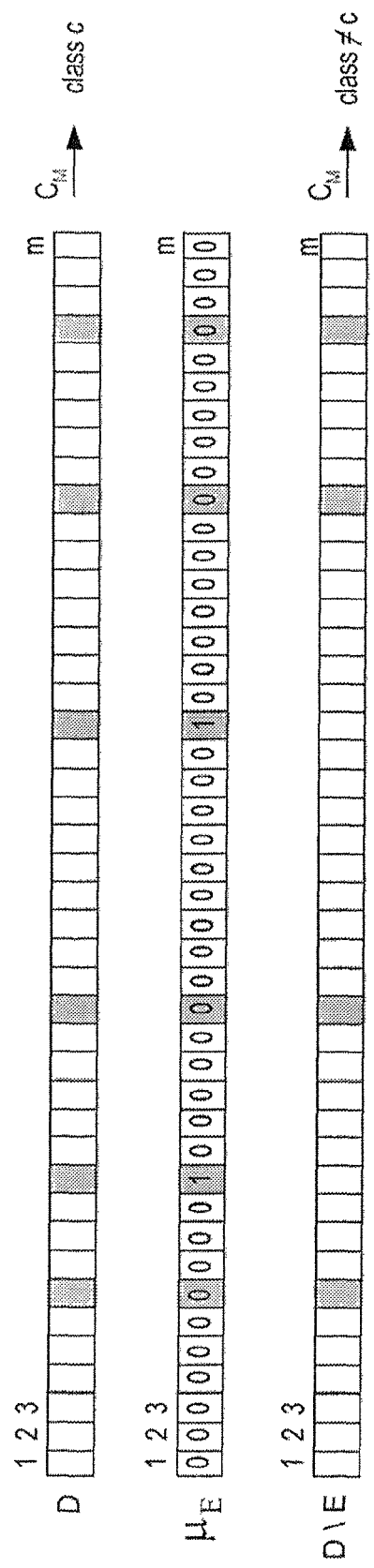
FIG. 2 is an illustration of an exemplary representation of an explanation in accordance with an exemplary embodiment of the present disclosure.

Exemplary Explanation 2: Several example explanations for one web page classified as having adult content.
Explaining document 35 (class 1) with 36 features and class 1 . . . .
Iteration 6 (from score 1.04836 to −0.00848977): If words (welcome fiction erotic enter bdsm adult) are removed then class changes from 1 to −1 (0 sec)
Iteration 6 (from score 1.04836 to −0.10084): If words (welcome fiction erotica erotic bdsm adult)
are removed then class changes from 1 to −1 (1 sec)
Iteration 6 (from score 1.04836 to −0.0649064): If words (welcome kinky fiction erotic bdsm adult) are removed then class changes from 1 to −1 (1 sec)
Exemplary Determination of Document Classification Explanations The discussions above can allow understanding of the problem more precisely from an optimization perspective. Unlike the settings in prior work, here the shortest paths in the space defined by word presence can be sought, based on the effect on the surface defined by the document classification model—which is in a space defined by more sophisticated word-based features (e.g., frequency or tfidf, as described above). Conceptually, given a document vocabulary with m words, consider a mask vector $\mu$ to be a binary vector of length m, with each element of the vector corresponding to one word in the vocabulary. An exemplary explanation E can be represented by a mask vector $\mu E$ with $\mu E(i)=1 \Leftrightarrow w_i \in E$ (otherwise, $\mu E(i)=0$). Recall that the size of the explanation is the cardinality of E, which becomes the L1-norm of $\mu E$. Then $D\backslash E$ can be the Hadamard product of the feature vector of document D (which may include frequencies or tfidf values) with the one's complement of $\mu E$ (In the case of a binary D, this simply becomes a bitwise NAND of D and $\mu E$.). This is illustrated, for example, in FIG. 2 with an exemplary explanation for a document with mD words from the vocabulary of all possible m words that can be defined as a mask vector of size mD that denotes which words should be removed in order to obtain a class change. Thus, finding a minimal explanation can correspond to finding a mask vector μE such that CM(D\E)≠CM(D) but if any bit of μE is set to zero to form E', CM(D\E')=CM(D).

Exemplary embodiments of the present disclosure provide an exemplary naïve algorithm that can be optimal, but can be computationally infeasible for realistic problems. Another exemplary embodiment of the present disclosure provides an exemplary hill-climbing algorithm that is optimal for linear classifiers and heuristic for non-linear classifiers.

Exemplary Objectives and Performance Metrics

Although Definition 1 is concise, exemplary objectives for an exemplary algorithm searching for such explanations can vary greatly. A user may want to, for example:

1. Find a minimum-size explanation: an explanation such that no other explanation of smaller size exists.
2. Find all minimal explanations.
3. Find all explanations of size smaller than a given k.
4. Find 1 explanations, as quickly as possible (1=1 may be a common objective).
5. Find as many explanations as possible within a fixed time period t.

Exemplary combinations of such objectives can also be of interest. To allow the evaluation of different explanation procedures for these objectives, a set of performance metrics is preferably defined. Note that explanation accuracy is typically not a major concern: as an explanation by definition changes the predicted class, it can be straightforward to ensure that explanations produced are correct. What can be important with regards to the usefulness of an explanation (or set of explanations) is how complex the explanation is, and how long it took for the algorithm to find the explanation. With this in mind, the following performance metrics, which measure the search effectiveness, can be defined as follows in terms of how many of the to-be-explained instances' classifications were actually explained (exemplary objective 1) and the average number of explanations given for a test instance (exemplary objective 2), the complexity of the explanations (exemplary objectives 2, 3), and the computational burden in terms of the duration needed to find explanations (exemplary objectives 4, 5). For example:

Search Effectiveness:

1. PE: Percentage of test instances explained (%)
2. ANE: Average number of explanations given (number)

Explanation complexity:

3. AWS: Average number of words in the smallest explanation (number)

Computational complexity:

4. ADF: Average duration to find first explanation (seconds)
5. ADA: Average duration to find all explanations (seconds)

These exemplary performance metrics can describe the behavior of a document explanation algorithm. In a separate analysis, a domain expert can be employed to verify the explanations. Exemplary embodiments of the present disclosure can show that some explanations reveal the overfitting of the training data by the modeling procedure—which often is not revealed by traditional machine learning evaluations that examine summary statistics (error rate, area under the ROC curve, etc.).

Exemplary Enumeration of Explanations of Increasing Size

Figure 3:
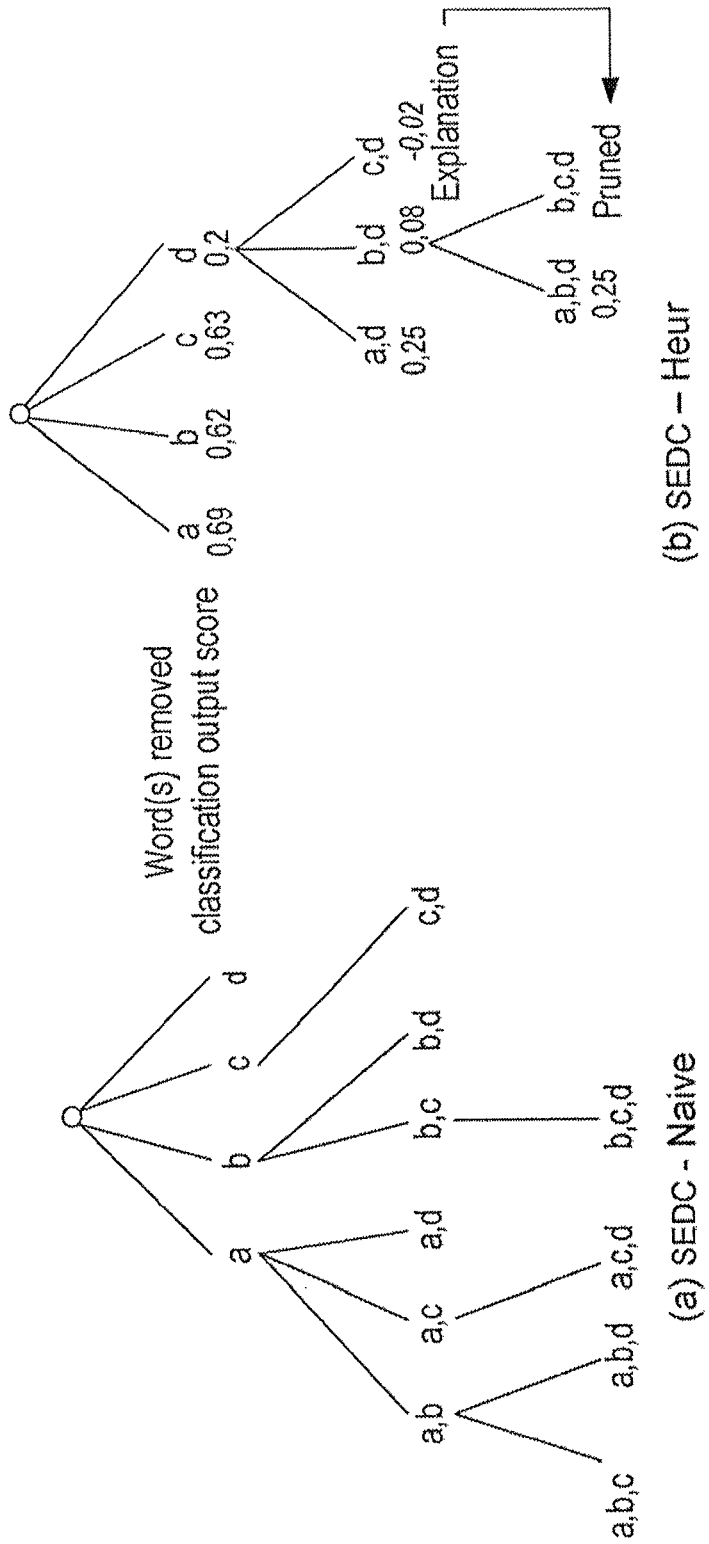
FIG. 3 is an illustration of an exemplary search tree in accordance with an exemplary embodiment of the present disclosure.

An exemplary naive approach to producing explanations includes completely enumerating all word combinations, starting with one word, and increasing the number of words until an explanation is found. This approach can start by checking whether removing one word w from the document would cause a change in the class label. If so, the explaining rule 'if word w is removed then the class changes' can be added. This can be checked for all of the words that are present in the document. For a document with mD words, this typically requires mD evaluations of the classifier. If the class does not change based on one word only, the case of several words being removed simultaneously can be considered. First, the exemplary algorithm can include, for example, considering all word combinations of size 2, then 3 and so on. For combinations of 2 words, the algorithm can make, for example, $mD \times (mD-1)$ evaluations, for all combination of 3 words, $mD \times (mD-1) \times (mD-2)$ evaluations, and more generally for combinations of k words, $mD!/(mD-k)! = O(mD^k)$ evaluations. This scales exponentially with the number of words in the document, and can become infeasible for real-world problems. FIG. 3 illustrates an exemplary search tree for SEDC-Naive (a), where all possible explanations of increasing size are investigated. For SEDC (b) the search is guided by the change in score; expansions of existing explanations are pruned. FIG. 3(a) shows the search tree for a document with four words, where all explanations of increasing size are looked at.

Exemplary Explanation of Documents' Classifications: A Hill-Climbing Approach

As the number of potential explanations scales exponentially with the number of features, the naive approach typically cannot be applied to realistic problems. Another exemplary embodiment of the present disclosure provides an exemplary straightforward, heuristic approach, formally described in Algorithm 1. It can find a solution in reasonable time, even though solution might not be the optimal, in the sense that smaller explanations could exist. (it indeed is optimal in a certain, important settings.). The approach includes two notions:

1. Exemplary Hill Climbing Search:

It can be assumed that the underlying classification model can be able to provide a probability estimate or score (No explicit mapping to [0, 1] is necessary; a score that ranks by likelihood of class membership is sufficient. The scores for different classes typically are comparable in the multiclass case, so in practice scores often are scaled to [0,1]. For example, support-vector machines' output scores are often scaled to (0,1) by passing them through a simple logistic regression (e.g., Platt, J. 1999. Probabilistic outputs for support vector machines and comparisons to regularized likelihood methods).) in addition to a categorical class assignment. This score function for classifier CM can be denoted as fCM(·). The exemplary algorithm can start by listing the potential explanations of one word, and calculating the class and score change for each. The exemplary algorithm can proceed as a straightforward hill-climbing search. Specifically, at each step in the search, given the current set of word combinations denoting partial explanations, the algorithm next can expand the partial explanation for which the output score changes the most in the direction of class change. Expanding the partial explanation can include creating a set of new, candidate explanations, including the combinations with one additional word from the document (that is not yet included in the partial explanation).

---

Exemplary Procedure 1 SEDC: Search for Explanations for Document Classification (via Hill Climbing with Pruning)

Inputs:
WD ={wi, i =1, 2, . . . ,mD} % Document D to classify, with mD words
CM :D→{1, 2, . . . , k} % Trained classifier CM with scoring function fCM
max iteration % Maximum number of iterations -continued Exemplary Procedure 1 SEDC: Search for Explanations for
Document Classification (via Hill Climbing with Pruning)

Output:
Explanatory list of rule R
1: c =CM(D) % The class predicted by the trained classifier
2: p= fCM(D) % Corresponding probability or score
3: R ={ } % The explanatory list that is gradually constructed
4: combinations_to_expand_on= set of all words
5: P_combinations_to_expand_on
6: for all words w in combinations_to_expand_on do
7:    Vw = 0 ; % As if the word did not appear in the document
8:    cnew = CM(D\VW) % The class predicted by the trained classifier
       if the word w did not appear in
       the document
9:    pnew = fCM(D\ VW) % The probability or score predicted by the
trained classifier if the word w did
       not appear in the document
       P_combinations_to_expand_on =
       P_combinations_to_expand_on ∪ pnew
10:   if cnew ≠c then
11:       R = R ∪ 'if word w is removed then class changes'
12:       combinations_to_expand_on = remove word w from
combinations_to_expand_on
13:   end if
14: end for
15: for iteration=1 to max iteration do
16:    combo = word combination in combinations_to_expand_on for
       which p − p_combinations_to_expand_on is maximal
17:    combo_set = create all expansions of combo with one word
18:    combo_set2 = remove explanations from combo_set
19:    p_combo_set2= { }
20:    for all combos Co in combo_set2 do
21:        for all words wj in Co do
22:            Vwj = 0 ; % As if the word did not appear in the document
23:        end for
24:        cnew = CM(D\VW) % The class predicted if the words W did
not appear in the document
25:        pnew = fCM(D\ VW) % The probability or score predicted by
           the trained classifier if the words W did not appear in the
           document
26:        p_combo_set2=p_combo_set2 ∪ pnew
27:        if cnew ≠c then
28:            R =R ∪ 'if words W are removed then class changes'
29:            combo_set3 = remove explanation in R from combo_set2
30:        end if
31:    end for
32:    combinations_to_expand_on = combinations_to_expand_on
       ∪ combo_set3
33:    P_combinations_to_expand_on =
P_combinations_to_expand_on ∪ p_combo_set2
34: end for Exemplary Pruning Procedure:

For each explanation with l words that is found, combinations of size l+1 with these same words typically do not need to be checked, accordingly, these branches of the search tree can be pruned. For example, if the words 'hate' and 'furious' provide an explanation, the explanations of three words that include these two words, such as 'hate', 'furious' and 'never' are typically not interesting. This pruning step is similar to the one used by algorithms for unordered set search (see Webb, G. I. 1995. OPUS: An efficient admissible algorithm for unordered search. Arxiv preprint cs/9512101 and references therein), and in similar set-enumeration algorithms, such as the Apriori association rule mining algorithm (e.g., Agrawal, R., Srikant, 1994, "Fast algorithms for mining association rules", Proc. 20th Int. Conf. Very Large Data Bases, VLDB, vol. 1215. Citeseer, 487-499).

FIG. 3(b) shows the different steps in the exemplary approach to explain the classification of a fictitious document with four words (a,b,c,d). When the classification score drops below zero, the class changes and an explanation can be provided. (In this example we assume a binary classification problem; the extension to multiclass problems can be straightforward.). Assuming that the score of the document (with no words removed) is 0.7, the workings of SEDC are as follows. In the first iteration, the change in score is calculated when removing one word. When removing word 'd' the change is the largest, hence this partial explanation will be describe further. In the second iteration, removing both 'c' and 'd' causes a class change and as such defines an explanation. The second largest change is caused by removing 'b' and 'd', which can be expanded on in the third iteration. As the combination of 'c' and 'd' is already explained, adding other words is typically no longer of interest, accordingly, the subtree rooted at 'b,c,d' can be pruned.

For the case of a linear classifier with a binary feature representation, the classification can be explained by looking at the words with the highest weights that appear in the document. However, it can be desirable to know which words may be responsible for the classification. The exemplary SEDC can produce optimal (minimum-size) explanations for linear models, which is described further herein below. Assuming an exemplary class 1 versus class 0 prediction for document j, SEDC can rank the words appearing in the document according to the product wjxij. An explanation of smallest size can be the one with the top-ranked words, as chosen by SEDC's hill-climbing search.

Exemplary Lemma 1. For document representations based on linear binary-classification models fCM(D)=β0+ Σβ jxij with binary (presence/absence) features, the smallest explanation found by SEDC is a minimum-size explanation. More specifically, for E1,E2 explanations, if E1 is the smallest explanation found by SEDC, |E1|==>∄ E2:|E2|<k. Furthermore, the first explanation found by SEDC is of size k.

Exemplary Proof (by contradiction): If no explanation exists, then the theorem can hold vacuously. For the exemplary proof, assume there exists at least one explanation. In the linear model, let the (additive) contribution wij to the output score for word j of document i be the linear model weight $w_{ij}$ corresponding to binary word-presence feature xbij for those words that are present in document i (and zero otherwise). Assume w.l.o.g. that the classification threshold is placed at fCM(D)=0. SEDC can include the first candidate explanation E* by first selecting the largest wij such that the word is present in the document, xbij=1, and adding word j to the explanation. SEDC then adds to E* the word with the next-largest such wij, and so on until fCM(E*)≤0. Thus, the first explanation E1 by construction includes the k highest-weight words that are present in the document. Now assume that there exists another explanation E2 such that |E2|<k; being an explanation, fCM(E2)≤0. Since explanations are minimal, so ∄ S ⊂ E1:fCM(S)≤0. Thus E2 includes at least one element e NOT∈E1. Let ΣE denote the sum of the weights corresponding to the words in an explanation E. For a linear model based on the (binary) presence/absence of words, fCM(X\Y)=fCM(X)−PY. As noted above, E1 includes by construction the k words with the largest wij, so ∀wij∈E1, ∀we NOT∈E1: wij≥we. Therefore, ∃S ⊂ E1,PS>PE2, which means that ∃S ⊂ E1: fCM(D\S)≤fCM (D\E2). But ∀S (E1:fCM(D\S)>0 and thus fCM(D\E2)>0. Therefore, E2 is not an explanation, a contradiction.

This optimality can apply as well to monotonic transformations over the output of the linear model, as with the common logistic transform used to turn linear output scores into probability estimates. The optimality can also apply more generally for linear models based on numeric word-based features, such as frequencies, tfidf scores, etc., as detailed in the following exemplary theorem.

Exemplary Theorem 1. For document representations based on linear models $fCM(D)=\beta+\Sigma\beta_j x_{ij}$ with numeric word-based features, such as frequencies or tfidf scores, that take on positive values when the word is present and zero when the word is absent, the smallest explanation found by SEDC is a minimum-size explanation. More specifically, for E1,E2 explanations, if E1 is the smallest explanation found by SEDC, $|E1|=k \Rightarrow \nexists$ E2: $|E2|<k$. Furthermore, the first explanation found by SEDC is of size k.

Exemplary Proof: Decompose each non-negative word feature $x_{ij}$ into the product $x_{bij} d_{ij}$ of a binary word presence/absence feature $x_{bij}$ and a document-specific non-negative weight $d_{ij}$. The corresponding term in the linear model $\beta_j x_{ij}$ then becomes $\beta_j d_{ij} x_{bij}$. The proof then follows the previous exemplary proof, except with the additive contribution of each word being $w_{ij}=\beta_j d_{ij}$.

For non-linear models no such optimal solutions are guaranteed, in the sense that smaller explanations could exist. However, good results can be obtained, both in search effectiveness, and explanation and computational cost. For multiclass classification problems optimal solutions are also not guaranteed if one decomposes the problem in several binary classification problems (as in a one-versus-rest or one-versus-one approach). The reasons is that the classification of data instances now depends on several models with their own weights: removing a word could lower the score for one class while increasing the score of another class.

Exemplary Empirical Analysis

The value of the exemplary approach to explaining document classifications through two, related empirical analyses (e.g., Hevner, A. R., S. T. March, J. Park, S. Ram, 2004, "Design science in information systems research", MIS Quarterly 28(1) 75-106) can be demonstrated. First, a case study application of the exemplary method to a data set drawn from a real application in need of evaluation is examined. The exemplary empirical results show that the exemplary method indeed can produce explanations effectively, and that alternative, global explanation techniques may not. Possibly more interestingly, the case study highlights various sorts of practical value that can be obtained from producing model-and-document-specific explanations. The case study is augmented with a shallower but broader experimental analysis based on a suite of text classification problems (the 20 Newsgroups). The followup analysis highlights how document-specific explanations can help to understand the behavior (and confusion) of a classification model that distinguishes between multiple classes, and more deeply, shows that different sub-categories receive very different explanations. That may not be surprising, but it can be difficult to ascertain from a global explanation procedure. In all, the empirical analysis demonstrates that explaining document classification with SEDC can be capable of providing important insights into the model for (1) the manager and the customer, (2) providing insight into the business domain, and (3) identifying opportunities for model improvement.

Exemplary Explaining Web Pages' Classifications for Safe Advertising

The exemplary case analysis includes data obtained from a firm that focuses on helping advertisers avoid inappropriate adjacencies between on-line advertisements and web content, similar to our motivational example above. Specifically, the analysis is based on a data set, of 25,706 web pages, labeled as either having adult content or not. The web pages are described by tfidf scores over a vocabulary chosen by the firm, including a total of, 73,730 unique words. The data set is balanced by class, with half of the pages containing adult content and half non-adult content. For this data set, the class labels were obtained, from a variety of sources used in practice, including Amazon's Mechanical Turk (www.mturk.com). Given the variety of labeling sources, the quality of the labeling might be questioned (Sheng, Victor S., Foster Provost, Panagiotis Ipeirotis, 2008, "Get another label? Improving data quality and data mining using multiple, noisy labelers", Proceedings of the 14th ACM SIGKDD International Conference on Knowledge Discovery and Data Mining (KDD 2008)). Interestingly, the explanations indeed reveal that certain web pages may be wrongly classified. In one exemplary embodiment, no metadata, links, or information on images, for example, may be used; the inclusion of such data could provide improved models in other exemplary embodiments.

For this exemplary analysis, an SVM document classification model with a linear kernel function using the LIBLINEAR package (Fan, Rong-En, Kai-Wei Chang, Cho-Jui Hsieh, Xiang-RuiWang, Chih-Jen Lin, 2008, "LIBLINEAR: A library for large linear classification", Journal of Machine Learning Research 9 1871-1874), with 90% of the data used as training data, the remaining 10% is used as test data. Experiments are run on an Intel Core 2 Quad (3 GHz) PC with 8 GB RAM. The model is correct on 96.2% of the test instances, with a sensitivity (percentage of non-adult web pages correctly classified) of 97.0%, and a specificity (percentage of adult web pages correctly classified) of 95.6%. The resulting model is a linear function, for example, with 73,730 weights (and an intercept term), one for each of the words, calling into question the potential for gaining deep insight into the model's behavior simply by examining it.

Exemplary Global explanations

As discussed above, rule extraction can be the most researched and applied model explanation methodology. Trying to comprehend the SVM model, a tree can be extracted by applying the C4.5 tree induction technique (e.g., Quinlan, J. R. 1993. C4.5: Programs for Machine Learning. Morgan Kaufmann Publishers Inc., San Francisco, Calif., USA) on the aforementioned safe advertising data set with class labels changed to SVM predicted labels, with class 1 indicating adult content. The Weka workbench (e.g., Witten, I. H., E. Frank. 2000. Data mining: practical machine learning tools and techniques with Java implementations. Morgan Kaufmann Publishers Inc., San Francisco, Calif., USA) can be used on a balanced sample (because of memory constraints) of 5000 instances with 1000 features. Unfortunately, C4.5 may not be able to generate a tree that models the SVM with high-fidelity. The best extracted tree has a fidelity, of approximately 87%. On top of that, the tree is too large to be comprehensible, having 327 nodes. Pruning the tree further could reduce the size, but further decrease fidelity.

Figure 4:
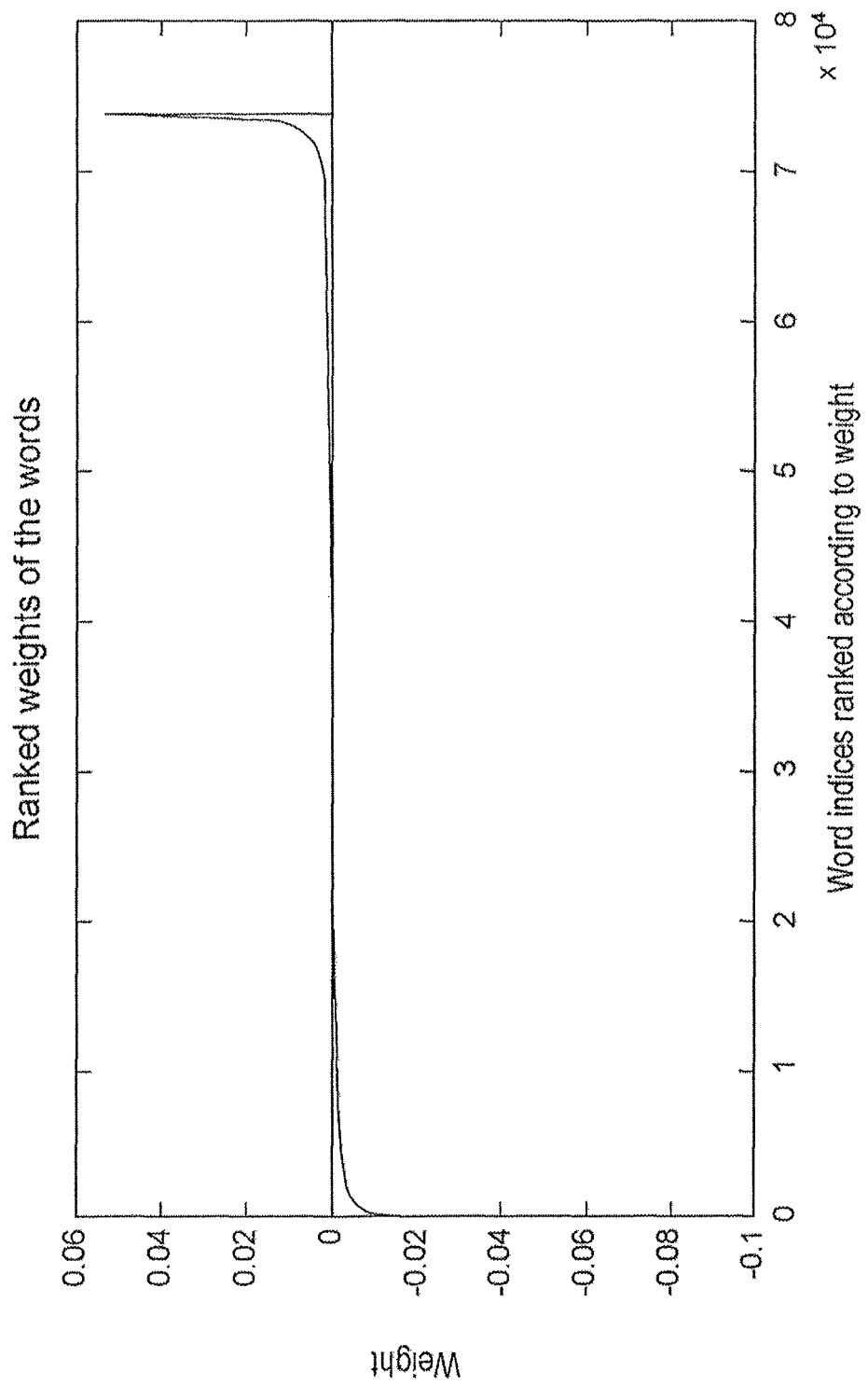
FIG. 4 is an exemplary graph of weights of words in a document in accordance with an exemplary embodiment of the present disclosure.

As discussed above, an alternative exemplary method for comprehending the function of a linear document classifier can be to examine the weights on the word features, as these indicate the effect that each word has on the final output score. As with the distinction between Exemplary Lemma 1 and Exemplary Theorem 1, during a preprocessing step, the data set is encoded in tfidf format. Hence for actual document explanations, the frequency can be vital. (The inverse document frequency is constant across documents, and is incorporated in the model weights to facilitate global explanation.). FIG. 4 shows the weight sizes of the words in the vocabulary; the weights are ranked smallest-to-largest, left-to-right. Clearly many words show a high indication of adult content, while many others show a counter-indication of adult content.

FIG. 4 suggests that the intuitive approach to global explanation, listing the top words based on the weights in the model, would indeed be strained. In FIG. 4, there are a couple thousand words with non-trivial weights. Looking deeper, Table 1 shows the highest (positive) weight words, as well as the words that give the highest mutual information (with the positive class) and information gain. Additionally, it lists the top words when taking into account the idf weights, viz., based on the weights of the words multiplied with the corresponding idf values. The final column shows the words most frequently occurring in the explanations, which will be discussed further herein below. Table 3 shows the ranks of some adult-indicative words provided independently by a domain expert.

From Table 1, the most indicative words for adult content ranked highly using the mutual information criterion are typically very rare, unintuitive words. These are words that occur in very few documents that happen to be adult content documents. It may be possible to engineer a better information-based criterion, for example countering this overfitting behavior by preferably requiring a minimal frequency of the top ranked words, however, such efforts ultimately may be destined to fail to provide a comprehensive explanation. The top words provided by the other rankings on the other hand, are generally intuitive. Even initially not-so-obvious words, such as, e.g., 'welcome', 'enter', 'age' or 'warning' make sense since many positive examples are entrance pages of adult sites, which inform a visitor about the content of the website and require verification of age. Nevertheless, explanations of individual decisions can simply require too many individual words. Consider that a list of over 700 of the highest-weight words would be produced to include 'porn' and over 10,000 to include 'xxx'—two of the short-list of words chosen by the domain expert.

TABLE 3

The rankings of some expert-chosen class-indicative words. When listing Only the top k words, a very large k is needed before these words are included.
Ranking of some chosen intuitive words

| Word | Mutual Information | Information Gain | Size of weight | Size of weight with idf correction | Frequency of word occurring in the explanations |
|---|---|---|---|---|---|
| sex | 2633 | 51 | 65 | 1675 | 5 |
| porn | 1544 | 86 | 712 | 4951 | 32 |
| xxx | 1327 | 143 | 10582 | 19813 | 558 |
| adult | 3034 | 7 | 3 | 48 | 1 |
| prostitu- | 5370 | 5067 | 20 | 6 | 368 |
| tio | 916 | 3997 | 760 | 6135 | 117 |

Given the intuitiveness of the top-weighted words, how well a short list of such words can explain the behavior of the model is considered. Does the explanation of a web page typically include the top-100 or so words? It turns out that the content of web pages can vary tremendously, even within individual categories. For "adult content", even though some strongly discriminative words can exist, the model classifies most web pages as being adult content for other reasons. This is demonstrated, for example, by FIG. 5, which plots the percentage of the classifications of the test instances that would be explained by considering the top-k words (horizontal axis) by weight (with and without idf correction), mutual information and information gain. Specifically, if a definition in the sense of Definition 1 can be formed by any subset of the set of top-k words, then the document can be explained. So for example, if an explanation would be 'if words (welcome enter) are removed then class changes', that explanation would be counted when k≥2.

Figure 5:
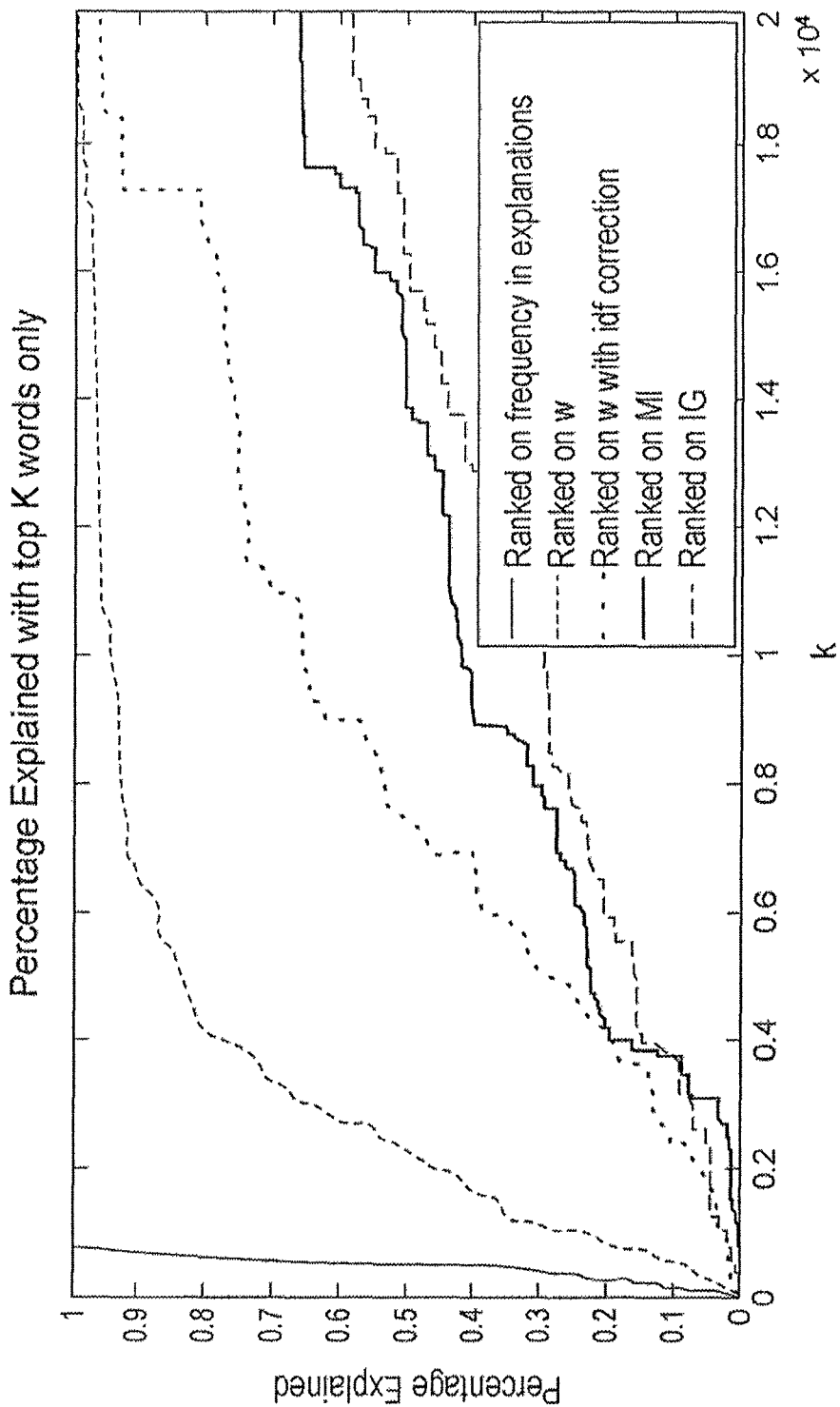
FIG. 5 is an exemplary graph of number test documents for which an explanation is obtained in accordance with an exemplary embodiment of the present disclosure.

FIG. 5 illustrates an exemplary an exemplary graph of a percentage of 100 adult-classified test instances explained when considering only the top k words, ranked according to

TABLE 1

Global explanation of the model by listing the top words providing evidence for the adult class. Five rankings are considered: based on mutual information, information gain, weights of the words, weights of the words with idf correction (weight multiplied with idf of word), and the frequency of the word occurring in the explanations.
Ranking based on

| Mutual Information | Information Gain | Size of weight | Size of weight with idf correction | Frequency of word occurring in the explanations |
|---|---|---|---|---|
| primarykey | privacy | welcome | permanently | adult |
| sessionid | policy | enter | fw | age |
| youtubeid | home | adult | welcome | enter |
| webplayerrequiredgeos | us | permanently | compuserve | site |
| vnesfrsgphplitgrmxnlkrause | advertise | site | copyrightc | sex |
| videocategoryids | about | age | prostitution | years |
| usergeo | adult | use | acronym | material |
| latestwebplayerversion | search | over erotic | tribenet | are |
| isyoutubepermalink | comments | material | amateurbasecom | sites |
| isyoutube | contact | domain | gorean | hardcore |
| ishulu | twitter | sites | xyzbluebookorg | use |
| isfulllength | music | years | parallels | you |
| isexternalmedia | on | warning | licensed | warning |
| iscnn | more | licensed | postedsat | these |
| contentsourcedit | add | contains | flickr | images |
| allowcomments | the | are | swingers | here |
| allowads | news | moved | kev | domain |
| numcomments | facebook | prostitution | enter | least |
| brba | your | | seite | links |
| | up | | sexshop | nude | the frequency of occurrence in the explanations, the weights (w), the weights with idf correction, mutual information (MI) and information gain (IG). The exemplary graph shows that one should consider a set of thousands of words before being able to explain the individual documents. Indeed, FIG. 5 shows that thousands of these top words are typically needed before being able to explain a large percentage of the individual documents, as shown by the line with words ranked on the weight. More precisely, more than two thousand top-weight words are needed before even half of the documents are explained. Using the ranking based on mutual information can require even more words. This suggests either (i) that many, many words can be necessary for individual explanations, or (ii) the words in the individual explanations can vary tremendously. This motivates the use of an instance-level explanation algorithm not only for obtaining insights into the individual decisions, but also for understanding the model overall.

When the words are ranked according to how often they occur in explanations, the line with the maximal area underneath can be obtained. For the 100 classified instances, a total of 810 unique words are used in all the explanations (where a maximum 10 explanations for a single data instance are considered). This already suggests the wide variety of words that can be present in the explanations. The instance-based explanations can be aggregated to a global explanation by listing the words that occur most frequently in the explanations, as shown in the final column of Table 1—which can provide yet another benefit of the instance-level explanations. However, this ranking can depend strongly on the considered data instances and the number of explanations considered for each data instance.

Exemplary Instance-Level Explanations

None of the previously published instance-level explanation methods are able to handle many thousands of variables, so they can not typically be applied to this domain. However, SEDC is effective, and fast as well.

Exemplary Explanation 3 shows several typical explanations for classifications of test documents. The first three explanations of test instances with explanations that can be appropriate for publication are shown. These explanations can demonstrate several things. First, they can directly address the suggestion (i) above: in fact, documents generally do not need many words to be explained. They can also provide evidence supporting suggestion (ii): that the words in the individual explanations can be quite different, including explanations in different languages.

Figure 6:
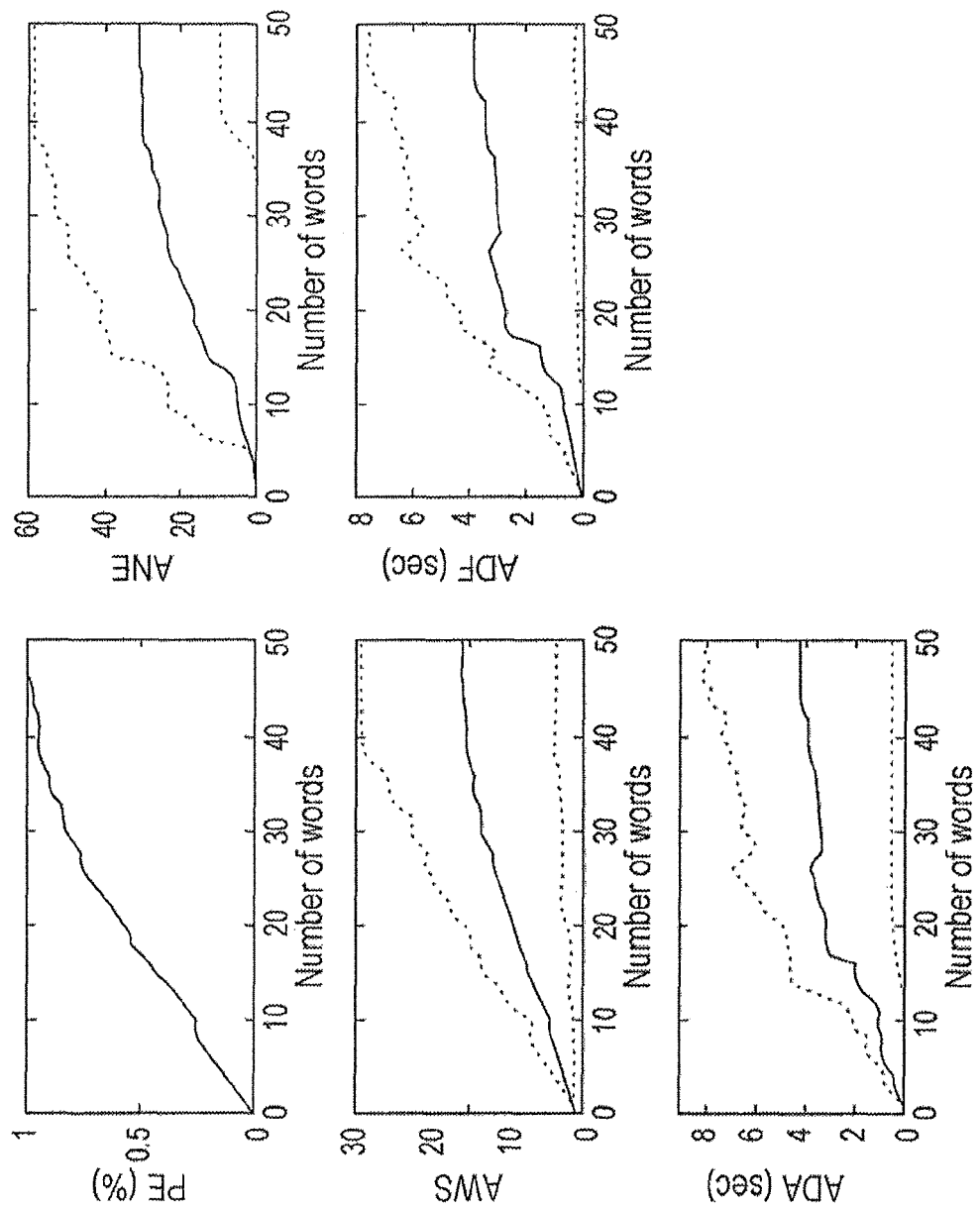
FIG. 6 are exemplary graphs of performance metrics associated with implementations of an exemplary embodiment of the present disclosure.

FIG. 6 illustrates explanation performance metrics in terms of maximal number of words allowed in an explanation. Both the performance and the complexity increase with the number of words. Shown in the graph of FIG. 6 are percentage explained (PE), average number of explanations given (ANE), average number of words in the smallest explanation (AWS), average duration to find the first explanation (ADF) and average duration to find all explanations (ADA). Next to the average metrics, the 10th and 90th percentiles are also shown (e.g., in dashed lines).

The size of explanations can be more systematically examined by referring to the explanation performance metrics introduced above. The top-left plot in FIG. 6 shows the percentage of the test cases explained (PE) when an explanation can be limited to a maximum number of words (on the horizontal axis). Almost all the documents have an explanation having fewer than three dozen words, and more than half have an explanation with fewer than two dozen words. FIG. 6 also shows that the number of words in the smallest explanation (AWS plot) and the number of explanations (ANE plot) both can grow as larger and larger explanations are allowed. (In the exemplary experiments, searching can be limited for 10 explanations: if 10 or more explanations have been found, no further word expansions/iterations are attempted.).

In Table 2, the differences are further analyzed between the false and true positives (for the default threshold of 0). Interestingly, we find a better explanation performance on all metrics for the web pages wrongly classified as adult (false positives, FP) versus those correctly classified as adult (true positives, TP). Seeing that the FPs are the classifications we are most interested in explaining (the perceived anomalies, as described by Gregor and Benbasat (1999)), it shows that the overall explanation performance metrics yield conservative estimates.

TABLE 2

Explanation performance metrics for the false positives (FP) versus true positives (TP).

|    | PE    | ANE   | AWS   | ADF  | ADA  |
|----|-------|-------|-------|------|------|
| FP | 90.3% | 35.15 | 9.23  | 2.31 | 3.08 |
| TP | 76.0% | 25.47 | 15.29 | 2.91 | 3.27 |

More interestingly, examining these performance metrics can give insight into how the classification model is functioning in this application domain. Specifically, the plots can show that document explanation sizes vary quite smoothly and that there seem to be many different explanations for documents. The former observation suggests that the strength of the individual evidence varies widely: some cases are classified by aggregating many weak pieces of evidence, others by a few strong pieces of evidence (and some, presumably by a combination of strong and weak). The latter observation suggests substantial redundancy in the evidence available for classification in this application.

FIG. 6 also shows that for this particular problem, explanations can be produced fairly quickly using SEDC. This problem is of moderate size; real-world document classification problems can be much larger, in terms of documents for training, documents to be classified, and the vocabulary. Therefore, scaling up can be included in the exemplary methods.

In considering a linear model, a document with mD unique words, SEDC evaluates sequentially mD "documents" (each the original document with 1 word removed), then iteratively works on the best of these leading to the evaluation of mD−1 documents (e.g., each the original with 2 words removed); next mD−2 documents are evaluated, and so on. When an explanation of size s is found a total of $O(s \times mD)$ evaluations have occurred. The computational complexity depends therefore on (1) the time needed for a model evaluation, and text classifiers can be very fast, (2) the number of words needed for an explanation s, which in the exemplary case study went to about 40, and (3) the number of unique words in the document mD, which are generally very small as compared to the overall vocabulary. Further, the computational complexity is independent of the overall size of the vocabulary, unlike previous instance-level explanation approaches. This complexity can be lowered further for linear models to $O(s)$ by incrementally evaluating the word combinations with the next-most-highly-ranked word removed (see, e.g., Exemplary Lemma 1 and Exemplary Theorem 1). The exemplary implementation does not include this speed-up mechanism as the exemplary technique is applicable to all models and not just to linear ones.

Exemplary Explanation 3: Some explanations why a web page is classified as having adult content for web pages of the test set.
Explaining document 13 (class 1) with 61 features and class 1 . . . .
Iteration 7 (from score 0.228905 to −0.00155753): If words (submissive pass hardcore check bondage adult ac) are removed then class changes from 1 to −1 (1 sec)
Iteration 7 (from score 0.228905 to −0.00329069): If words (submissive pass hardcore check bondage adult access) are removed then class changes from 1 to −1 (1 sec)
Iteration 7 (from score 0.228905 to −0.00182021): If words (submissive pass hardcore check bondage all adult) are removed then class changes from 1 to −1 (1 sec)
Explaining document 15 (class 1) with 95 features and class 1 . . . .
Iteration 3 (from score 0.798176 to −0.0333195): If words (searches domain adult) are removed then class changes from 1 to −1 (0 sec)
Iteration 5 (from score 0.798176 to −0.00232312): If words (searches gay domain chat and) are
removed then class changes from 1 to −1 (1 sec)
Iteration 5 (from score 0.798176 to −0.00434476): If words (searches gay domain chat appraisal) are removed then class changes from 1 to −1 (1 sec)
Explaining document 30 (class 1) with 89 features and class 1 . . . .
Iteration 4 (from score 0.894514 to −0.0108126): If words (searches nude domain adult) are removed then class changes from 1 to −1 (1 sec)
Iteration 6 (from score 0.894514 to −0.000234276): If words (searches men lesbian domain and
adult) are removed then class changes from 1 to −1 (1 sec)
Iteration 6 (from score 0.894514 to −0.00225592): If words (searches men lesbian domain appraisal adult) are removed then class changes from 1 to −1 (1 sec)
Explaining document 32 (class 1) with 51 features and class 1 . . . .
Iteration 8 (from score 0.803053 to −0.0153803): If words (viejas sitios sexo mujeres maduras gratis desnudas de) are removed then class changes from 1 to −1 (1 sec)
Translation: old mature women sex sites free naked of
Iteration 9 (from score 0.803053 to −7.04005e-005): If words (viejas sitios mujeres maduras gratis desnudas de contiene abuelas) are removed then class changes from 1 to −1 (1 sec)
Translation: old mature women free sites containing nude grandmothers
Iteration 9 (from score 0.803053 to −0.00304367): If words (viejas sitios mujeres maduras gratis
desnudas de contiene adicto) are removed then class changes from 1 to −1 (1 sec) Translation: old sites free naked mature women contains addict
Explaining document 35 (class 1) with 36 features and class 1 . . . .
Iteration 6 (from score 1.04836 to −0.00848977): If words (welcome fiction erotic enter bdsm adult) are removed then class changes from 1 to −1 (0 sec)
Iteration 6 (from score 1.04836 to −0.10084): If words (welcome fiction erotica erotic bdsm adult)
are removed then class changes from 1 to −1 (1 sec)
Iteration 6 (from score 1.04836 to −0.0649064): If words (welcome kinky fiction erotic bdsm adult) are removed then class changes from 1 to −1 (1 sec)

For a non-linear model, some backtracking can also occur, when a local minimum has been found, and thus removing other word leads the score to increase again. The extent to which this occurs can depend on the shape of the model's decision boundary. Considering word combinations of two words, backtracking once leads to mD+2×mD evaluations instead of mD+mD. In an exemplary worst case scenario, backtracking over all words occurs, leading to mD+m$^{mD}$ evaluations. Thus, the worst case complexity can grow exponentially with the depth of the search tree. However, as shown in the subsequent exemplary experiments, the heuristic approach can be quite fast for the tasks to which have been applied, and is able to provide explanations in a matter of seconds for the non-linear SVM technique with RBF kernel. Further, once again, the complexity is independent on the size of the vocabulary.

Further, recall that these exemplary experiments were conducted on a desktop PC, however, further speed improvements could be obtained with the high-performance computing systems typically used by organizations that build text classifiers from massive data.

Exemplary Hyper-Explanations

Conducting another exemplary case study brought forth some additional issues regarding explaining documents classifications—issues that were preferably clarified carefully. Specifically, a procedure for producing explanations of document classifications may provide no explanation at all. Why not? A document's explanation may be non-intuitive. Then what? And although a focus is on providing explanations for documents classified as a non-default class (as described above), practically one may be interested in why instances are classified as the default class, when some important stakeholder believes that they should not have been. ("Why did you let my ad appear on this page?!"). There can be several classes of reasons for these behaviors, which can be grouped into hyper-explanations.

Exemplary embodiments of the present disclosure can provide two hyper-explanations for the non-existence of an explanation, useful both when the instance can be classified to be of the default class and when it can be classified as being of a non-default class. A hyper-explanation procedure can be provided to help deal with non-intuitive explanations. It can be assumed that there is a single non-default class, but the hyper-explanations can extend naturally to multiple non-default classes.

Exemplary Hyper-Explanations for the Lack of an Explanation

Exemplary Hyper-Explanation 1a: No Evidence Present.

The default class is predicted and no evidence for either class is present. For example, this can be the case when all words in the document have zero weights in the model or no words present are actually used in the model.

This may be a practically important situation that cannot simply be ignored. For example, this case may have been brought to a manager's or developer's attention as a "false negative error"—e.g., it should have been classified as a positive example. In this exemplary case, the hyper-explanation can explain why the case was classified as being negative—e.g., there was no model-relevant evidence—and can be a solid starting point for a management/technical discussion about what to do about it. For example, it may be clear that the model's vocabulary needs to be extended.

Exemplary Hyper-Explanation 1b: No Evidence of Non-Default Class Present.

The default class is predicted and evidence in support of the default class is present. This can be a minor variation to the exemplary Hyper-explanation 1a, and the discussion above can apply regarding explaining false negatives and providing a starting point for discussions of corrective actions.

Exemplary Hyper-Explanation 1c: Evidence for Default Class Outweighs Evidence for the Non-Default Class.

A more interesting and complex situation is when, in weighing evidence, the model's decision simply comes out on the side of the default class. In this exemplary case, an immediate reaction may be to apply the explanation procedure to generate explanations of why the case was classified as being default (e.g., if these words were removed, the class would change to positive). However, when the case is, for example, of the "uninteresting" class, the explanations returned would likely be fairly meaningless, e.g., "if you remove all the content words on the page except the bad words, the classifier would classify the page as a bad page." However, applying the procedure can be helpful for explaining false negatives, because it can show the words that the model feels trump the positive-class-indicative words on the page (e.g., if you remove the medical terminology on the page, the classifier would rate the page as being adult). This again can provide a solid foundation for the process of improving the classifiers.

Exemplary Hyper-Explanation 2: Too Much Evidence of Non-Default Class Present.

Figure 7:
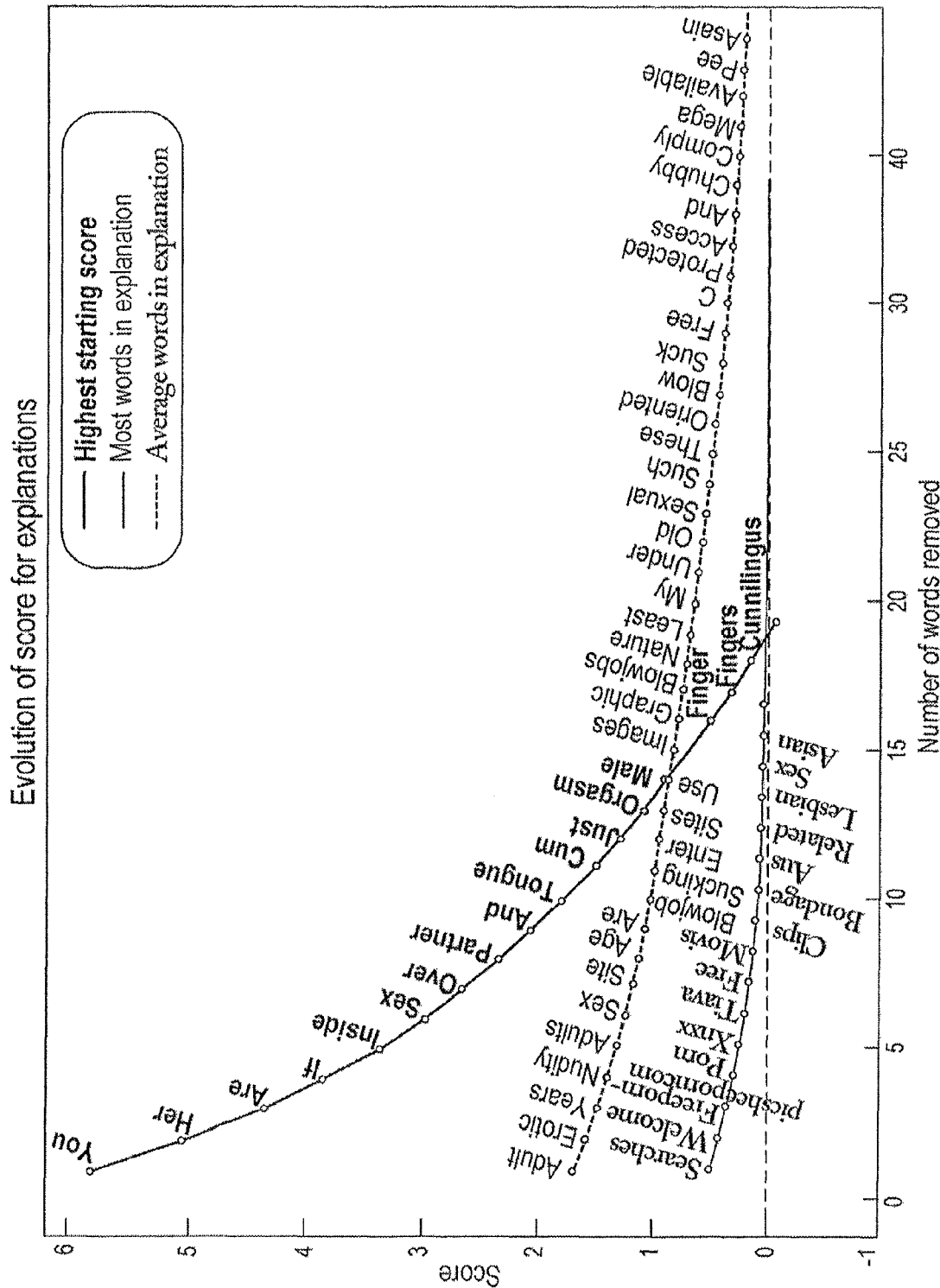
FIG. 7 is an exemplary graph of score evolution in accordance with an exemplary embodiment of the present disclosure.

FIG. 7 illustrates a graph of an exemplary score evolution when removing words from the three selected documents: the one with highest starting score, the one with the most words in an explanation and a document with average number of words in an explanation. The class changes to non-adult when the score falls below zero. This occurs after respectively 18, 40 and 16 words have been removed.

The non-default class is predicted but there can be so many words in support of this class that one may need to remove almost all of them before the class can change. The situations when this can occur, for example, fall along a spectrum between two different reasons:

1. There can be many words each providing weak evidence in support of the class. Thus, the explanation can exceed the bound given to the algorithm, or the algorithm may not return a result in a timely fashion. In FIG. 7, for example, the (middle) line for the explanation with the most words shows that if the number of allowed words is below 40, no explanation can be found. This lack of explanation can be explained by this hyper-explanation, as too many adult-related words are present for a short explanation to be found.

2. There can be many words each providing strong evidence. In this case, the procedure may not be able to get the score below the threshold with a small explanation— e.g., because there can be just so much evidence for the class. The full upper line with the highest starting score in FIG. 7, for example, shows such an example: when allowing fewer than 20 words in an explanation, the score remains above the threshold and no explanation can be given.

This lack of base-level explanation can be mitigated (partially) by presenting "the best" partial explanation as the search advances. Showing a large number of strong-evidence words may be enough to explain why the example can be classified as it is, even if technically the procedure cannot find a small set that changes the classification. Showing a large number of weak-evidence words (as the "best" explanation so far) can be quite useful for explaining false positive classifications. Also, in cases such as this where modeling an inherently non-linear concept with a linear model, the counter-intuitiveness of the resultant evidence strength is preferably considered. If certain bad words can tend to co-occur frequently, then the weights cannot be interpreted directly as strengths of evidence (as with colinear variables in linear regression). The evidence can be apportioned to the various terms based on the specifics of the training set. This does typically not affect the interpretation of an explanation as a whole, but may thwart attempts to interpret quantitatively the individual components of the explanation.

Exemplary Hyper-Explanations for Non-Intuitive Explanations

Explanations are correct in the technical sense—removing the words by definition changes the class. However, it is possible that the explanation clashes with the user's intuition. Several possible reasons can exist for this:

The data instance is misclassified. In this case the explanation can be useful in showing why the case is classified wrongly. Several examples are provided in Exemplary Explanation 4, discussed below. Such explanations can provide useful support for interactive model development, as the technical/business team can fix training data or incorporate background knowledge to counter the misclassification, possibly via iterations of development and explanation.

The data instance is correctly classified, but the explanation just may not make sense to the business users/developers.

This latter exemplary case can be problematic for any automated explanation procedure, since providing explanations that "make sense" typically requires somehow codifying in an operationally way the background knowledge of the domain, as well as common sense, which to our knowledge is (far) beyond current capabilities.

Nevertheless, a useful exemplary hyper-explanation can be provided in the specific and common setting where the document classification model had been built from a training set of labeled instances (as in the exemplary case study). Specifically, for example:

Exemplary Hyper-Explanation 3: Show Similar Training Instance

For a case with a counter-intuitive explanation, "similar" training instances can be shown with the same class. The similarity metric in principle can roughly match that used by the induction technique that produced the classifier. Such a nearest-neighbor approach can provide insight in two ways. (1) If the training classifications of the similar examples do make sense, then the user can understand why the focal example was classified as it was. (2) If the training classifications do not make sense (e.g., they are wrong), then this hyper-explanation can provide precise guidance to the data science team for improving the training, and thereby the model. (Data cleaning can be a very important aspect of the data mining process (e.g, Pyle, D, 1999, "Data preparation for data mining", Morgan Kaufmann). A cleaning activities in classifier induction can include "fixing" labels on mislabeled training data.).

Exemplary Hyper-Explanations in Action

A need for explanations can arise when some party believes a document to have been misclassified. The explanations of some of the web pages that are misclassified by the SVM model are listed in Exemplary Explanation 4 (only the first explanation is shown). For these pages the predicted class is adult, while the human-provided class label is non-adult (false positives). These three explanations indicate that the web pages actually contain adult content and the human-provided label seems wrong. On the other hand, other explanations indicate that web pages seem to be non-adult and hence are likely misclassified. Examples are given in Exemplary Explanation 5. (The exemplary models are limited by the data set obtained for the case study. Models built for this application from orders-of-magnitude larger data sets can be considerably more accurate; nonetheless, they still make both false-positive and false-negative errors, and the exemplary principles illustrated here can apply.).

In considering document 8, Exemplary Explanation 5 suggests that it contains non-adult content, even though the model classifies it as adult. To further explain the model's counter-intuitive behavior, the procedure of Exemplary Hyper-explanation 3 can be applied. The web page most similar to document 8 is also classified as adult and has 44 (out of 57) words which are the same, which are listed in Exemplary Explanation 6. This is a web page with a variety of topics, and probably a listing of links to other websites. This sort of web page typically needs further, expert investigation for use in training (and evaluating) models for safe advertising. It can be that labelers have not properly examined the entire web site; it may be that there indeed is adult content in images that the text-based analysis does not consider; it may be that these sites simply are misclassified, or it may be that in order to classify such pages correctly, the data science team needs to construct specifically tailored feature to deal with the ambiguity.

Exemplary Explanation 4: Explanations of web pages misclassified as adult (false positives), which indicate that the model is right and the class should have been adult (class 1).
Explaining document 1 (class −1) with 180 features and class 1 (score 1.50123) . . . .
Iteration 35 (from score 1.50123 to −0.00308141): If words (you years web warning use these sites site sexual sex section porn over offended nudity nude models material male links if hosting hardcore gay free explicit exit enter contains comic club are age adults adult) are removed then class changes from 1 to −1 (53 sec)
Explaining document 2 (class −1) with 106 features and class 1 (score 0.811327) . . . .
Iteration 24 (from score 0.811327 to −0.00127533): If words (you web warning under and these
site porn over offended nude nature material links illegal if here exit enter blonde are age adults
adult) are removed then class changes from 1 to −1 (15 sec)
Explaining document 3 (class −1) with 281 features and class 1 (score 0.644614) . . . .
Iteration 15 (from score 0.644614 to −0.00131314): If words (you sex prostitution over massage
inside hundreds here girls click breasts bar are and above) are removed then class changes from 1 to −1 (29 sec)
Exemplary Explanation 5: Explanations of truly misclassified web pages (false positives).
Explaining document 8 (class −1) with 57 features and class 1 (score 0.467374) . . . .
Iteration 7 (from score 0.467374 to −0.0021664): If words (welcome searches jpg investments index fund domain) are removed then class changes from 1 to −1 (3 sec)
Explaining document 16 (class −1) with 101 features and class 1 (score 0.409314) . . . .
Iteration 8 (from score 0.409314 to −0.000867436): If words (welcome and sites searches domain de b airline) are removed then class changes from 1 to −1 (5 sec)
Explaining document 20 (class −1) with 26 features and class 1 (score 0.853367) . . . .
Iteration 17 (from score 0.853367 to −0.00390047): If words (xyzbluebookorg welcome value tradein searches related pricing prices nada mechanic information guide car book bluebook blue appraisal) are removed then class changes from 1 to −1 (2 sec)
Explaining document 32 (class −1) with 66 features and class 1 (score 0.124456) . . . .
Iteration 2 (from score 0.124456 to −0.00837441): If words (searches airline) are removed then class changes from 1 to −1 (0 sec)
Exemplary Explanation 6: Hyper-explanation 3 showing the words of the web page most similar to document 8. This most similar web page is classified as adult, providing a hyper-explanation of why document 8 is also classified (incorrectly) as adult.
and, articles, at, buy, capital, check, china, commitment, dat, file, files, for, free, fund, funds, high, hot, in, index, instructionalwwwehowcom, international, internet, investing, investment, investments, jpg, listings, mutual, out, performance, project, related, results, return, searches, social, sponsored, temporary, tiff, to, trading, vietnam, web, welcome.

A more complex situation is situated when a web page is misclassified as non-adult (false negatives). This can arise when the evidence for the default class outweighs the evidence for the non-default class (Exemplary Hyper-explanation 1c). An explanation for all 46 false negatives can be found, indicating that indeed adult words are present but these are outweighed by the non-adult, negative words. Example explanations of such false negatives are given in Exemplary Explanation 4. For some words like 'blog' it seems logical to have received a large non-adult/negative weight. The word 'bikini' seemingly ought to receive a non-adult weight as well, as swimsuit sites are generally not considered to be adult content by raters. However, some pages mix nudes with celebrities in bikinis (for example). If not enough of these are in the training set, it potentially can cause 'bikini' to lead to a false negative. Many other words however can be found in the explanations that do seem to be adult-related (such as 'handjobs'), and as such should receive a positive weight. All the words can be candidates for human feedback to indicate which of these words actually are adult related and potentially update the model's weights (known as active feature labeling) or review the labeling quality of the web pages with the word. Upon review, it seems that most of the web pages with the word 'handjobs' that are labeled as non-adult actually do contain adult content. For example, 32 of these 49 web pages are in Dutch, indicating a potential labeling quality issue for web pages in that language. Table 4 lists the words that occur most in these explanations of false negatives (when considering only the first explanation). The seemingly-adult related words are not listed in this table of top words, again motivating looking at each explanation separately, on an instance level.

Exemplary Explanation 7: Explanations of web pages misclassified as non-adult (false negatives), which indicate which words the model feels trump the positive-class-indicative words.
Explaining document 10 (class 1) with 31 features and class −1 (score −0.126867) . . . .
Iteration 4 (from score −0.126867 to 0.00460739): If words (policy gear found blog) are removed
then class changes from −1 to 1 (0 sec)
Explaining document 13 (class 1) with 50 features and class −1 (score −0.123585) . . . .
Iteration 4 (from score −0.123585 to 0.000689515): If words (sorry miscellaneous found about) are removed then class changes from −1 to 1 (0 sec)
Explaining document 11 (class 1) with 198 features and class −1 (score −0.142504) . . . .
Iteration 2 (from score −0.142504 to 0.00313354): If words (watch bikini) are removed then class
changes from −1 to 1 (1 sec)

Explaining document 31 (class 1) with 22 features and class −1 (score −0.0507037) . . . .
Iteration 4 (from score −0.0507037 to 0.00396628): If words (search handjobs bonus big) are
removed then class changes from −1 to 1 (0 sec)
Explaining document 37 (class 1) with 21 features and class −1 (score −0.0105029) . . . .
Iteration 1 (from score −0.0105029 to 0.0403573): If words (flash) are removed then class changes from −1 to 1 (0 sec)

TABLE 4

The top 10 words most occurring in the explanations of the false negatives, with its weight shown in the second column. All these words have negative (non-adult indicative) weights.

| Word | Model weight |
| --- | --- |
| found | −0.039 |
| blog | −0.02 |
| policy | −0.039 |
| gear | −0.0082 |
| comments | −0.018 |
| apr | −0.006 |
| about | −0.012 |
| video | −0.028 |
| us | −0.031 |
| games | −0.053 |

Exemplary News Item Categorization

To demonstrate the generality and to illustrate some additional properties of the exemplary method, an additional domain of application can be provided, e.g.: classifying news stories. The 20 Newsgroups data set is a benchmark data set used in document classification research. It includes about 20,000 news items partitioned evenly over 20 newsgroups of different topics, and has a vocabulary of 26,214 different words (e.g, Lang, Ken, 1995, "Newsweeder: Learning to filter netnews", Proceedings of the Twelfth International Conference on Machine Learning. 331-339). The 20 topics are categorized into seven top-level usenet categories with related news items, such as, e.g.: alternative (alt), computers (comp), miscellaneous (misc), recreation (rec), science (sci), society (soc) and talk (talk). One typical problem addressed with this data set is to build classifiers to identify stories from these seven high-level news categories—which can give a wide variety of different topics across which to provide document classification explanations. Looking at the seven high-level categories also provides realistic richness to the task: in many real document classification tasks, the class of interest actually is a collection (disjunction) of related concepts (consider, for example, "hate speech" in the safe-advertising domain). For 20 Newsgroups, within each top-level category the news items are generally more similar than among top-level categories, although there are notable exceptions.

An exemplary embodiment of the present disclosure provides a classifier system to distinguish the seven top-level categories using the words in the vocabulary. This can facilitate examination of a wide variety of explanations of different combinations of true class and predicted class, in a complicated domain—but one where a high-level intuitive understanding of the classes can be obtained. The examination can show that even for news items grouped within the same top-level category, the explanations for their classifications vary and are intuitively related to their true lower-level newsgroup.

Exemplary Results

An exemplary embodiment of the exemplary classifier system for distinguishing the seven top-level newsgroups (alt, comp, misc, rec, sci, soc, talk) can operate in a one-versus-others setup—i.e., seven classifiers can be built, each distinguishing one newsgroup from the rest. In practice one-versus-others systems are used in different ways, usually either choosing as the predicted classification the class with the highest output score, or normalizing the scores to produce a posterior probability distribution over the classes. Here, this choice can be sidestepped and the performance of the seven component classifiers is examined. For training (on 60% of the data) and for prediction (remaining 40% as test data), if a news item is (predicted to be) from the given newsgroup, the class variable is set to one; if not the class variable is set to zero. To demonstrate the exemplary method with different types of model, here both linear and non-linear SVM classifiers are used. The non-linear SVM is built with the LIBSVM package (e.g., Chang, Chih-Chung, Chih-Jen Lin, 2001, "LIBSVM: a library for support vector machines", Software available at http://www.csie.nt-u.edu.tw/~cjlin/libsvm; Craven, M. W., J. W. Shavlik, 1996, "Extracting tree-structured representations of trained networks") and uses a RBF kernel with hyperparameters tuned using a grid search.

In Table 6, each cell shows, for example, at least one explanation (where possible) of an example from one of the 20 low-level categories (specified in the row header) being classified into one of the top level categories (specified in the column header). If no explanation is given in a cell, either no misclassified instances exist, which occurs most, or no explanation was found with maximum 10 words. The shaded cells on the diagonal are the explanations for correct classifications; the rest are explanations for errors. For example, the first explanation in the upper-left cell (excluding the header rows) shows that this correct classification of a news story in the alt.atheism category can be explained by the inclusion of the terms 'ico', 'bibl', 'moral', 'god' and 'believ'-if these words alone are removed, the classifier may no longer place this story correctly into the alt category. Several cells below, explanations for why a sci.med story was misclassified as belonging to alt, e.g., because of the occurrence of the word 'atheist' (first explanation), or the words 'god' and 'believe' (second explanation). Further investigation of this news story can reveal it concerns organ donation. More generally, the explanations shown in Table 6 of the correctly classified test instances, shown in the grayed cells on the diagonal, usually are indeed intuitively related to the topic.

The categories themselves often occur as words in the explanations, such as 'hardwar', 'microsoft', 'mac' and 'space'. The different subcategories of the newsgroups show different explanations, which motivates using instance—rather than global-level explanations. For example, for the computer newsgroup (shown in the second column), the terms used to explain classifications from the different subgroups are generally different and intuitively related to the specific subgroups.

The misclassified explanations (outside of the shaded cells) often show the ambiguity of certain words as reason for the misclassification. For example 'window' is a word that can be related to computer, but also can be seen as words related to automobiles. The explanations for the misc.forsale news items indicate they are most often misclassified because the item that is being sold comes from or can be related to the category it is misclassified in. With this individual-instance approach, similar ambiguities as well as intuitive explanations for each of the subgroups also can be found for the other categories. The exemplary results also demonstrate how the explanations hone in on possible overfitting, such as with 'unm' and 'umd' in the cells adjacent to the upper-left cell we discussed above.

TABLE 5

Explanation performance metrics on the test set of the 20 newsgroups data set for
a linear (left) and non-linear (right) SVM model and explanations of maximum 10 (top)
and 30 (bottom) words. The listed metrics are percentage correctly classified (PCC),
percentage explained (PE), average number of explanations given (ANE), average number
of words in the smallest explanation (AWS), average duration to find the first explanation
(ADF) and average duration to find all explanations (ADA).

| | Linear SVM | | | | | | Non-linear RBF SVM | | | | | |
|---|---|---|---|---|---|---|---|---|---|---|---|---|
| Model | PCC | PE | ANE | AWS | ADF | ADA | PCC | PE | ANE | AWS | ADF | ADA |
| | Allowing up to 10 words in an a explanation | | | | | | | | | | | |
| alt | 81.5% | 96.1% | 18.5 | 2.7 | 0.05 | 0.16 | 76.8% | 95.7% | 30.1 | 2.5 | 0.62 | 1.35 |
| comp | 93.7% | 89.1% | 13.3 | 3.1 | 0.05 | 0.12 | 94.9% | 81.7% | 12.4 | 3.3 | 0.54 | 0.88 |
| misc | 92.8% | 98.1% | 12.9 | 1.9 | 0.02 | 0.12 | 90.5% | 96.6% | 17.0 | 1.8 | 0.14 | 0.38 |
| rec | 94.2% | 94.8% | 13.7 | 2.4 | 0.04 | 0.11 | 93.6% | 92.9% | 16.7 | 2.4 | 0.40 | 0.79 |
| sci | 85.4% | 93.5% | 19.6 | 2.7 | 0.06 | 0.15 | 83.1% | 90.4% | 23.16 | 2.7 | 1.01 | 1.62 |
| soc | 94.2% | 94.4% | 16.9 | 1.8 | 0.03 | 0.15 | 90.2% | 91.5% | 29.5 | 2.4 | 0.39 | 0.79 |
| talk | 88.5% | 92.1% | 23.8 | 2.5 | 0.08 | 0.21 | 86.8% | 90.0% | 28.5 | 2.0 | 1.3 | 2.9 |
| | Allowing up to 30 words in an a explanation | | | | | | | | | | | |
| alt | 81.5% | 100% | 19.7 | 3.1 | 0.08 | 0.20 | 76.8% | 100% | 31.5 | 3 | 0.61 | 1.29 |
| comp | 93.7% | 99.5% | 15.5 | 4.2 | 0.09 | 0.17 | 94.9% | 99.4% | 16.1 | 5.6 | 1.6 | 2.0 |
| misc | 92.8% | 100% | 13.2 | 2.2 | 0.04 | 0.14 | 90.5% | 100% | 18.0 | 2.3 | 0.25 | 0.51 |
| rec | 94.2% | 100% | 15.8 | 3.1 | 0.07 | 0.24 | 93.6% | 99.4% | 18.6 | 3.1 | 0.71 | 1.14 |
| sci | 85.4% | 100% | 23.4 | 3.6 | 0.21 | 0.33 | 83.1% | 99.4% | 27.0 | 4.0 | 2.62 | 3.31 |
| soc | 94.2% | 100% | 18.3 | 2.9 | 0.14 | 0.27 | 90.2% | 97.9% | 30.9 | 3.3 | 0.61 | 1.02 |
| talk | 88.5% | 100% | 26.1 | 3.4 | 0.11 | 0.25 | 86.8% | 100% | 33.7 | 4.0 | 2.04 | 2.82 |

The explainability metrics when facilitating a maximum of 10 words in an explanation are shown in Table 5. Although a high percentage of the test instances can be explained (PE around 90-95% for all models), still some instances remain unexplained. If, for example, up to 30 words in an explanation are permitted, all instances can be explained for each of the models (except for the comp model), as shown in Table 5. It is remarkable that for this exemplary real-life case with a vocabulary of 26,214 words, on average, only a small fraction of a second (ADF of 0.02-0.08 seconds) is typically needed to find a first explanation. As previously mentioned, this is mainly because the exemplary SEDC explanation algorithm can be independent of the vocabulary size. Explaining the non-linear model requires more time, since backtracking can occur and the model evaluation takes longer than for a linear model. Nevertheless, on average still less than a second is typically needed to find an explanation.

These exemplary results in a second domain, with a wide range of document topics, provide support that the general notion of instance-level document classification can provide important insight into the functioning of text classifiers, and that the exemplary SEDC method is generally effective and pretty fast as well. Further, this exemplary second study provides a further demonstration of the futility of global explanations in domains such as this: there are so many different reasons for different classifications. At best they would be muddled in any global explanation, and likely they would simply be incomprehensible.

TABLE 6

Explanations are shown why documents from the newsgroup shown at
the beginning of the row are classified in the newsgroup shown at the top of the
column.
Classification models in one-versus-others setup: 'newsgroup' versus not 'newsgroup'
Explanations why news items are classified as
'newsgroup'

| | alt vs not alt | comp vs not comp | misc vs not misc | rec vs not rec |
|---|---|---|---|---|
| alt.atheism | ico bibl moral god believ | unm | wustl distribut | com |
| | ico bibl moral god read ico | carina screen | wustl 5 | u |
| | bibl moral accept god | carina join | wustl origin | ni |
| comp.graphics | umd | quicktim 3do centris resolut card program | bigwpi wpi distribut | nb canada ca |
| | wam | quicktim 3do centris resolut ac card | bigwpi wpi pleas | nb luck |
| | mistak cant | quicktim 3do cenbis resolut fax card | bigwpi wpi email | canada nb |
| comp.os.ms-windows.misc | | mous microsoft cant | distribut | 6 |
| | | mous microsoft solution | look | tom |
| | | mous microsoft switch | pleas | arehiv corn |
| comp.sys.ibm.pc.hardware | | hardwar thank | distribut | cornel buffalo |
| | | hardwar appreci | repl | buffalo cc |
| | | adam hardwar | i | wonder |
| comp.sys.mac.hardware | kmr4po read | vga monitor mac advenc card am | offer sale distribut | univers |
| | kmr4po follow | vga monitor mac advenc card repli vga | offer sale card | r |
| | kmr4po note | monitor mac advenc card thank | jame offer sale | e |

TABLE 6-continued

Explanations are shown why documents from the newsgroup shown at the beginning of the row are classified in the newsgroup shown at the top of the column.
Classification models in one-versus-others setup: 'newsgroup' versus not 'newsgroup'
Explanations why news items are classified as 'newsgroup'

| | | | | |
|---|---|---|---|---|
| comp.windows.x | | enterpoop lcs fax | pleas | street final list |
| | | enterpoop les mit | inclu | 2154 street final com |
| | | enterpoop xpertexpo less inc | d | 2154 street final pleas |
| misc.forsale | | driver program | sale | insur |
| | | driver card | 2190 | gasket massachusett |
| | | pc driver | pc mention | ser gasket jacket |
| rec.autos | | window call | distribut | geico insur distribut |
| | | window email | 3 | geico |
| | | window 4 | compani | insur ca |
| rec.motorcycles | | greyscal color | mile | dod |
| | | greyscal pictur | pad | ottawa |
| | | greyscal directori | rosevil deal | ca |
| rec.sport.baseball | | | offer | miller brave gatech nl seri team |
| | | | game 3 | technologi game |
| | | | game 5 | miller brave gatech nl seri team |
| | | | | institut |
| | | | | game |
| | | | | miller brave gatech nl seri team |
| | | | | plai game |
| rec.sport.hockey | | michel comput | susan | buffalo ny team |
| | | michel 4 | game call | bruin |
| | | co michel | buffalo game | buffalo team |
| sci.crypt | mathew | 42 print messag | ohio | 1158 |
| | rusnew mantis umd consult couldnt agre | 42 print seen | cincinnati | l |
| | rusnew mantis umd consult couldnt stop | 42 print net | victor | i |
| sci.electronics | | softwar | sell price email pleas | univers |
| | | prefer | sell price game email | di |
| | | appl | ncsu sell price email | st |
| sci.med | atheist | lcs mit address thank | nyx | canada cc bad pleas univers |
| | god believ | lcs laboratori mit address | denver du | canada cc bad pleas |
| | god start | lcs mit address email ani | denver dept distribut | thank canada cc bad |
| sci.space | | michel help | internet | riversid due |
| | | site help | servic | riversid ucr |
| | | help thank am | institu | riversid prbaccess com |
| soc.religion.christian | atheist | wrote | call | chanc |
| | | technologi | person | da |
| | | 9 | includ | ve |
| talk.politics.guns | | richard drive | holonet norton internet | sfasu |
| | | richard fax | holonet norton modem | arlen |
| | | bryan richard | holonet norton pete | than |
| talk.politics.mideast | wrote | ai repli | hous | cc |
| | evid | ai mit | amherst | co |
| | religion | ai cant 3 | pl7 | lu |
| talk.politics.misc | religi god | cwru | ohio | car |
| | religi religion | jone | jone | w |
| | islam religi | cleveland western | hela ins cleveland reserv western usa 2 | a |
| talk.religion.misc | bill | site | institut | refer |
| | explain | ca system | gold | mike |
| | cration | usa system | polytechn | univ |
| | | sci vs not sci | soc vs not soc | talk vs not talk |
| | alt.atheism | latech | translat | ha atom 2000 moral object evid |
| | | scisur rayengr | familiar | ha overwhelm atom 2000 moral object |
| | | help | translat god | microscop ha atom 2000 moral object |
| | comp.graphics | map | scott pleas | david |
| | | pub inc | scott read | happen |
| | | pub ftp | scott answer | list |
| | comp.os.ms-windows.misc | public | book | speak |
| | | date | pa | limit |
| | | std | steven | stand |
| | comp.sys.ibm.pc.hardware | nz mark | | address |
| | | nz 1.1 | | student |
| | | nz network | | utexa |

TABLE 6-continued

Explanations are shown why documents from the newsgroup shown at the beginning of the row are classified in the newsgroup shown at the top of the column.
Classification models in one-versus-others setup: 'newsgroup' versus not 'newsgroup'
Explanations why news items are classified as 'newsgroup'

| | | | |
|---|---|---|---|
| comp.sys.mac.hardware | bounc suppli | | purdu |
| | bounc circuit | | cc certer |
| | sync bounc happen | | pure cc |
| comp.windows.x | nz | scienc | re |
| | aukuni time | sorc | time |
| | aukuni scienc | upenn | name |
| misc.forsale | tube | pa | usa |
| | catalog | sex accept | 21 |
| | umb etc | sex hell | gun |
| rec.autos | max low fone | chuck | utexa call |
| | max cycl fone | discuss pleas | utexa center |
| | max pl9 effect fone | discuss read | utexa care |
| rec.motorcycles | ibm | | righteous racist stupid mean |
| | week fone rochest | | righteous racist stupid own |
| | fone 10 | | righteous racist stupid opinion |
| rec.sport.baseball | list 10 | dt | buffalo love cc |
| | list scienc | nswc | buffalo stand cc |
| | std list | carderock | buffalo stori cc |
| rec.sport.hockey | ericsson inc | oppos | john |
| | ericsson commun | csd | boulder center |
| | ericsson user | chuck | boulder depart |
| sci.crypt | inform | | congress law john |
| | commun | | preced congress john |
| | offic | | nagl congress john |
| sci.electronics | adcom | god | re |
| | preamp chip sound | accept | david |
| | preamp network chip | recent | citi |
| sci.med | handed rsilverworld sight domin cyc common | sex | perot |
| | handed rsilverworld sight domin eye indic handed | grade fysic | 16 happen |
| | rsilverworld sight domin guest eye look | fysic speak reason | edward happen |
| sci.space | space | book | terror moral govern |
| | nasa follow | discuss | terror moral law |
| | nasa scienc | fysic | terror moral major |
| soc.religion.christian | greet marie angel | religion pleas | homosexu |
| | gabriel greet mari 12 gabriel | religion question | abus behavior love abus |
| | greet man various | religion follow | sexual love peopl |
| talk.politics.guns | chip | marri christ life | batf waco clinton question |
| | explode | marri christ view | batf waco clinton law |
| | medic understand | mani christ religion | batf waco clinton evid |
| talk.politics.mideast | ai | ab4zvirginia beyer | holocaust arab militari plan evid kill |
| | amend lab | ab4zvirginia beyer andi | holocaust arab militari attack evid kill |
| | amed messag 10 | blanket ab4zvirginia beyer andi | holocaust arab militari reach evid kill |
| talk.politics.misc | acid scienc | ☐erbian | homosexu moral law |
| | acid commun | bomb york 2 | homosexu moral stop |
| | acid sore | bomb york position | homosexu moral pass |
| talk.religion.misc | messag | pa christian | malcolm weapon jew christian |
| | institut | mormon faith christian 2 | malcolm weapon jew kill |
| | apr | mormon faith hous christian | malcolm weapon jew hous |

EXEMPLARY DISCUSSION, LIMITATIONS AND CONCLUSIONS

Exemplary embodiments of the present disclosure employ the guidelines set forth by Hevner, A. R., S. T. March, J. Park, S. Ram, 2004, "Design science in information systems research", MIS Quarterly 28(1) 75-106), for designing, executing and evaluating research within design science to explain documents' classifications. The business problem that is addressed, can include, for example, obtaining insight into a document classification model such that, e.g., (1) the manager using it understands how decisions are being made, (2) the customers affected by the decisions can be advised why a certain action regarding them is taken, and (3) the data science/development team can improve the model iteratively. Further, (4) document classification explanations can provide insight into the business domain, as we saw from the exemplary safe advertising case study.

Exemplary embodiments of the present disclosure indicate that global explanations in the form of a decision tree or a list of the most indicative words do not necessarily provide a satisfactory solution. Moreover, previously proposed explanation methods on the data-instance level define explanations as real-valued vectors of the same size as the input space. Given the dimensionality of document classification problems, these techniques also do not typically provide a solution to the business problems. With the technical constraints of high-dimensional data in mind, exemplary embodiments of the present disclosure can address this business problem by creating an explanation as a "necessary" set of words—e.g., a minimal set such that after removal the current classification would no longer be made. Exemplary embodiments of the present disclosure also provide a search algorithm (SEDC) for finding such explanations—the algorithm is optimal for linear binary-classification models, and heuristic for non-linear models. Exemplary embodiments of the present disclosure also provide an evaluation of such a system, and exemplary empirical evaluations of the performance of the algorithm on different document classification domains. The exemplary evaluations show that SEDC can provide these explanations in a matter of seconds.

In terms of effectiveness, the exemplary results indicate that the explanations are comprehensible, including a few to a few dozen words. The words in the explanations can vary greatly across the explanations, even with words in different languages, which supports the claim that existing global explanations are inadequate for such document classification domains. Further, different explanations for different cases can be seen. These exemplary results suggest a different route for producing global explanation models for document classification. Rather than trying to produce a small, high-fidelity replica (as with prior approaches), instead produce a large high-fidelity replica, that can capture the different sorts of classifications the model can be making. This may sound counter-intuitive, since in prior work model size often is equated with comprehensibility. However, a model that includes a large number of individually comprehensible subcomponents (e.g., a large set of small rules) may provide useful insight. Nevertheless, it can not substitute for instance-level explanations for the business problems addressed by exemplary embodiments of the present disclosure.

Exemplary hyperexplanations can be provided. The exemplary hyperexplanations have some basis in the document classification models being statistical models learned from data, and thus can be subject to the main challenges of machine learning: overfitting, underfitting, and errors in the data. When classification errors are introduced due to these pathologies, even instance-level explanations may be inadequate (e.g., missing) or unintuitive. Hyperexplanations can be needed for deep understanding—for example, showing training cases that likely led to the current model behavior.

As discussed herein, instance-level explanation methods such as SEDC can have a substantial impact in improving the process of building document classification models. For example, systems such as SEDC can become an important component of the iterative process for improving document classification models. As the exemplary case study and the news-group study showed, SEDC can identify data quality issues and model deficiencies. These deficiencies can be resolved via various mechanisms, leading to improved models directly or alternatively to improved data quality, which ultimately should lead to better model performance and decision making. Consider several mechanisms for improving models iteratively, with the aid of instance-level explanations of classification errors:

Feature selection/construction: the explanations show that some words can be responsible for misclassifications because of ambiguity. For example in the 20 Newsgroups data set the word 'window' can be used both in the context of computers and automobiles. Disambiguation of such words is typically needed: one can choose to remove the word from the dictionary (feature selection) or add some context by, for example, creating terms using it in combination with another word (feature construction). Alternatively, features might be removed from use because they essentially are "stop words" that contain no topical content, yet are likely to or observed to cause overfitting.

Class labeling improvement: Exemplary Explanation 4 indicates that some instances have been provided a wrong class label by the human labeler. Turning a model back on the training data, for example via cross-validation, the instance-level explanations combined with Hyper-explanation 3 can pinpoint documents for which the label can be wrong and should be corrected—specifically because the explanation does not make sense. The explanations for the web pages wrongly classified as non-adult, as shown in Explanation 7, can also reveal labeling quality issues for some Dutch web pages. Working with noisy labelers, as is the case increasingly for document classification (e.g., via Mechanical Turk), using the explanations to choose candidates to be labeled by more labelers (e.g., Sheng, Victor S., Foster Provost, Panagiotis Ipeirotis, 2008, "Get another label? Improving data quality and data mining using multiple, noisy labelers", Proceedings of the 14th ACM SIGKDD International Conference on Knowledge Discovery and Data Mining (KDD 2008)) or by higher quality labelers (Donmez, Pinar, Jaime G. Carbonell, 2008, "Proactive learning: Cost-sensitive active learning with multiple imperfect oracles", Proceedings of the 17th ACM Conference on Information and Knowledge Management (CIKM 2008) 619-628; Donmez, Pinar, Jaime G. Carbonell, Jeff Schneider, 2009, "Efficiently learning the accuracy of labeling sources for selective sampling", Proceedings of the 15th ACM SIGKDD International Conference on Knowledge Discovery and Data Mining (KDD 2009) 259-268; Dekel, O., O. Shamir, 2009, "Vox populi: Collecting high-quality labels from a crowd", COLT 2009: Proceedings of the 22nd Annual Conference on Learning Theory. Citeseer) and improve the overall labeling quality and resulting model performance.

Active feature labeling: recent research has shown that it is possible to improve models by training both with labeled cases (in the usual way) and with labeled features (e.g., Sindhwani, Vikas, Prem Melville, 2008, "Document-word co-regularization for semi-supervised sentiment analysis", ICDM). A common application is document classification, where those familiar with the domain can say that a particular word should be indicative (or counterindicative) of a particular class. For example, one might say 'helmet' should be a positive word for the class rec, since rec contains rec.motorcycles. Furthermore, a particularly effective interactive process may be to suggest certain words for which to obtain human feedback (e.g., Sindhwani, Vikas, Prem Melville, Richard Lawrence, 2009, "Uncertainty sampling and transductive experimental design for active dual supervision", ICML). Techniques like SEDC may be useful for focusing on such interaction: the words in explanations of misclassified instances can be obvious words for human labeling, which may improve subsequent models beyond this specific case. In a safe advertising context, the explanations of false negatives can indicate which negative, non adult-indicative words are (potentially wrongly so, e.g. the word 'handjobs') responsible for outweighing the positive words and form great candidates for human feedback. Similarly, the explanations for false positives can show which words with positive weights can be responsible for the misclassification. On the other side of the coin, active feature labeling may further address these misclassified cases covered by Hyper-explanation 1c (insufficient evidence for positive class): the positive or mildly positive words can be extracted, and see whether a human is willing to increase their associated weight of evidence.

Guided learning: when examples of the non-default class are rare, as is the case in the real-world safe advertising case, guiding the training process by asking experts to search for examples of a certain class can improve model development (e.g., Attenberg, J., F. Provost, 2010, "Why label when you can search? Alternatives to active learning for applying human resources to build classification models under extreme class imbalance", Proceedings of the Sixteenth ACM SIGKDD International Conference on Knowledge Discovery and Data Mining (KDD 2010)). SEDC explanations may be used to guide an expert to search for a specific type of web page, for example to explicitly search for web pages where links are listed, as suggested by Explanation 5 and the associated discussion. As with active feature labeling, guided learning may be used to directly address misclassified cases covered by Hyper-explanation 1c (insufficient evidence for positive class). Given such cases, the experts can be requested to find cases that are positive "for the same reasons", and augment the training set.

Implementation-specific issues: Depending on the specific techniques employed for improving classification models, different issues can arise. For example, one particularly effective method for dealing with high input dimensionality can be hashing the features to a lower-dimensional feature space, and then building models on the lower-dimensional space (e.g., Weinberger, Kilian Q., Anirban Dasgupta, John Langford, Alexander J. Smola, Josh Attenberg, 2009, "Feature hashing for large scale multitask learning"; Attenberg, J., K. Q. Weinberger, A. Smola, A. Dasgupta, M. Zinkevich, 2009, "Collaborative email-spam filtering with the hashing-trick", Sixth Conference on Email and Anti-Spam (CEAS)). When using such feature hashing, hashing collisions can occur. When misclassifications are identified, it is preferable to find out which variables are responsible. However, the input space for traditional explanation techniques is the lower-dimensional space—for which the actual "features" can be meaningless. The SEDC approach however shows the exact words that are responsible, and these can be traced to the hash value, and then back to the other features hashed to the same value. If necessary, specific adjustments to the hashing can be made for specific words, to improve classification behavior.

Figure 8:
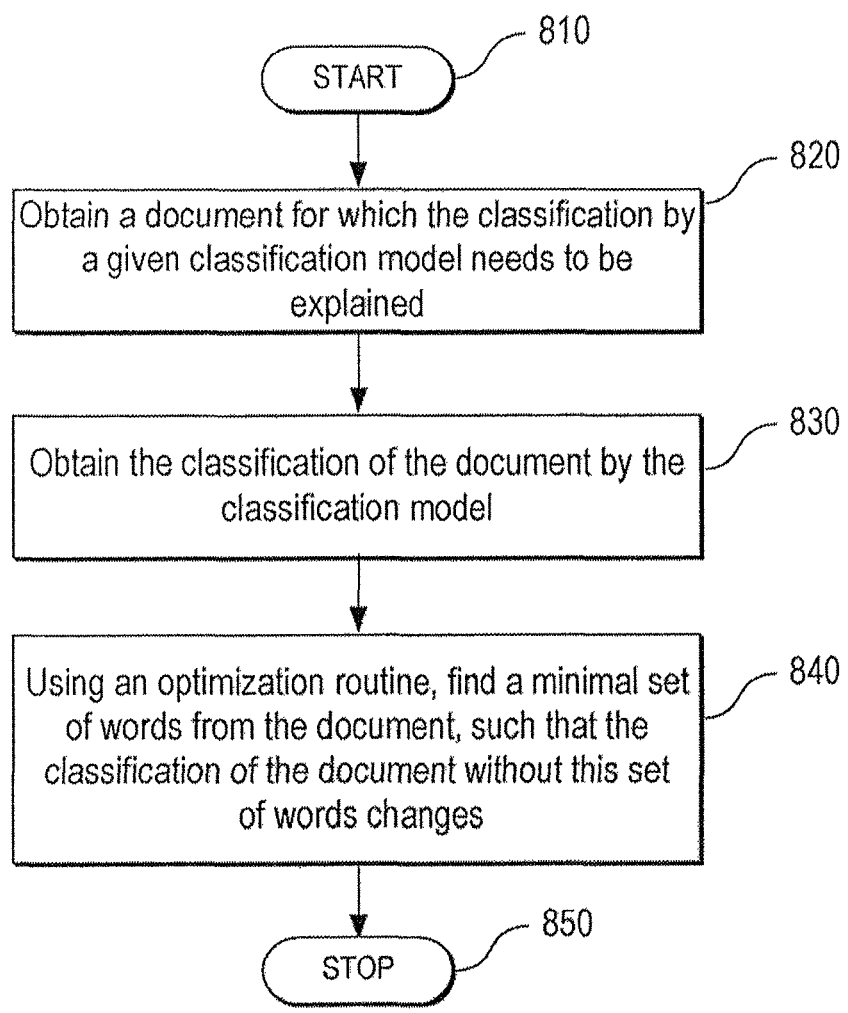
FIG. 8 is an exemplary flow diagram in accordance with an exemplary embodiment of the present disclosure.

FIG. 8 illustrates an exemplary procedure starting at sub-procedures 810 and ending at sub-procedures 850. At sub-procedure 820, the exemplary computing arrangement be programmed to use an exemplary procedure to obtain a document for which the classification by a given classification model needs to be explained. Next, at sub-procedure 830, the exemplary computing arrangement be programmed to use an exemplary procedure to obtain the classification of the document by the classification model. Next, at sub-procedure 840, using an optimization routine, it is possible to find a minimal set of words from the document, such that the classification of the document without this set of words changes.

Figure 9:
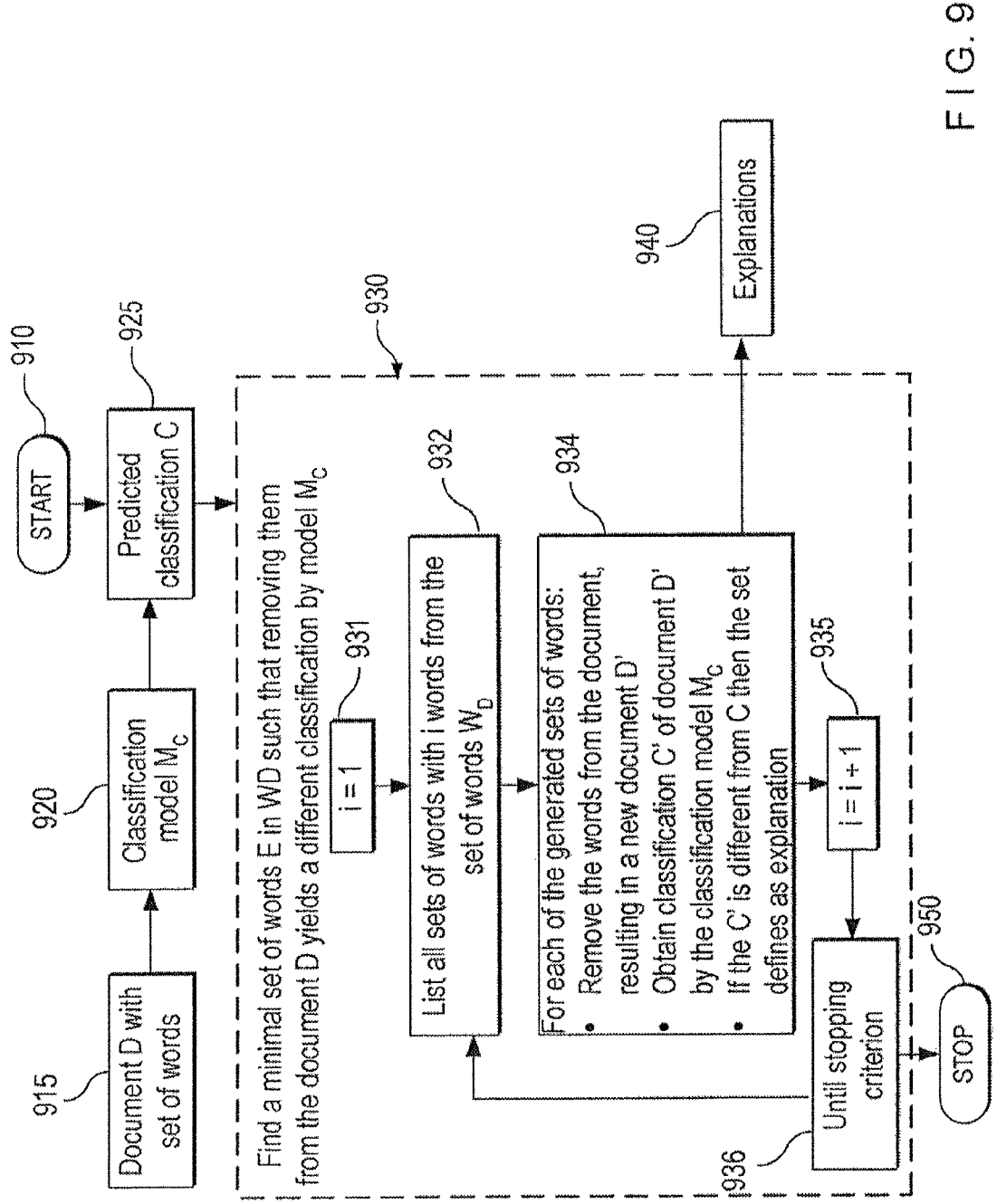
FIG. 9 is an exemplary flow diagram in accordance with an exemplary embodiment of the present disclosure.

FIG. 9 illustrates an exemplary procedure for generating explanations of the classification of document D by classification model $M_C$. The exemplary procedure can start at sub-procedure 910, with a predicted classification "C" at sub-procedure 925. This predicted classification C can be predicted as part of the procedure, or loaded from previously determined predictions. The predicted classification C can be based on a classification model $M_C$ at sub-procedure 920 and a document "D" with a certain set of words 915. Next, at 930, the exemplary procedure can find a minimal set of words "E" in $W_D$ such that removing them from the document D yields a different classification by model $M_C$. One exemplary procedure for sub-procedure 930 can include sub-procedures 931 to 936. For example, at sub-procedure 931, a value "i" can be initialized, e.g., to one. Next, at 932, the exemplary procedure can list all sets of words with i words from the set of words $W_D$ (e.g., the set of words in document D). Next, at sub-procedure 934, the exemplary procedure can, for each of the generated sets of words: (a) remove the words from the document, resulting in a new document D'; (b) obtain classification C' of document D' by the classification model $M_C$; and (c) check if the C' is different from C, and if so, then the set defines an explanation, which can be saved in explanations at sub-procedure 940. At sub-procedure 935, the value of "i" can be iterated, and at sub-procedure 936, a stopping criterion can be checked and the exemplary procedure can repeat back to sub-procedure 931 or terminate at sub-procedure 950.

Figure 10:
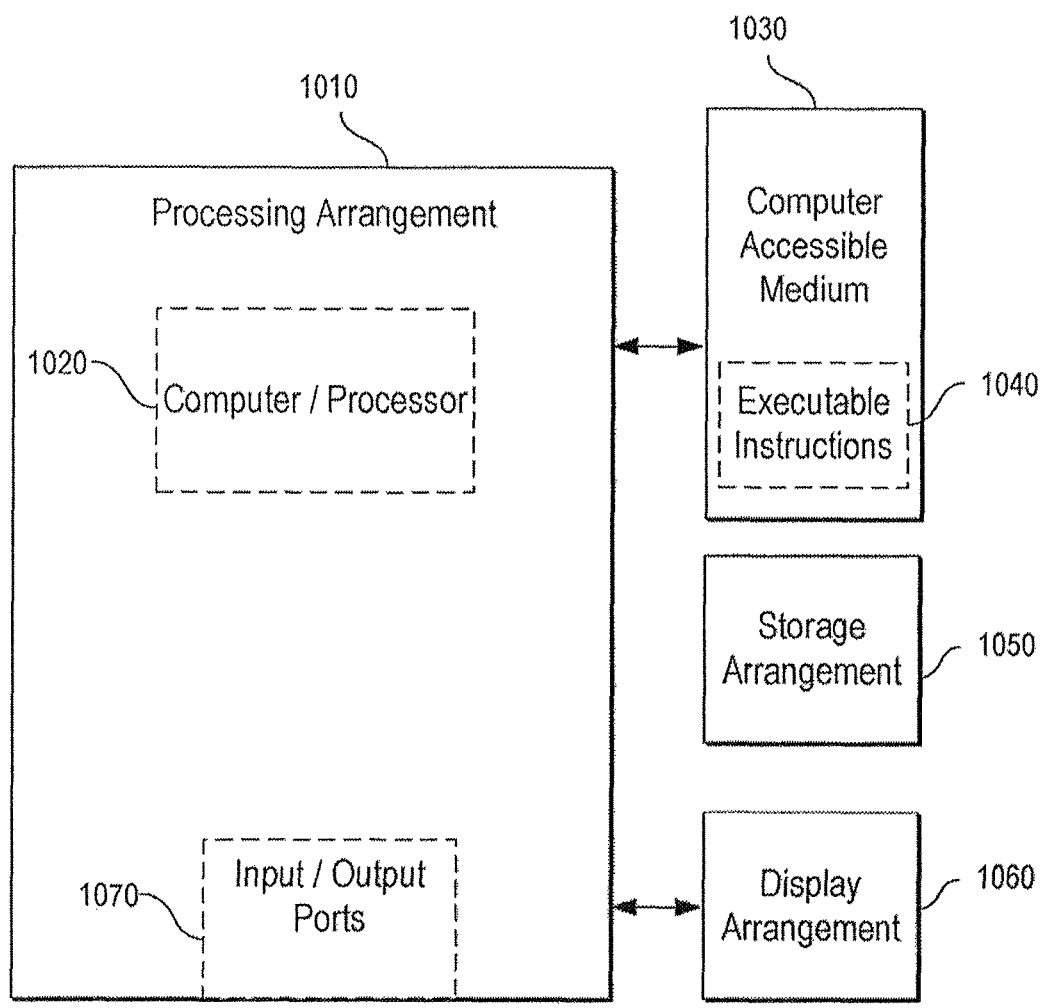
FIG. 10 is an exemplary block diagram of an exemplary apparatus in accordance with an exemplary embodiment of the present disclosure.

FIG. 10 shows an exemplary block diagram of an exemplary embodiment of a system according to the present disclosure. For example, exemplary procedures in accordance with the present disclosure described herein can be performed by a processing arrangement and/or a computing arrangement 1010. Such processing/computing arrangement 1010 can be, e.g., entirely or a part of, or include, but not limited to, a computer/processor 1020 that can include, e.g., one or more microprocessors, and use instructions stored on a computer-accessible medium (e.g., RAM, ROM, hard drive, or other storage device).

As shown in FIG. 10, e.g., a computer-accessible medium 1030 (e.g., as described herein above, a storage device such as a hard disk, floppy disk, memory stick, CD-ROM, RAM, ROM, etc., or a collection thereof) can be provided (e.g., in communication with the processing arrangement 1010). The computer-accessible medium 1030 can contain executable instructions 1040 thereon. In addition or alternatively, a storage arrangement 1050 can be provided separately from the computer-accessible medium 1030, which can provide the instructions to the processing arrangement 1010 so as to configure the processing arrangement to execute certain exemplary procedures, processes and methods, as described herein above, for example.

Further, the exemplary processing arrangement 1010 can be provided with or include an input/output arrangement 1070, which can include, e.g., a wired network, a wireless network, the internet, an intranet, a data collection probe, a sensor, etc. As shown in FIG. 10, the exemplary processing arrangement 1010 can be in communication with an exemplary display arrangement 1060, which, according to certain exemplary embodiments of the present disclosure, can be a touch-screen configured for inputting information to the processing arrangement in addition to outputting information from the processing arrangement, for example. Further, the exemplary display 1060 and/or a storage arrangement 1050 can be used to display and/or store data in a user-accessible format and/or user-readable format.

FIG. 11 is an exemplary classification tree in accordance with an exemplary embodiment of the present disclosure. The exemplary tree includes several branched terms, with various branching tests associated with each level in accordance with an exemplary embodiment of the present disclosure.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety. All publications referenced can be incorporated herein by reference in their entireties.

REFERENCES

Aggarwal, C. C., C. Chen, J. W. Han. 2010. The inverse classification problem. Journal of Computer Science and Technology 25(3) 458-468.

Agrawal, R., R. Srikant. 1994. Fast algorithms for mining association rules. Proc. 20th Int. Conf. Very Large Data Bases, VLDB, vol. 1215. Citeseer, 487-499.

Andrews, R., J. Diederich, A. Tickle. 1995. Survey and critique of techniques for extracting rules from trained artificial neural networks. Knowledge Based Systems 8(6) 373-389.

Arnold, V., N. Clark, P. A. Collier, S. A. Leech, S. G. Sutton. 2006. The differential use and effect of knowledge-based system explanations in novice and expert judgement decisions. MIS Quarterly 30(1) 79-97.

Arnott, David. 2006. Cognitive biases and decision support systems development: a design science approach. Information Systems Journal 16(1) 55-78.

Attenberg, J., P. Ipeirotis, F. Provost. 2011. Beat the machine: Challenging workers to find the unknown unknowns. Proceedings of the 3rd Human Computation Workshop (HCOMP 2011). 1-6.

Attenberg, J., F. Provost. 2010. Why label when you can search? Alternatives to active learning for applying human resources to build classification models under extreme class imbalance. Proceedings of the Sixteenth ACM SIGKDD International Conference on Knowledge Discovery and Data Mining (KDD 2010).

Attenberg, J., K. Q. Weinberger, A. Smola, A. Dasgupta, M. Zinkevich. 2009. Collaborative email-spam filtering with the hashing-trick. Sixth Conference on Email and Anti-Spam (CEAS).

Baehrens, David, Timon Schroeter, Stefan Harmeling, Motoaki Kawanabe, Katja Hansen, Klaus-Robert Mallen 2010. How to explain individual classification decisions. Journal of Machine Learning Research 11 1803-1831.

Baesens, B., R. Setiono, C. Mues, J. Vanthienen. 2003a. Using neural network rule extraction and decision tables for credit-risk evaluation. Management Science 49(3) 312-329.

Baesens, B., T. Van Gestel, S. Viaene, M. Stepanova, J. Suykens, J. Vanthienen. 2003b. Benchmarking state-of-the-art classification algorithms for credit scoring. Journal of the Operational Research Society 54(6) 627-635.

Barakat, N. H., A. P. Bradley. 2007. Rule extraction from support vector machines: A sequantial covering approach. IEEE Transactions on Knowledge and Data Engineering 19(6) 729-741.

Barbella, D., S. Benzaid, J. M. Christensen, B. Jackson, X. V. Qin, D. R. Musicant. 2009. Understanding support vector machine classifications via a recommender system-like approach.

Barki, H., J. Hartwick. 2001. Interpersonal conflict and its management in information system development. MIS Quarterly 25(2) 195-22.

Robert Stahlbock, Sven F. Crone, Stefan Lessmann, eds., DMIN. CSREA Press, 305-311. Bishop, C. M. 1996. Neural networks for pattern recognition. Oxford University Press, Oxford, UK.

Chang, Chih-Chung, Chih-Jen Lin. 2001. LIBSVM: a library for support vector machines. Software available at http://www.csie.ntu.edu.tw/~cjlin/libsvm.

Craven, M. W., J. W. Shavlik. 1996. Extracting tree-structured representations of trained networks.

D. S. Touretzky, M. C. Mozer, M. E. Hasselmo, eds., Advances in Neural Information Processing Systems, vol. 8. The MIT Press, 24-30.

Dekel, O., O. Shamir. 2009. Vox populi: Collecting high-quality labels from a crowd. COLT 2009: Proceedings of the 22nd Annual Conference on Learning Theory. Citeseer.

Donmez, Pinar, Jaime G. Carbonell. 2008. Proactive learning: Cost-sensitive active learning with multiple imperfect oracles. Proceedings of the 17th ACM Conference on Information and Knowledge Manage-ment (CIKM 2008). 619-628.

Donmez, Pinar, Jaime G. Carbonell, Jeff Schneider. 2009. Efficiently learning the accuracy of labeling sources for selective sampling. Proceedings of the 15th ACM SIGKDD International Conference on Knowledge Discovery and Data Mining (KDD 2009). 259-268.

eMarketer. Apr. 27, 2010. Brand safety concerns hurt display ad growth. Http://www1.emarketer.com/Article.aspx?R=1007661.

Fan, Rong-En, Kai-Wei Chang, Cho-Jui Hsieh, Xiang-Rui Wang, Chih-Jen Lin. 2008. LIBLINEAR: A library for large linear classification. Journal of Machine Learning Research 9 1871-1874.

Fawcett, T., F. Provost. 1997. Adaptive fraud detection. Data Mining and Knowledge Discovery 1(3) 291-316.

Fayyad, U. M., G. Piatetsky-Shapiro, P. Smyth. 1996. From data mining to knowledge discovery: An overview.

Advances in knowledge discovery and data mining. American Association for Artificial Intelligence, 1-34.

Federal Trade Commission for the Consumer. March 1998. Facts for consumers: Equal credit opportunity. Tech. rep., FTC.

Feldman, R., J. Sanger. 2008. The Text Mining Handbook. Cambridge University Press.

Fung, G., S. Sandilya, R. B. Rao. 2005. Rule extraction from linear support vector machines. Proceedings of the 11th ACM SIGKDD international Conference on Knowledge Discovery in Data Mining. 32-40.

Gonul, M. Sinan, Dilek Onkal, Michael Lawrence. 2006. The effects of structural characteristics of explanations on use of a dss. Decision Support Systems 42 1481-1493.

Google. 2010. Our commitment to the digital humanities. The official google blog. URL http://googleblog.blogspot.com/2010/07/our-commitment-to-digital-humanities-.html.

Gregor, S., I. Benbasat. 1999. Explanations from intelligent systems: Theoretical foundations and implications for practice. MIS Quarterly 23(4) 497-530.

Hastie, T., R. Tibshirani, J. Friedman. 2001. The Elements of Statistical Learning, Data Mining, Inference, and Prediction. Springer.

Hettich, S., S. D. Bay. 1996. The uci kdd archive [http://kdd.ics.uci.edu].

Hevner, A. R., S. T. March, J. Park, S. Ram. 2004. Design science in information systems research. MIS Quarterly 28(1) 75-106.

Hotho, A., A. Nürnberger, G. Paass. 2005. A brief survey of text mining. LDV Forum 20(1) 19-62.

Jacobsson, H.2005. Rule extraction from recurrent neural networks: A taxonomy and review. Neural Computation 17 1223-1263.

Joachims, T. 1998. Text categorization with support vector machines: Learning with many relevant features. European Conference on Machine Learning (ECML). Springer, Berlin, 137-142.

Kayande, U., A. De Bruyn, G. L. Lilien, A. Rangaswamy, G. H. van Bruggen. 2009. How incorporating feedback mechanisms in a DSS affects dss evaluations. Information Systems Research 20 527-546.

Lang, Ken. 1995. Newsweeder: Learning to filter netnews. Proceedings of the Twelfth International Conference on Machine Learning. 331-339.

Lessmann, S., B. Baesens, C. Mues, S. Pietsch. 2008. Benchmarking classification models for software defect prediction: A proposed framework and novel findings. IEEE Transactions Software Engineering 34(4) 485-496.

Lilien, G. L., A. Rangaswamy, G. H. Van Bruggen, K. Starke. 2004. DSS effectiveness in marketing resource allocation decisions: Reality vs. perception. Information Systems Research 15 216-235.

Limayem, M., G. De Sanctis. 2000. Providing decisional guidance for multicriteria decision making in groups. Information Systems Research 11(4) 386-401.

Mannino, M., M. Koushik. 2000. The cost-minimizing inverse classification problem: A genetic algorithm approach. Decision Support Systems 29 283-300.

Mark S. Silver: Decisional Guidance for Computer-Based Decision Support. MIS Quarterly 15(1): 105-122 (1991).

Martens, D., B. Baesens, T. Van Gestel, J. Vanthienen. 2007. Comprehensible credit scoring models using rule extraction from support vector machines. European Journal of Operational Research 183(3) 1466-1476.

Martens, D., T. Van Gestel, B. Baesens. 2009. Decompositional rule extraction from support vector machines by active learning. IEEE Transactions on Knowledge and Data Engineering 21(2) 178-191.

Norvig, P. 2011. On Chomsky and the two cultures of statistical learning. Http://norvig.com/chomsky.html Paaβ, G., H. de Vries. 2005. Evaluating the performance of text mining systems on real-world press archives. M. Spiliopoulou, R. Kruse, C. Borgelt, A. Nürnberger, W. Gaul, eds., GfKl. Studies in Classification, Data Analysis, and Knowledge Organization, Springer, 414-421.

Martens, D., B. Baesens, T. Van Gestel, J. Vanthienen. 2007. Comprehensible credit scoring models using rule extraction from support vector machines. Europ. Journal of Operational Research 183(3) 1466-1476.

Pang, B., L. Lee. 2008. Opinion mining and sentiment analysis. Foundations and Trends in Information Retrieval 2(1-2) 1-135.

Platt, J. 1999. Probabilistic outputs for support vector machines and comparisons to regularized likelihood methods.

A. Smola, P. Bartlett, B. Schölkopf, D. Schuurmans, eds., Advances in Large Margin Classifiers. MIT Press, Cambridge, Mass.

Pyle, D. 1999. Data preparation for data mining. Morgan Kaufmann.

Qi, X., B. D. Davison. 2009. Web page classification: Features and algorithms. ACM Computing Surveys (CSUR) 41(2) 1-31.

Quinlan, J. R. 1993. C4.5: Programs for Machine Learning. Morgan Kaufmann Publishers Inc., San Francisco, Calif., USA.

Raghavan, S., H. Garcia-Molina. 2001. Crawling the hidden web. Proceedings of the International Conference on Very Large Data Bases. Citeseer, 129-138.

Rajiv D. Banker, Robert J. Kauffman 2004 The Evolution of Research on Information Systems: A Fiftieth-Year Survey of the Literature in Management Science 50 (3) 281-298.

Robnik-Sikonja, M., I. Kononenko. 2008. Explaining classifications for individual instances. IEEE Transactions on Knowledge and Data Engineering 20 589-600.

Sambamurthy, V., M. S. Poole. 1992. The effects of variations in capabilities of gdss designs on management of cognitive conflict in groups. Information Systems Research 3(3) 224-251.

Schapire, Robert E., Yoram Singer. 2000. Boostexter: A boosting-based system for text categorization. Machine Learning 39(2/3) 135-168.

Sheng, Victor S., Foster Provost, Panagiotis Ipeirotis. 2008. Get another label? Improving data quality and data mining using multiple, noisy labelers. Proceedings of the 14th ACM SIGKDD International Conference on Knowledge Discovery and Data Mining (KDD 2008).

Shmueli, G., O. R. Koppius. 2011. Predictive analytics in information systems research. MIS Quarterly 35(3) 553-572.

Sindhwani, Vikas, Prem Melville. 2008. Document-word co-regularization for semi-supervised sentiment analysis. ICDM.

Sindhwani, Vikas, Prem Melville, Richard Lawrence. 2009. Uncertainty sampling and transductive experimental design for active dual supervision. ICML.

Vapnik, V. N. 1995. The nature of statistical learning theory. Springer-Verlag New York, Inc., New York, N.Y., USA.

Strumbelj, E., I. Kononenko. 2010. An efficient explanation of individual classifications using game theory. Journal of Machine Learning Research 11 1-18.

Strumbelj, E., I. Kononenko, M. Robnik-Sikonja. 2009. Explaining instance classifications with interactions of subsets of feature values. Data & Knowledge Engineering 68(10) 886-904.

Todd, P. A., I. Benbasat. 1999. Evaluating the impact of dss, cognitive effort, and incentives on strategy selection. Information Systems Research 10(4) 356-374.

Umanath, N. S., I. Vessey. 1994. Multiattribute data presentation and human judgment: A cognitive fit. Decision Sciences 25(5/6) 795 824.

Webb, G. I. 1995. OPUS: An efficient admissible algorithm for unordered search. Arxiv preprint cs/9512101

Weinberger, Kilian Q., Anirban Dasgupta, John Langford, Alexander J. Smola, Josh Attenberg. 2009. Feature hashing for large scale multitask learning.

Andrea Pohoreckyj Danyluk, L'eon Bottou, Michael L. Littman, eds., ICML, ACM International Conference Proceeding Series, vol. 382. ACM, 140.

Witten, I. H., E. Frank. 2000. Data mining: practical machine learning tools and techniques with Java implementations. Morgan Kaufmann Publishers Inc., San Francisco, Calif., USA.

Ye, L. R., P. E. Johnson. 1995. The impact of explanation facilities on user acceptance of expert systems advice. MIS Quarterly 19 157-172.

What is claimed is:

1. A non-transitory computer readable medium including instructions thereon that are accessible by a hardware processing arrangement, wherein, when the processing arrangement executes the instructions, the processing arrangement is configured to generate information associated with at least one first classification of at least one document, comprising:
   (a) identifying at least one characteristic of the at least one document, wherein the at least one characteristic includes a plurality of items;
   (b) obtaining at least one second classification of the at least one document based on the at least one characteristic of the at least one document;
   (c) removing at least one of the items from the at least one document;
   (d) obtaining the at least one first classification based on the removal of the at least one of the items; and
   (e) generating the information associated with the at least one first classification of the at least one document by repeating procedures (c) and (d) until the at least one first classification is different from the at least one second classification.

2. The non-transitory computer readable medium of claim 1, wherein the items include at least one of a (i) a plurality of words, (ii) a combination of words, (iii) at least one Uniform Resource Locator, or (iv) at least one locations visited by at least one device.

3. The non-transitory computer readable medium of claim 2, wherein the at least one characteristic includes a plurality of words, and wherein the processing arrangement is further configured to generate the information by removing at least one of the words when performing procedures (c) and (d).

4. The non-transitory computer readable medium of claim 3, wherein the at least one characteristic further includes a combination of words, and wherein the processing arrangement is further configured to generate the information by removing each word and every combination of words from the at least one document when performing procedures (c) and (d).

5. The non-transitory computer readable medium of claim 4, wherein the processing arrangement is further configured to omit at least some of the words or at least some combination of words when performing procedures (c) and (d).

6. The non-transitory computer readable medium of claim 5, wherein the processing arrangement is further configured to omit at least some of the words or at least some combination of words based on at least one of a pruning heuristic search or a hill climbing search.

7. The non-transitory computer readable medium of claim 1, wherein the information includes a minimum-size explanation.

8. The non-transitory computer readable medium of claim 1, wherein the information includes a plurality of minimum explanations.

9. The computer readable medium of claim 1, wherein the obtaining of the at least one second classification includes determining the at least one second classification of the at least one document based on the at least one characteristic of the at least one document.

10. A non-transitory computer readable medium including instructions thereon that are accessible by a hardware processing arrangement, wherein, when the processing arrangement executes the instructions, the processing arrangement is configured to generate information associated with at least one first classification of a collection, comprising:
    (a) identifying at least one characteristic of the collection, wherein the at least one characteristic includes a plurality of items;
    (b) obtaining at least one second classification of the collection based on the at least one characteristic of the collection;
    (c) removing at least one of the items from the at least one document;
    (d) obtaining the at least one first classification based on the removal of the at least one of the items; and
    (e) generating the information associated with the at least one first classification of the collection by repeating procedures (c) and (d) until the at least one first classification is different than the at least one second classification.

11. The non-transitory computer readable medium of claim 10, wherein the information includes at least one of an explanation or a hyper-explanation of the at least one first classification of the collection, and wherein the at least one first classification is one of a plurality of classifications.

12. The non-transitory computer readable medium of claim 11, wherein the at least one of the explanation or the hyper-explanation is absent evidence indicating any of the at least one first classification and the at least one second classification.

13. The non-transitory computer readable medium of claim 12, wherein the at least one of the explanation or the hyper-explanation includes an indication of insufficient vocabulary.

14. The non-transitory computer readable medium of claim 11, wherein the at least one of the explanation or the hyper-explanation includes evidence exclusively indicating at least one of a negative classification or a default classification.

15. The non-transitory computer readable medium of claim 14, wherein the at least one of the explanation or the hyper-explanation is absent evidence of a positive classification.

16. The non-transitory computer readable medium of claim 11, wherein the at least one of the explanation or the hyper-explanation includes evidence exclusively indicating a positive classification.

17. The non-transitory computer readable medium of claim 16, wherein the at least one of the explanation or the hyper-explanation is absent evidence indicating at least one of a negative classification or a default classification.

18. The non-transitory computer readable medium of claim 11, wherein the at least one of the explanation or the hyper-explanation includes evidence indicating a default classification.

19. The non-transitory computer readable medium of claim 11, wherein the at least one of the explanation or the hyper-explanation includes an incorrect prior classification.

20. The non-transitory computer readable medium of claim 11, wherein at least one set of training data associated with a classifier facilitates generating the at least one of the explanation or the hyper-explanation.

21. The non-transitory computer readable medium of claim 20, wherein the at least one set of training data includes a set of nearest neighbors that facilitates generating the at least one of the explanation or the hyper-explanation.

22. The computer readable medium of claim 10, wherein the obtaining of the at least one second classification includes determining the at least one second classification of the at least one collection based on the at least one characteristic of the at least one document.

23. The computer readable medium of claim 10, wherein the items include at least one of a (i) a plurality of words, (ii) a combination of words, (iii) at least one Uniform Resource Locator, or (iv) at least one locations visited by at least one device.

24. A method for generating information associated with at least one first classification of a collection, comprising:
  (a) identifying at least one characteristic of the collection, wherein the at least one characteristic includes a plurality of items;
  (b) obtaining at least one second classification of the collection based on the at least one characteristic of the collection;
  (c) removing at least one of the items from the at least one document;
  (d) obtaining the at least one first classification based on the removal of the at least one of the items; and
  (e) using a computer hardware arrangement, generating the information associated with the at least one first classification of the collection by repeating procedures (c) and (d) until the at least one first classification is different than the at least one second classification.

25. The method of claim 24, wherein the collection includes at least one document.

26. The method of claim 24, wherein the items include at least one of a (i) a plurality of words, (ii) a combination of words, (iii) at least one Uniform Resource Locator, or (iv) at least one locations visited by at least one device.

27. A system configured to generate information associated with at least one first classification of a collection, comprising:
  a processing arrangement configured to:
    (a) identify at least one first characteristic of the collection, wherein the at least one first characteristic includes a plurality of items;
    (b) obtain at least one second classification of the collection based on the at least one first characteristic of the collection;
    (c) remove at least one of the items from the at least one document;
    (d) obtain the at least one first classification based on the removal of the at least one of the items; and
    (e) generate the information associated with the at least one first classification of the collection by repeating procedures (c) and (d) until the at least one first classification is different than the at least one second classification.

28. The system of claim 27, wherein the collection includes at least one document.

29. The system of claim 27, wherein the items include at least one of a (i) a plurality of words, (ii) a combination of words, (iii) at least one Uniform Resource Locator, or (iv) at least one locations visited by at least one device.

* * * * *

UNITED STATES PATENT AND TRADEMARK OFFICE
CERTIFICATE OF CORRECTION

PATENT NO. : 9,836,455 B2
APPLICATION NO. : 14/001242
DATED : December 5, 2017
INVENTOR(S) : Martens et al.

Page 1 of 1

It is certified that error appears in the above-identified patent and that said Letters Patent is hereby corrected as shown below:

In the Specification
Column 4, Line 6, add a """ at the beginning of "The explanation"
Column 4, Line 11, add a """ at the end of "features."
Column 5, Line 53, please insert a --.-- after the words "for years" and before "There are"
Column 9, Lines 5-6, please remove the words "such as" and replace it with "or"

In the Claims
Column 58, Claim 10, Line 33, please remove the word "document" and replace it with the word "collection"
Column 59, Claim 24, Line 39, please remove the word "document" and replace it with the word "collection"
Column 60, Claim 27, Line 25, please remove the word "document" and replace it with the word "collection"

Signed and Sealed this
Twelfth Day of April, 2022

Drew Hirshfeld
*Performing the Functions and Duties of the
Under Secretary of Commerce for Intellectual Property and
Director of the United States Patent and Trademark Office*